(12) United States Patent
Brown et al.

(10) Patent No.: US 11,314,139 B2
(45) Date of Patent: *Apr. 26, 2022

(54) SELF-CONTAINED EC IGU

(71) Applicant: View, Inc., Milpitas, CA (US)

(72) Inventors: Stephen C. Brown, San Mateo, CA (US); Dhairya Shrivastava, Los Altos, CA (US); Erich R. Klawuhn, Los Altos, CA (US); Trevor Frank, San Jose, CA (US); Douglas Silkwood, Santa Clara, CA (US)

(73) Assignee: View, Inc., Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/386,094

(22) Filed: Apr. 16, 2019

(65) Prior Publication Data
US 2019/0243206 A1    Aug. 8, 2019

Related U.S. Application Data

(60) Continuation of application No. 16/253,971, filed on Jan. 22, 2019, which is a division of application No.
(Continued)

(51) Int. Cl.
*G02F 1/163* (2006.01)
*E06B 9/24* (2006.01)
(Continued)

(52) U.S. Cl.
CPC ............ *G02F 1/163* (2013.01); *E06B 3/6722* (2013.01); *E06B 9/24* (2013.01); *G02F 1/153* (2013.01);
(Continued)

(58) Field of Classification Search
CPC ...... G02F 1/1523; G02F 1/1533; G02F 1/155; G02F 1/0102; G02F 1/163; G09G 3/16
(Continued)

(56) References Cited

U.S. PATENT DOCUMENTS 4,306,140 A    12/1981    Stromquist
4,393,105 A    7/1983    Kreisman
(Continued)

FOREIGN PATENT DOCUMENTS

CH    525376 A    7/1972
CN    1380991 A    11/2002
(Continued)

OTHER PUBLICATIONS

U.S. Office Action dated Jan. 18, 2013 in U.S. Appl. No. 13/049,756.
(Continued)

*Primary Examiner* — Dawayne Pinkney
(74) *Attorney, Agent, or Firm* — Weaver Austin Villeneuve & Sampson LLP; Brian D. Griedel

(57) ABSTRACT

Onboard EC window controllers are described. The controllers are configured in close proximity to the EC window, for example, within the IGU. The controller may be part of a window assembly, which includes an IGU having one or more EC panes, and thus does not have to be matched with the EC window, and installed, in the field. The window controllers described herein have a number of advantages because they are matched to the IGU containing one or more EC devices and their proximity to the EC panes of the window overcomes a number of problems associated with conventional controller configurations. Also described are self-meshing networks for electrochromic windows.

17 Claims, 37 Drawing Sheets

Related U.S. Application Data

14/951,410, filed on Nov. 24, 2015, now Pat. No. 10,303,035, which is a continuation-in-part of application No. 14/401,081, filed as application No. PCT/US2013/134276 on May 24, 2013, now abandoned, said application No. 14/951,410 is a continuation-in-part of application No. 14/468,778, filed on Aug. 26, 2014, now Pat. No. 9,442,341, which is a continuation of application No. 13/479,137, filed on May 23, 2012, now Pat. No. 9,128,346, which is a continuation of application No. 13/049,750, filed on Mar. 16, 2011, now Pat. No. 8,213,074, and a continuation-in-part of application No. 12/971,576, filed on Dec. 17, 2010, now Pat. No. 9,081,246, said application No. 14/951,410 is a continuation-in-part of application No. 13/449,248, filed on Apr. 17, 2012, now abandoned.

(60) Provisional application No. 62/248,181, filed on Oct. 29, 2015, provisional application No. 62/085,179, filed on Nov. 26, 2014, provisional application No. 61/652,021, filed on May 25, 2012, provisional application No. 61/289,319, filed on Dec. 22, 2009.

(51) Int. Cl.
*H04L 12/46* (2006.01)
*E06B 3/67* (2006.01)
*G02F 1/153* (2006.01)
*H04L 12/28* (2006.01)

(52) U.S. Cl.
CPC ...... *H04L 12/2803* (2013.01); *H04L 12/4625* (2013.01); *E06B 2009/2464* (2013.01)

(58) Field of Classification Search
USPC ............... 359/265–275, 277, 245–247, 242; 345/49, 105; 250/70; 348/814, 817; 438/929; 349/182–186
See application file for complete search history.

(56) References Cited

U.S. PATENT DOCUMENTS

| | | |
|---|---|---|
| 4,893,908 A | 1/1990 | Wolf et al. |
| 4,941,302 A | 7/1990 | Barry |
| 4,942,704 A | 7/1990 | King |
| 5,106,663 A | 4/1992 | Box |
| 5,124,833 A | 6/1992 | Barton et al. |
| 5,170,108 A | 12/1992 | Peterson et al. |
| 5,204,778 A | 4/1993 | Bechtel |
| 5,220,317 A | 6/1993 | Lynam et al. |
| 5,290,986 A | 3/1994 | Colon et al. |
| 5,313,761 A | 5/1994 | Leopold |
| 5,353,148 A | 10/1994 | Eid et al. |
| 5,365,365 A | 11/1994 | Ripoche et al. |
| 5,379,146 A | 1/1995 | Defendini |
| 5,384,578 A | 1/1995 | Lynam et al. |
| 5,384,653 A * | 1/1995 | Benson ............ E06B 3/6722 359/265 |
| 5,402,144 A | 3/1995 | Ripoche |
| 5,451,822 A | 9/1995 | Bechtel et al. |
| 5,598,000 A | 1/1997 | Popat |
| 5,621,526 A | 4/1997 | Kuze |
| 5,657,149 A | 8/1997 | Buffat et al. |
| 5,657,150 A | 8/1997 | Kailman et al. |
| 5,673,028 A | 9/1997 | Levy |
| 5,694,144 A | 12/1997 | Lefrou et al. |
| 5,724,175 A | 3/1998 | Hichwa et al. |
| 5,764,402 A | 6/1998 | Thomas et al. |
| 5,819,499 A | 10/1998 | Evason et al. |
| 5,822,107 A | 10/1998 | Lefrou et al. |
| 5,877,936 A | 3/1999 | Nishitani et al. |
| 5,900,720 A | 5/1999 | Kailman et al. |
| 5,948,195 A | 9/1999 | Thomas |
| 5,956,012 A | 9/1999 | Turnbull et al. |
| 5,973,818 A | 10/1999 | Sjursen et al. |
| 5,973,819 A | 10/1999 | Pletcher et al. |
| 5,978,126 A | 11/1999 | Sjursen et al. |
| 6,001,487 A | 12/1999 | Ladang et al. |
| 6,039,390 A | 3/2000 | Agrawal et al. |
| 6,039,850 A | 3/2000 | Schulz et al. |
| 6,045,896 A | 4/2000 | Boire et al. |
| 6,055,088 A | 4/2000 | Fix et al. |
| 6,055,089 A | 4/2000 | Schulz et al. |
| 6,068,720 A | 5/2000 | McHugh |
| 6,084,700 A | 7/2000 | Knapp et al. |
| 6,130,448 A | 10/2000 | Bauer et al. |
| 6,130,772 A | 10/2000 | Cava |
| 6,176,715 B1 | 1/2001 | Buescher |
| 6,204,953 B1 | 3/2001 | Zieba et al. |
| 6,222,177 B1 | 4/2001 | Bechtel et al. |
| 6,261,641 B1 | 7/2001 | Zieba et al. |
| 6,262,831 B1 | 7/2001 | Bauer et al. |
| 6,337,758 B1 | 1/2002 | Beteille et al. |
| 6,369,935 B1 | 4/2002 | Cardinal et al. |
| 6,386,713 B1 | 5/2002 | Turnbull et al. |
| 6,407,468 B1 | 6/2002 | LeVesque et al. |
| 6,407,847 B1 | 6/2002 | Poll et al. |
| 6,420,071 B1 | 7/2002 | Lee et al. |
| 6,449,082 B1 | 9/2002 | Agrawal et al. |
| 6,471,360 B2 | 10/2002 | Rukavina et al. |
| 6,509,999 B1 | 1/2003 | Shelepin et al. |
| 6,529,308 B2 | 3/2003 | Beteille et al. |
| 6,535,126 B2 | 3/2003 | Lin et al. |
| 6,559,411 B2 | 5/2003 | Borgeson et al. |
| 6,567,708 B1 | 5/2003 | Bechtel et al. |
| 6,614,577 B1 | 9/2003 | Yu et al. |
| 6,795,226 B2 | 9/2004 | Agrawal et al. |
| 6,829,511 B2 | 12/2004 | Bechtel et al. |
| 6,856,444 B2 | 2/2005 | Ingalls et al. |
| 6,897,936 B1 | 5/2005 | Li et al. |
| 6,919,530 B2 | 7/2005 | Borgeson et al. |
| 6,940,627 B2 | 9/2005 | Freeman et al. |
| 7,002,720 B2 | 2/2006 | Beteille et al. |
| 7,033,655 B2 | 4/2006 | Beteille et al. |
| 7,085,609 B2 | 8/2006 | Bechtel et al. |
| 7,133,181 B2 | 11/2006 | Greer |
| 7,215,318 B2 | 5/2007 | Turnbull et al. |
| 7,230,748 B2 | 6/2007 | Giron et al. |
| 7,277,215 B2 | 10/2007 | Greer |
| 7,304,787 B2 | 12/2007 | Sides et al. |
| 7,362,491 B2 | 4/2008 | Busick et al. |
| 7,417,397 B2 | 8/2008 | Berman et al. |
| 7,531,101 B2 | 5/2009 | Beteille |
| 7,542,809 B2 | 6/2009 | Bechtel et al. |
| 7,548,833 B2 | 6/2009 | Ahmed |
| 7,567,183 B2 | 7/2009 | Schwenke |
| 7,586,664 B2 | 9/2009 | O'Shaughnessy et al. |
| 7,610,910 B2 | 11/2009 | Ahmed |
| 7,710,671 B1 | 5/2010 | Kwak et al. |
| 7,817,326 B1 | 10/2010 | Rennig et al. |
| 7,822,490 B2 | 10/2010 | Bechtel et al. |
| 7,869,114 B2 | 1/2011 | Valentin et al. |
| 7,873,490 B2 | 1/2011 | MacDonald |
| 7,894,119 B2 | 2/2011 | Valentin et al. |
| 7,929,194 B2 | 4/2011 | Legois et al. |
| 7,941,245 B1 | 5/2011 | Popat |
| 7,941,982 B2 | 5/2011 | Merica |
| 7,972,021 B2 | 7/2011 | Scherer |
| 7,990,603 B2 | 8/2011 | Ash et al. |
| 8,004,739 B2 | 8/2011 | Letocart |
| 8,018,644 B2 | 9/2011 | Gustavsson et al. |
| 8,035,882 B2 | 10/2011 | Fanton et al. |
| 8,102,586 B2 | 1/2012 | Albahri |
| 8,213,074 B1 | 7/2012 | Shrivastava et al. |
| 8,254,013 B2 | 8/2012 | Mehtani et al. |
| 8,292,228 B2 | 10/2012 | Mitchell et al. |
| 8,300,298 B2 | 10/2012 | Wang et al. |
| 8,432,603 B2 | 4/2013 | Wang et al. |
| 8,456,729 B2 | 6/2013 | Brown et al. |
| 8,514,476 B2 | 8/2013 | Egerton et al. |

(56) References Cited

U.S. PATENT DOCUMENTS

| | | |
|---|---|---|
| 8,547,624 B2 | 10/2013 | Ash et al. |
| 8,643,933 B2 | 2/2014 | Brown et al. |
| 8,669,503 B2 | 3/2014 | Johnson et al. |
| 8,705,162 B2 | 4/2014 | Brown et al. |
| 8,711,465 B2 | 4/2014 | Bhatnagar et al. |
| 8,723,467 B2 | 5/2014 | Berman et al. |
| 8,800,221 B1 | 8/2014 | Header |
| 8,810,889 B2 | 8/2014 | Brown et al. |
| 8,836,263 B2 | 9/2014 | Berman et al. |
| 8,864,321 B2 | 10/2014 | Mehtani et al. |
| 8,902,486 B1 | 12/2014 | Chandrasekhar |
| 8,976,440 B2 | 3/2015 | Berland et al. |
| 9,016,630 B2 | 4/2015 | Mitchell et al. |
| 9,019,588 B2 | 4/2015 | Brown et al. |
| 9,030,725 B2 | 5/2015 | Pradhan et al. |
| 9,081,246 B2 | 7/2015 | Rozbicki |
| 9,081,247 B1 | 7/2015 | Pradhan et al. |
| 9,128,346 B2 | 9/2015 | Shrivastava et al. |
| 9,158,173 B2 | 10/2015 | Bhatnagar et al. |
| 9,170,008 B2 | 10/2015 | Reul et al. |
| 9,300,581 B1 | 3/2016 | Hui et al. |
| 9,360,280 B2 | 6/2016 | White et al. |
| 9,436,055 B2 | 9/2016 | Shrivastava et al. |
| 9,442,339 B2 | 9/2016 | Parker et al. |
| 9,442,341 B2 | 9/2016 | Shrivastava et al. |
| 9,897,888 B2 | 2/2018 | Bhatnagar et al. |
| 9,910,336 B2 | 3/2018 | Parker et al. |
| 9,946,138 B2 | 4/2018 | Shrivastava et al. |
| 9,958,750 B2 | 5/2018 | Parker et al. |
| 10,001,691 B2 | 6/2018 | Shrivastava et al. |
| 10,139,696 B2 | 11/2018 | Brown et al. |
| 10,139,697 B2 | 11/2018 | Wilbur et al. |
| 10,322,680 B2 | 6/2019 | Terashima et al. |
| 10,444,589 B2 | 10/2019 | Parker et al. |
| 10,782,583 B2 | 9/2020 | Bhatnagar et al. |
| 10,901,286 B2 | 1/2021 | Parker et al. |
| 10,975,612 B2 | 4/2021 | Strong et al. |
| 2002/0075472 A1 | 6/2002 | Holton |
| 2002/0075552 A1 | 6/2002 | Poll et al. |
| 2002/0152298 A1 | 10/2002 | Kikta et al. |
| 2003/0041533 A1 | 3/2003 | Trpkivski |
| 2003/0137712 A1 | 7/2003 | Westfall et al. |
| 2003/0210449 A1 | 11/2003 | Ingalls et al. |
| 2003/0210450 A1 | 11/2003 | Yu et al. |
| 2003/0227663 A1 | 12/2003 | Agrawal et al. |
| 2003/0227664 A1 | 12/2003 | Agrawal et al. |
| 2004/0001056 A1 | 1/2004 | Atherton et al. |
| 2004/0047050 A1 | 3/2004 | Bauer et al. |
| 2004/0135989 A1 | 7/2004 | Klebe |
| 2004/0160322 A1 | 8/2004 | Ship |
| 2005/0002081 A1 | 1/2005 | Beteille et al. |
| 2005/0166495 A1 | 8/2005 | Cho et al. |
| 2005/0200934 A1 | 9/2005 | Callahan et al. |
| 2005/0225830 A1 | 10/2005 | Huang et al. |
| 2005/0268629 A1 | 12/2005 | Ahmed |
| 2005/0270620 A1 | 12/2005 | Bauer et al. |
| 2005/0270621 A1 | 12/2005 | Bauer et al. |
| 2005/0278047 A1 | 12/2005 | Ahmed |
| 2006/0018000 A1 | 1/2006 | Greer |
| 2006/0077511 A1 | 4/2006 | Poll et al. |
| 2006/0107616 A1 | 5/2006 | Ratti et al. |
| 2006/0132923 A1 | 6/2006 | Hsiao et al. |
| 2006/0170376 A1 | 8/2006 | Piepgras et al. |
| 2006/0187608 A1 | 8/2006 | Stark |
| 2006/0209007 A1 | 9/2006 | Pyo et al. |
| 2006/0245024 A1 | 11/2006 | Greer |
| 2006/0279527 A1 | 12/2006 | Zehner et al. |
| 2006/0283084 A1 * | 12/2006 | Johnson ............ F24D 13/026 49/1 |
| 2007/0002007 A1 | 1/2007 | Tam |
| 2007/0003726 A1 | 1/2007 | Swannell |
| 2007/0020442 A1 | 1/2007 | Giron et al. |
| 2007/0022700 A1 | 2/2007 | Gallagher |
| 2007/0067048 A1 | 3/2007 | Bechtel et al. |
| 2007/0103761 A1 | 5/2007 | Giron et al. |
| 2007/0133078 A1 | 6/2007 | Fanton et al. |
| 2007/0138949 A1 | 6/2007 | Yoshida et al. |
| 2007/0162233 A1 | 7/2007 | Schwenke |
| 2007/0248756 A1 | 10/2007 | Krisko et al. |
| 2007/0285759 A1 | 12/2007 | Ash et al. |
| 2008/0018979 A1 | 1/2008 | Mahe et al. |
| 2008/0041434 A1 | 2/2008 | Adrian et al. |
| 2008/0238706 A1 * | 10/2008 | Kenwright ............ G06F 3/044 340/686.6 |
| 2008/0289682 A1 | 11/2008 | Adrian et al. |
| 2009/0027759 A1 | 1/2009 | Albahri |
| 2009/0058295 A1 | 3/2009 | Auday et al. |
| 2009/0066157 A1 | 3/2009 | Tarng et al. |
| 2009/0067031 A1 | 3/2009 | Piroux et al. |
| 2009/0097098 A1 | 4/2009 | Piroux |
| 2009/0110918 A1 | 4/2009 | Jacquiod et al. |
| 2009/0114262 A1 | 5/2009 | Adriani et al. |
| 2009/0114928 A1 | 5/2009 | Messere et al. |
| 2009/0130409 A1 | 5/2009 | Reutler et al. |
| 2009/0143141 A1 | 6/2009 | Wells et al. |
| 2009/0148642 A1 | 6/2009 | Mauser et al. |
| 2009/0174300 A1 | 7/2009 | Jousse et al. |
| 2009/0181203 A1 | 7/2009 | Valentin et al. |
| 2009/0243732 A1 | 10/2009 | Tarng et al. |
| 2009/0243802 A1 | 10/2009 | Wolf et al. |
| 2009/0251758 A1 | 10/2009 | Valentin et al. |
| 2009/0262411 A1 | 10/2009 | Karmhag et al. |
| 2009/0297806 A1 | 12/2009 | Dawson-Elli et al. |
| 2009/0323160 A1 | 12/2009 | Egerton et al. |
| 2009/0323162 A1 | 12/2009 | Fanton et al. |
| 2010/0039410 A1 | 2/2010 | Becker et al. |
| 2010/0066484 A1 | 3/2010 | Hanwright et al. |
| 2010/0082081 A1 | 4/2010 | Niessen et al. |
| 2010/0172009 A1 | 7/2010 | Matthews |
| 2010/0172010 A1 | 7/2010 | Gustavsson et al. |
| 2010/0188057 A1 | 7/2010 | Tarng |
| 2010/0208326 A1 | 8/2010 | Kwak et al. |
| 2010/0235206 A1 | 9/2010 | Miller et al. |
| 2010/0243427 A1 | 9/2010 | Kozlowski et al. |
| 2010/0245972 A1 | 9/2010 | Wright |
| 2010/0245973 A1 | 9/2010 | Wang et al. |
| 2010/0315693 A1 | 12/2010 | Lam et al. |
| 2011/0043885 A1 | 2/2011 | Lamine et al. |
| 2011/0046810 A1 | 2/2011 | Bechtel et al. |
| 2011/0048614 A1 | 3/2011 | Veerasamy |
| 2011/0051221 A1 | 3/2011 | Veerasamy |
| 2011/0059275 A1 | 3/2011 | Stark |
| 2011/0061319 A1 | 3/2011 | Anderson et al. |
| 2011/0063708 A1 | 3/2011 | Letocart |
| 2011/0094585 A1 | 4/2011 | Debije et al. |
| 2011/0148218 A1 | 6/2011 | Rozbicki et al. |
| 2011/0164304 A1 | 7/2011 | Brown et al. |
| 2011/0167617 A1 | 7/2011 | Letocart |
| 2011/0211247 A1 | 9/2011 | Kozlowski et al. |
| 2011/0216389 A1 | 9/2011 | Piroux et al. |
| 2011/0235152 A1 | 9/2011 | Letocart |
| 2011/0249313 A1 | 10/2011 | Letocart |
| 2011/0249314 A1 | 10/2011 | Wang et al. |
| 2011/0255142 A1 | 10/2011 | Ash et al. |
| 2011/0260961 A1 | 10/2011 | Burdis |
| 2011/0261429 A1 | 10/2011 | Sbar et al. |
| 2011/0266137 A1 | 11/2011 | Wang et al. |
| 2011/0266138 A1 | 11/2011 | Wang et al. |
| 2011/0266419 A1 | 11/2011 | Jones et al. |
| 2011/0267672 A1 | 11/2011 | Sbar et al. |
| 2011/0267674 A1 | 11/2011 | Wang et al. |
| 2011/0267675 A1 | 11/2011 | Wang et al. |
| 2011/0292488 A1 | 12/2011 | McCarthy et al. |
| 2011/0299149 A1 | 12/2011 | Park et al. |
| 2011/0304898 A1 | 12/2011 | Letocart |
| 2012/0026573 A1 | 2/2012 | Collins et al. |
| 2012/0033287 A1 | 2/2012 | Friedman et al. |
| 2012/0062975 A1 | 3/2012 | Mehtani et al. |
| 2012/0133315 A1 | 5/2012 | Berman et al. |
| 2012/0140492 A1 | 6/2012 | Alvarez |
| 2012/0147449 A1 | 6/2012 | Bhatnagar et al. |
| 2012/0190386 A1 | 7/2012 | Anderson |
| 2012/0194895 A1 | 8/2012 | Podbelski et al. |
| 2012/0200908 A1 | 8/2012 | Bergh et al. |

(56) References Cited

U.S. PATENT DOCUMENTS

| | | |
|---|---|---|
| 2012/0236386 A1 | 9/2012 | Mehtani et al. |
| 2012/0239209 A1 | 9/2012 | Brown et al. |
| 2012/0268803 A1 | 10/2012 | Greer |
| 2012/0293855 A1 | 11/2012 | Shrivastava et al. |
| 2012/0300280 A1 | 11/2012 | Murphy et al. |
| 2012/0327499 A1 | 12/2012 | Parker et al. |
| 2013/0057937 A1 | 3/2013 | Berman et al. |
| 2013/0157493 A1* | 6/2013 | Brown .................... E06B 3/66 439/247 |
| 2013/0158790 A1 | 6/2013 | McIntyre, Jr. et al. |
| 2013/0241299 A1 | 9/2013 | Snyker et al. |
| 2013/0242370 A1 | 9/2013 | Wang |
| 2013/0263510 A1 | 10/2013 | Gassion |
| 2013/0271812 A1 | 10/2013 | Brown et al. |
| 2013/0271813 A1 | 10/2013 | Brown |
| 2013/0271814 A1 | 10/2013 | Brown |
| 2013/0271815 A1 | 10/2013 | Pradhan et al. |
| 2013/0278988 A1 | 10/2013 | Jack et al. |
| 2013/0278989 A1 | 10/2013 | Lam et al. |
| 2013/0305656 A1 | 11/2013 | Ripoche |
| 2013/0319756 A1 | 12/2013 | Snyker et al. |
| 2014/0000191 A1 | 1/2014 | Snyker et al. |
| 2014/0041933 A1 | 2/2014 | Snyker et al. |
| 2014/0067733 A1 | 3/2014 | Humann |
| 2014/0160550 A1 | 6/2014 | Brown et al. |
| 2014/0170863 A1 | 6/2014 | Brown |
| 2014/0192393 A1 | 7/2014 | Bhatnagar et al. |
| 2014/0236323 A1 | 8/2014 | Brown et al. |
| 2014/0247475 A1 | 9/2014 | Parker et al. |
| 2014/0259931 A1 | 9/2014 | Plummer |
| 2014/0268287 A1 | 9/2014 | Brown et al. |
| 2014/0300945 A1 | 10/2014 | Parker |
| 2014/0305053 A1 | 10/2014 | Sonderkaer et al. |
| 2014/0330538 A1 | 11/2014 | Conklin et al. |
| 2014/0340731 A1 | 11/2014 | Strong et al. |
| 2014/0349497 A1 | 11/2014 | Brown et al. |
| 2014/0355097 A1 | 12/2014 | Brown et al. |
| 2014/0371931 A1 | 12/2014 | Lin et al. |
| 2015/0002919 A1 | 1/2015 | Jack et al. |
| 2015/0049378 A1 | 2/2015 | Shrivastava et al. |
| 2015/0060648 A1 | 3/2015 | Brown et al. |
| 2015/0070745 A1 | 3/2015 | Pradhan |
| 2015/0092260 A1 | 4/2015 | Parker et al. |
| 2015/0116811 A1 | 4/2015 | Shrivastava et al. |
| 2015/0118869 A1 | 4/2015 | Brown et al. |
| 2015/0122474 A1 | 5/2015 | Peterson |
| 2015/0185581 A1 | 7/2015 | Pradhan et al. |
| 2015/0219975 A1 | 8/2015 | Phillips et al. |
| 2015/0293422 A1 | 10/2015 | Pradhan et al. |
| 2015/0346575 A1 | 12/2015 | Bhatnagar et al. |
| 2015/0378230 A1 | 12/2015 | Gudmunson et al. |
| 2015/0378231 A1 | 12/2015 | Greer et al. |
| 2016/0070151 A1 | 3/2016 | Shrivastava et al. |
| 2016/0089869 A1 | 3/2016 | Parker et al. |
| 2016/0109778 A1 | 4/2016 | Shrivastava et al. |
| 2016/0154290 A1 | 6/2016 | Brown et al. |
| 2016/0334689 A1 | 11/2016 | Parker et al. |
| 2016/0363831 A1 | 12/2016 | Ash et al. |
| 2016/0376829 A1 | 12/2016 | Plummer |
| 2017/0052753 A1 | 2/2017 | Paolini, Jr. |
| 2017/0269451 A1 | 9/2017 | Shrivastava et al. |
| 2017/0362882 A1 | 12/2017 | Boucher et al. |
| 2018/0024408 A1 | 1/2018 | Strong et al. |
| 2018/0130455 A1 | 5/2018 | Plununer et al. |
| 2018/0157140 A1 | 6/2018 | Bhatnagar et al. |
| 2018/0196325 A1 | 7/2018 | Parker et al. |
| 2018/0267380 A1 | 9/2018 | Shrivastava et al. |
| 2018/0364539 A1 | 12/2018 | Rozbicki et al. |
| 2019/0210346 A1 | 7/2019 | Parker et al. |
| 2019/0391456 A1 | 12/2019 | Parker et al. |
| 2020/0348574 A1 | 11/2020 | Bhatnagar et al. |
| 2021/0079715 A1 | 3/2021 | Neander et al. |
| 2021/0079716 A1 | 3/2021 | Neander et al. |
| 2021/0198939 A1 | 7/2021 | Strong et al. |
| 2021/0215990 A1 | 7/2021 | Parker et al. |

FOREIGN PATENT DOCUMENTS

| | | |
|---|---|---|
| CN | 2590732 Y | 12/2003 |
| CN | 1734325 A | 2/2006 |
| CN | 1779527 A | 5/2006 |
| CN | 1784631 A | 6/2006 |
| CN | 1822951 A | 8/2006 |
| CN | 1984549 A | 6/2007 |
| CN | 201228500 Y | 4/2009 |
| CN | 201439676 U | 4/2010 |
| CN | 101969207 A | 2/2011 |
| CN | 102203370 A | 9/2011 |
| CN | 102307822 A | 1/2012 |
| CN | 202108407 U | 1/2012 |
| DE | 3918913 A1 | 12/1989 |
| DE | 19611245 A1 | 9/1997 |
| DE | 10124673 A1 | 11/2002 |
| DE | 102006042538 | 3/2008 |
| EP | 0445314 | 9/1991 |
| EP | 0586121 A1 | 3/1994 |
| EP | 0869032 | 10/1998 |
| EP | 0835475 B1 | 9/2004 |
| EP | 1510854 A1 | 3/2005 |
| EP | 1417535 | 11/2005 |
| EP | 1619546 A2 | 1/2006 |
| EP | 0920210 | 6/2009 |
| EP | 2136409 | 12/2009 |
| EP | 2161615 | 3/2010 |
| EP | 2348357 | 7/2011 |
| EP | 2357544 | 8/2011 |
| EP | 2648086 A2 | 10/2013 |
| EP | 2764998 A1 | 8/2014 |
| EP | 3117992 A1 | 1/2017 |
| GB | 1437198 | 5/1976 |
| JP | 63-208830 | 8/1988 |
| JP | 02-132420 | 5/1990 |
| JP | 05-178645 | 7/1993 |
| JP | 10-063216 | 3/1998 |
| JP | 2000-257352 A | 9/2000 |
| JP | 2001-193364 | 7/2001 |
| JP | 2004-245985 | 9/2004 |
| JP | 2008-542578 A | 11/2008 |
| JP | 4694816 B2 | 6/2011 |
| JP | 2011-526378 A | 10/2011 |
| JP | 4799113 B2 | 10/2011 |
| JP | 2013-057975 A | 3/2013 |
| KR | 20-0412640 | 3/2006 |
| KR | 10-752041 B1 | 8/2007 |
| KR | 10-2008-0022319 | 3/2008 |
| KR | 10-2009-0026181 | 3/2009 |
| KR | 10-0904847 B1 | 6/2009 |
| KR | 10-0931183 | 12/2009 |
| KR | 10-2010-0034361 | 4/2010 |
| KR | 10-2011-0003698 | 1/2011 |
| KR | 10-2011-0094672 | 8/2011 |
| TW | 521118 | 2/2003 |
| TW | M266467 | 6/2005 |
| TW | 200532346 A | 10/2005 |
| TW | I253182 | 4/2006 |
| TW | 200731571 A | 8/2007 |
| TW | I291073 | 12/2007 |
| TW | 201029838 A | 8/2010 |
| TW | 201120552 A | 6/2011 |
| TW | 201215981 A | 4/2012 |
| WO | WO1998/016870 | 4/1998 |
| WO | WO2002/008826 A1 | 1/2002 |
| WO | WO2002/013052 | 2/2002 |
| WO | WO2003/001290 A1 | 1/2003 |
| WO | WO2004/003649 | 1/2004 |
| WO | WO2005/076061 | 8/2005 |
| WO | WO2005/098811 | 10/2005 |
| WO | WO2005/103807 | 11/2005 |
| WO | WO2006/133298 A2 | 12/2006 |
| WO | WO2007/016546 A2 | 2/2007 |
| WO | WO2006/133298 A3 | 12/2007 |
| WO | WO2007/146862 | 12/2007 |
| WO | WO2008/030018 | 3/2008 |
| WO | WO2008/043951 | 4/2008 |
| WO | WO2008/147322 | 12/2008 |

(56) References Cited

FOREIGN PATENT DOCUMENTS

| WO | WO2009/124647 | 10/2009 |
|---|---|---|
| WO | WO2009/145876 | 12/2009 |
| WO | WO2009/148861 | 12/2009 |
| WO | WO2010/120771 | 10/2010 |
| WO | WO2011/010067 | 1/2011 |
| WO | WO2011/020478 | 2/2011 |
| WO | WO2011/028253 | 3/2011 |
| WO | WO2011/028254 | 3/2011 |
| WO | WO2011/050291 | 4/2011 |
| WO | WO2011/087684 | 7/2011 |
| WO | WO2011/087687 | 7/2011 |
| WO | WO2011/109688 | 9/2011 |
| WO | WO2011/124720 | 10/2011 |
| WO | WO2011/127015 | 10/2011 |
| WO | WO2012/078634 A2 | 6/2012 |
| WO | WO2012/079159 | 6/2012 |
| WO | WO2012/080618 | 6/2012 |
| WO | WO2012/080656 | 6/2012 |
| WO | WO2012/080657 | 6/2012 |
| WO | WO2012/102964 A1 | 8/2012 |
| WO | WO2012/145155 | 10/2012 |
| WO | WO2013/059674 | 4/2013 |
| WO | WO2013/090264 | 6/2013 |
| WO | WO2013/109881 | 7/2013 |
| WO | WO2013/155467 | 10/2013 |
| WO | WO2014/019780 | 2/2014 |
| WO | WO2014/032023 | 2/2014 |
| WO | WO2014/082092 | 5/2014 |
| WO | WO2014/121809 | 8/2014 |
| WO | WO2014/121863 | 8/2014 |
| WO | WO2014/130471 | 8/2014 |
| WO | WO2014/134451 | 9/2014 |
| WO | WO2014/169253 | 10/2014 |
| WO | WO2014/209812 A1 | 12/2014 |
| WO | WO2015/051262 A1 | 4/2015 |
| WO | WO2015/077097 A1 | 5/2015 |
| WO | WO2015/086459 | 6/2015 |
| WO | WO2016/092778 A1 | 6/2016 |
| WO | WO2016/100075 A1 | 6/2016 |
| WO | WO2016/121331 A1 | 8/2016 |
| WO | WO2016/121332 A1 | 8/2016 |
| WO | WO2016/121347 A1 | 8/2016 |
| WO | WO2019/040809 A1 | 2/2019 |
| WO | WO2019/042679 A1 | 3/2019 |
| WO | WO2019/149682 A1 | 8/2019 |
| WO | WO2019/233761 A1 | 12/2019 |

OTHER PUBLICATIONS

U.S. Final Office Action dated Aug. 19, 2013 in U.S. Appl. No. 13/049,756.
U.S. Office Action dated Oct. 6, 2014 in U.S. Appl. No. 13/049,756.
U.S. Final Office Action dated Jul. 2, 2015 in U.S. Appl. No. 13/049,756.
U.S. Office Action dated Oct. 6, 2014 in U.S. Appl. No. 13/968,258.
U.S. Final Office Action dated Jun. 5, 2015 U.S. Appl. No. 13/968,258.
U.S. Office Action dated Feb. 3, 2012 in U.S. Appl. No. 13/049,750.
U.S. Final Office Action dated Apr. 30, 2012 in U.S. Appl. No. 13/049,750.
U.S. Notice of Allowance dated May 8, 2012 in U.S. Appl. No. 13/049,750.
U.S. Office Action dated Sep. 23, 2013 in U.S. Appl. No. 13/479,137.
U.S. Final Office Action dated Jan. 27, 2014 in U.S. Appl. No. 13/479,137.
U.S. Office Action dated Jul. 3, 2014 in U.S. Appl. No. 13/479,137.
U.S. Final Office Action dated Feb. 26, 2015 in U.S. Appl. No. 13/479,137.
U.S. Notice of Allowance dated May 14, 2015 in U.S. Appl. No. 13/479,137.
U.S. Notice of Allowance (supplemental) dated Jun. 12, 2015 in U.S. Appl. No. 13/479,137.
U.S. Office Action dated Jan. 16, 2015 in U.S. Appl. No. 14/468,778.
U.S. Final Office Action dated Sep. 11, 2015 in U.S. Appl. No. 14/468,778.
U.S. Notice of Allowance dated May 3, 2016 in U.S. Appl. No. 14/468,778.
U.S. Notice of Allowance dated Jul. 20, 2016 in U.S. Appl. No. 14/468,778.
U.S. Office Action dated Dec. 31, 2015 in U.S. Appl. No. 14/855,284.
U.S. Notice of Allowance dated Jul. 21, 2016 in U.S. Appl. No. 14/855,284.
U.S. Office Action dated Mar. 25, 2016 in U.S. Appl. No. 14/887,178.
U.S. Final Office Action dated Sep. 19, 2016 in U.S. Appl. No. 14/887,178.
U.S. Final Office Action dated Mar. 17, 2017 in U.S. Appl. No. 14/887,178.
U.S. Office Action dated Oct. 23, 2017 in U.S. Appl. No. 14/887,178.
U.S. Notice of Allowance dated Mar. 9, 2018 in U.S. Appl. No. 14/887,178.
U.S. Office Action dated Aug. 25, 2017 in U.S. Appl. No. 15/616,843.
U.S. Notice of Allowance dated Dec. 14, 2017 in U.S. Appl. No. 15/616,843.
U.S. Office Action dated Jul. 24, 2018 in U.S. Appl. No. 15/978,029.
U.S. Notice of Allowance dated Dec. 13, 2018 in U.S. Appl. No. 15/978,029.
U.S. Office Action dated Sep. 11, 2017 in U.S. Appl. No. 14/951,410.
U.S. Final Office Action dated Mar. 15, 2018 in U.S. Appl. No. 14/951,410.
U.S. Notice of Allowance dated Oct. 22, 2018 in U.S. Appl. No. 14/951,410.
U.S. Office Action dated Mar. 27, 2012 in U.S. Appl. No. 13/049,623.
U.S. Notice of Allowance dated Jul. 20, 2012 in U.S. Appl. No. 13/049,623.
U.S. Office Action dated Dec. 24, 2013 in U.S. Appl. No. 13/309,990.
Notice of Allowanced dated Jun. 17, 2014 in U.S. Appl. No. 13/309,990.
U.S. Office Action dated Oct. 11, 2013 in U.S. Appl. No. 13/449,235.
U.S. Notice of Allowance dated Jan. 10, 2014 in U.S. Appl. No. 13/449,235.
U.S. Office Action dated Feb. 24, 2015 in U.S. Appl. No. 14/163,026.
U.S. Office Action dated Nov. 29, 2013 in U.S. Appl. No. 13/449,248.
U.S. Office Action dated Nov. 29, 2013 in U.S. Appl. No. 13/449,251.
U.S. Final Office Action dated May 16, 2014 in U.S. Appl. No. 13/449,248.
U.S. Office Action dated Sep. 29, 2014 in U.S. Appl. No. 13/449,248.
U.S. Final Office Action dated May 15, 2014 in U.S. Appl. No. 13/449,251.
U.S. Office Action dated Oct. 28, 2014 in U.S. Appl. No. 13/449,251.
U.S. Office Action dated Jun. 3, 2015 in U.S. Appl. No. 13/449,251.
U.S. Office Action dated Sep. 15, 2014 in U.S. Appl. No. 13/682,618.
U.S. Notice of Allowance dated Jan. 22, 2015 in U.S. Appl. No. 13/682,618.
U.S. Notice of Allowance dated Apr. 13, 2015 in U.S. Appl. No. 14/657,380.
Letter dated Dec. 1, 2014 re Prior Art re U.S. Appl. No. 13/772,969 from Ryan D. Ricks representing MechoShade Systems, Inc.
Third-Party Submission dated Feb. 2, 2015 and Feb. 18, 2015 PTO Notice re Third-Party Submission for U.S. Appl. No. 13/772,969.
International Search Report and Written Opinion dated Sep. 26, 2012, issued in PCT/US2012/027828.
International Preliminary Report on Patentability dated Sep. 26, 2013, issued in PCT/US2012/027828.
International Search Report and Written Opinion dated Sep. 24, 2012, issued in PCT/US2012/027909.
International Preliminary Report on Patentability dated Sep. 26, 2013, issued in PCT/US2012/027909.
International Search Report and Written Opinion dated Feb. 15, 2016 in PCT/US2015/062480.
International Preliminary Report on Patentability dated Jun. 8, 2017 in PCT/US2015/062480.
International Search Report and Written Opinion dated Sep. 24, 2012, issued in PCT/US2012/027742.
International Preliminary Report on Patentability dated Sep. 26, 2013, issued in PCT/US2012/027742.

(56) References Cited

OTHER PUBLICATIONS

International Search Report and Written Opinion dated Mar. 28, 2013 in PCT/US2012/061137.
International Preliminary Report on Patentability dated May 1, 2014 in PCT/US2012/061137.
International Search Report and Written Opinion dated Jul. 23, 2013, issued in PCT/US2013/036235.
International Preliminary Report on Patentability dated Oct. 30, 2014 issued in PCT/US2013/036235.
International Search Report and Written Opinion dated Jul. 26, 2013, issued in PCT/US2013/036456.
International Preliminary Report on Patentability dated Oct. 23, 2014 issued in PCT/US2013/036456.
International Search Report and Written Opinion dated Jul. 11, 2013, issued in PCT/US2013/034998.
International Preliminary Report on Patentability dated Oct. 30, 2014 issued in PCT/US2013/034998.
International Search Report and Written Opinion dated Dec. 26, 2013, issued in PCT/US2013/053625.
International Preliminary Report on Patentability dated Feb. 19, 2015 issued in PCT/US2013/053625.
International Search Report and Written Opinion dated May 26, 2014, issued in PCT/US2014/016974.
Communication re Third-Party Observation dated Dec. 4, 2014 and Third-Party Observation dated Dec. 3, 2014 in PCT/US2014/016974.
International Search Report and Written Opinion dated Oct. 16, 2014, issued in PCT/US2014/043514.
Chinese Office Action dated Sep. 22, 2015 in Chinese Application No. CN 201280019891.4.
Chinese Office Action dated Jun. 13, 2016 in Chinese Application No. CN 201280019891.4.
Chinese Office Action dated Dec. 6, 2016 in Chinese Application No. CN 201280019891.4.
Chinese Office Action dated May 31, 2017 in Chinese Application No. CN 201280019891.4.
Chinese Office Action dated Mar. 26, 2015 in Chinese Application No. 201280060910.8.
European Search Report dated Aug. 11, 2014 in European Application No. 12757877.1.
European Search Report dated Jul. 29, 2014 in European Application No. 12758250.0.
European Office Action dated Sep. 26, 2018 in European Application No. 12758250.0.
EP Extended Search Report dated Nov. 8, 2018 in EP Application No. 15863112.7.
European Search Report dated Jul. 23, 2014 in European Application No. 12756917.6.
European Search Report dated Mar. 5, 2015 in European Application No. 12841714.4.
Russian Office Action dated Dec. 11, 2014 in Russian Application No. 2014145565.
Taiwanese Office Action dated Mar. 21, 2016 in TW Application No. 101108946.
Chinese Office Action dated Aug. 28, 2018 in CN Application No. 201580070776.3.
Taiwanese Office Action dated Dec. 6, 2017 in TW Application No. 106117123.
Taiwanese Office Action dated Dec. 12, 2018 in TW Application No. 107129150.
Lim, Sunnie H.N. et al., "Modeling of optical and energy performance of tungsten-oxide-based electrochromic windows including their intermediate states," Solar Energy Materials & Solar Cells, vol. 108, Oct. 16, 2012, pp. 129-135.
"SageGlass helps Solar Decathlon- and AIA award-winning home achieve net-zero energy" in MarketWatch.com, http://www.marketwatch.com/story/sageglass-helps-solar-decathlon-and-aia-award-winning-home-achieve-net-zero-energy-efficiency-2012-06-07, Jun. 7, 2012.
"New from Pella: Windows with Smartphone-run blinds", Pella Corp., http://www.desmoinesregister.com/article/20120114/BUSINESS/301140031/0/biggame/?odyssey=nav%7Chead, Jan. 13, 2012.
"How Cleantech wants to make a 2012 comeback" http://mountainview.patch.com/articles/how-cleantech-wants-to-make-a-2012-comeback, Jan. 23, 2012.
APC by Schneider Electric, Smart-UPS 120V Product Brochure, 2013, 8 pp.
Hoosier Energy, "How do they do that? Measuring Real-Time Cloud Activity" Hoosier Energy Current Connections, undated (http://members.questline.com/Article.aspx?articleID=18550&accountID=196000&n1-11774).
Kleissl, Jan et al., "Recent Advances in Solar Variability Modeling and Solar Forecasting at UC San Diego," Proceedings, American Solar Energy Society, 2013 Solar Conference, Apr. 16-20, 2013, Baltimore, MD.
Haby, Jeff, "Cloud Detection (IR v. VIS)," (undated) [http://theweatherprediction.com/habyhints2/512/].
Graham, Steve, "Clouds & Radiation," Mar. 1, 1999. [http://earthobservatory.nasa.gov/Features/Clouds/].
National Aeronautics & Space Administration, "Cloud Radar System (CRS)," (undated) [http://har.gsfc.nasa.gov/index.php?section=12].
Science and Technology Facilities Council. "Cloud Radar: Predicting The Weather More Accurately." ScienceDaily, Oct. 1, 2008. [www.sciencedaily.com/releases/2008/09/080924085200.htm].
"Remote Sensing: Clouds," Department of Atmospheric and Ocean Science, University of Maryland, (undated) [http://www.atmos.umd.edu/~pinker/remote_sensing_cloud.htm].
National Aeronautics & Space Administration, "Cloud Remote Sensing and Modeling," (undated) [http://atmospheres.gsfc.nasa.gov/climate/index.php?section=134 ].
Kipp & Zonen, "Solar Radiation" (undated) [http://www.kippzonen.com/Knowledge-Center/Theoretical-info/Solar-Radiation].
Duchon, Glaud E. et al., "Estimating Cloud Type from Pyranometer Observations," Journal of Applied Meteorology, vol. 38, Jan. 1999, pp. 132-141.
"SageGlass Unplugged™—wireless dynamic glass", 2014, 2 pages.
"Ossia Wireless Charging", screenshot and picture of Cota device, accessed Apr. 20, 2015, 1 page.
"SageGlass Mobile App" screenshot, accessed Aug. 28, 2015, 1 page.
"SageGlass Product Highlights" screenshot, accessed Aug. 28, 2015, 1 page.
"SageGlass Unplugged" screenshot, accessed Aug. 28, 2015, 1 page.
Preliminary Amendment filed Oct. 5, 2015 in U.S. Appl. No. 14/823,969.
Preliminary Amendment filed Apr. 16, 2018 in U.S. Appl. No. 15/866,379.
Preliminary Amendment filed Jun. 17, 2016 in U.S. Appl. No. 14/782,772.
Final Office Action dated Jul. 16, 2015 in U.S. Appl. No. 13/456,056.
Final Office Action dated Sep. 21, 2016 in U.S. Appl. No. 13/456,056.
Notice of Allowance dated Nov. 24, 2017 in U.S. Appl. No. 13/456,056.
Office Action dated Nov. 3, 2014 in U.S. Appl. No. 13/456,056.
Office Action dated Feb. 17, 2016 in U.S. Appl. No. 13/456,056.
Office Action dated Jul. 28, 2017 for U.S. Appl. No. 13/456,056.
Final Office Action dated Jun. 5, 2015 in U.S. Appl. No. 13/968,258.
Office Action dated Oct. 6, 2014 in U.S. Appl. No. 13/968,258.
Notice of Allowance dated Dec. 13, 2013 in U.S. Appl. No. 13/312,057.
Office Action dated Jul. 11, 2013 in U.S. Appl. No. 13/312,057.
Office Action dated Jan. 30, 2015 in U.S. Appl. No. 14/152,873.
Notice of Allowance dated May 19, 2015 in U.S. Appl. No. 14/152,873.
Notice of Allowance dated Sep. 13, 2017 for U.S. Appl. No. 14/823,969.
Notice of Allowance dated Dec. 7, 2017 for U.S. Appl. No. 14/823,969.
Office Action dated May 25, 2016 in U.S. Appl. No. 14/823,969.
Final Office Action dated Feb. 21, 2017 in U.S. Appl. No. 14/823,969.

(56) References Cited

OTHER PUBLICATIONS

Final Office Action dated Sep. 18, 2015 in U.S. Appl. No. 14/196,895.
Notice of Allowance dated Apr. 21, 2016 in U.S. Appl. No. 14/196,895.
Notice of Allowance dated Jul. 21, 2016 in U.S. Appl. No. 14/196,895.
Office Action dated Mar. 31, 2015 in U.S. Appl. No. 14/196,895.
Notice of Allowance dated Oct. 16, 2017 for U.S. Appl. No. 15/219,832.
Notice of Allowance (corrected) dated Feb. 2, 2018 for U.S. Appl. No. 15/219,832.
Office Action dated Jun. 29, 2017 for U.S. Appl. No. 15/219,832.
Office Action dated Jan. 24, 2019 for U.S. Appl. No. 15/868,748.
Notice of Allowance dated Sep. 18, 2013 for U.S. Appl. No. 13/326,168.
Notice of Allowance dated Jun. 13, 2014 for U.S. Appl. No. 14/103,660, and allowed claims.
Notice of Allowance dated Oct. 9, 2014 for U.S. Appl. No. 14/325,290.
Notice of Allowance dated Feb. 25, 2015 for U.S. Appl. No. 14/325,290.
Office Action dated Feb. 4, 2015 for U.S. Appl. No. 14/591,851.
U.S. Office Action dated Dec. 21, 2018 for U.S. Appl. No. 14/782,772.
Extended Supplementary European Search Report dated Feb. 16, 2016 for EP Application No. 13781444.8.
Partial Supplementary European Search Report dated Dec. 7, 2015 for EP Application No. 13781444.8.
EP Office Action dated Feb. 23, 2017 for EP Application No. 13781444.8.
EP Summons to Attend Oral Proceedings dated Feb. 8, 2018 for EP Application No. 13781444.8.
EP Office Action dated Dec. 6, 2018 for EP Application No. 13781444.8.
CN Office Action dated Oct. 8, 2016 for CN Application No. 201380025955.6.
CN Office Action dated Jul. 4, 2017 in CN Application No. 201380025955.6.
CN Office Action dated Mar. 26, 2018 in CN Application No. 201380025955.6.
CN Office Action dated Dec. 18, 2018 in CN Application No. 201380025955.6.
RU Office Action dated Sep. 19, 2016 in RU Application No. 2014147152.
RU Search Report dated Jan. 19, 2017 in RU Application No. 2014147152.
TW Office Action dated Oct. 25, 2016 in TW Application No. 102114688.
TW Office Action dated Jun. 20, 2018 in TW Application No. TW 106119450.
International Preliminary Report on Patentability dated Jun. 11, 2014 for PCT/US2013/037644.
International Search Report and Written Opinion dated Aug. 12, 2013 for PCT/US2013/037644.
European Search Report dated Mar. 3, 2014 for EP Application No. 11846667.1.
EP Office Action dated Nov. 4, 2013 for EP Application No. 11846667.1.
CN Office Action dated Jun. 2, 2015 in CN Application No. 201180058960.8.
CN Office Action dated Mar. 14, 2016 in CN Application No. 201180058960.8.
CN Office Action dated Nov. 16, 2016 in CN Application No. 201180058960.8.
EP Office Action dated May 18, 2016 for EP Application No. 11846667.1.
European Search Report dated Nov. 7, 2018 for EP Application No. 18182249.5.
TW Office Action dated Oct. 15, 2015 in TW Application No. 100145134.
TW Office Action dated Apr. 11, 2017 in TW Application No. 105129376.
TW Office Action dated Jul. 13, 2018 in TW Application No. 107109673.
TW Decision of Rejection dated Nov. 19, 2018 in TW Application No. 107109673.
International Search Report and Written Opinion dated Jul. 23, 2012, from PCT/US2011/063534.
International Preliminary Report on Patentability dated Jun. 20, 2013, from PCT/US2011/063534.
European Search Report dated Apr. 2, 2015 for EP Application No. 12858168.3.
CN Office Action dated Jun. 3, 2015 in CN Application No. 201280069715.1.
International Preliminary Report on Patentability dated Jun. 26, 2014 from PCT/US2012/068950.
International Search Report and Written Opinion dated Apr. 1, 2013 from PCT/US2012/068950.
International Search Report and Written Opinion dated May 18, 2015 from PCT/US2015/014479.
International Preliminary Report on Patentability dated Mar. 5, 2015 for PCT/US2013/056506.
International Search Report and Written Opinion dated Nov. 22, 2013 for PCT/US2013/056506.
Extended Supplementary European Search Report dated Oct. 11, 2016 for EP Application No. 14782906.3.
European Examination Report dated Jun. 9, 2017 for EP Application No. 14782906.3.
European Office Action dated Jan. 18, 2018 for EP Application No. 14782906.3.
International Preliminary Report on Patentability dated Oct. 22, 2015 for PCT/US2014/033870.
International Search Report and Written Opinion dated Aug. 19, 2014 for PCT/US2014/033870.
International Search Report and Written Opinion dated Apr. 6, 2016 for PCT/US2015/064942.
International Preliminary Report on Patentability dated Jun. 29, 2017 for PCT/US2015/064942.
Ernst, Randi, "Gas Filling of IG Units" by FDR Design, Inc, (undated), 37 pages.
Armstrong, Dave, "Smart, energetic glass could take over" in *Earth Times*, [http://www.earthtimes.org/energy/smart-energetic-glass-take-over/2866/] Apr. 12, 2015.
"'Smart glass' changes colour and produces electricity", ZeeNewsIndia.com [http://zeenews.india.com/news/sci-tech/smart-glass-changes-colour-and-produces-electricity_577561.html] Apr. 12, 2015.
Burdis et al., "Electrochromic windows: Process and fabrication improvements for lower total costs," SAGE Electronics, Inc., Contract No. DE-FC26-03NT41952, Final Report, Technical Report of SciTech Connect, Mar. 31, 2009.
Office Action dated Feb. 7, 2019 in U.S. Appl. No. 15/866,379.
Office Action dated Sep. 5, 2019 in U.S. Appl. No. 15/866,379.
Notice of Allowance dated May 13, 2019 for U.S. Appl. No. 15/868,748.
Notice of Allowance dated Aug. 26, 2019 for U.S. Appl. No. 15/868,748.
U.S. Office Action dated Oct. 9, 2019 in U.S. Appl. No. 15/535,681.
Extended Supplementary European Search Report dated Apr. 17, 2019 for EP Application No. 19150851.4.
U.S. Appl. No. 16/560,805, filed Sep. 4, 2019, Parker et al.
U.S. Office Action dated May 12, 2020 for U.S. Appl. No. 16/560,805.
U.S. Final Office Action dated Mar. 2, 2020 in U.S. Appl. No. 15/535,681.
U.S. Notice of Allowance dated Apr. 16, 2020 in U.S. Appl. No. 15/866,379.
Chinese Office Action dated Feb. 6, 2020 in CN Application No. 201710590055.6.
Canadian Office Action dated Apr. 8, 2020 in CA Application No. 2,871,047.
Canadian Office Action dated May 1, 2020 in CA Application No. 2,909,224.
U.S. Notice of Allowance dated Aug. 27, 2020 for U.S. Appl. No. 16/560,805.
U.S. Office Action dated Jun. 24, 2020 for U.S. Appl. No. 16/359,945.
U.S. Office Action dated Jul. 28, 2020 in U.S. Appl. No. 15/535,681.

(56) References Cited

OTHER PUBLICATIONS

U.S. Appl. No. 16/947,046, filed Jul. 15, 2020, Bhatnagar et al.
Preliminary Amendment dated Sep. 28, 2020 in U.S. Appl. No. 16/947,046.
U.S. Notice of Allowance dated Jan. 22, 2021 in U.S. Appl. No. 15/535,681.
TW Office Action dated Oct. 26, 2020 in TW Application No. 108117502.
U.S. Appl. No. 16/949,961, filed Nov. 20, 2020, Parker et al.
CA Office Action dated Dec. 3, 2021, in Application No. CA2871047.
CN Office Action dated Oct. 9, 2021, in application No. CN201910882490.5 with English translation.
EP Office Action dated Nov. 30, 2021, in Application No. EP18182249.5.

* cited by examiner

Fig. 1B *(Prior Art)*

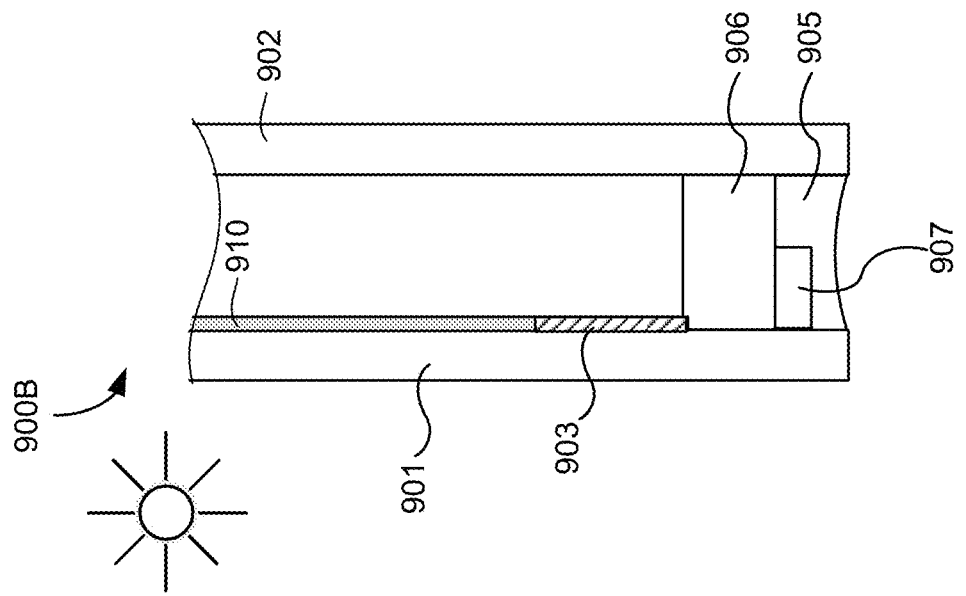

Fig. 10D
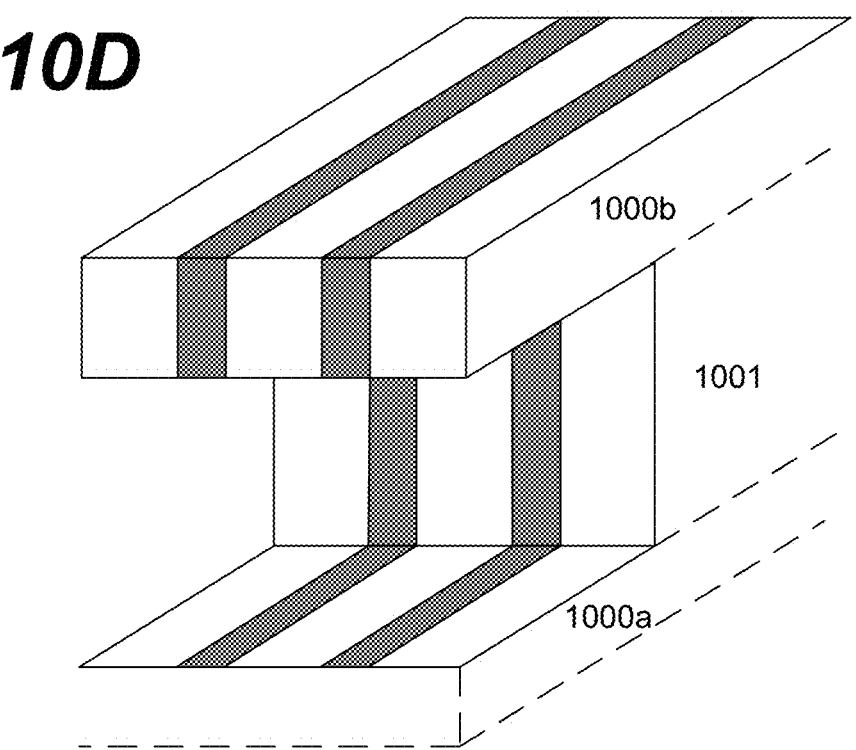
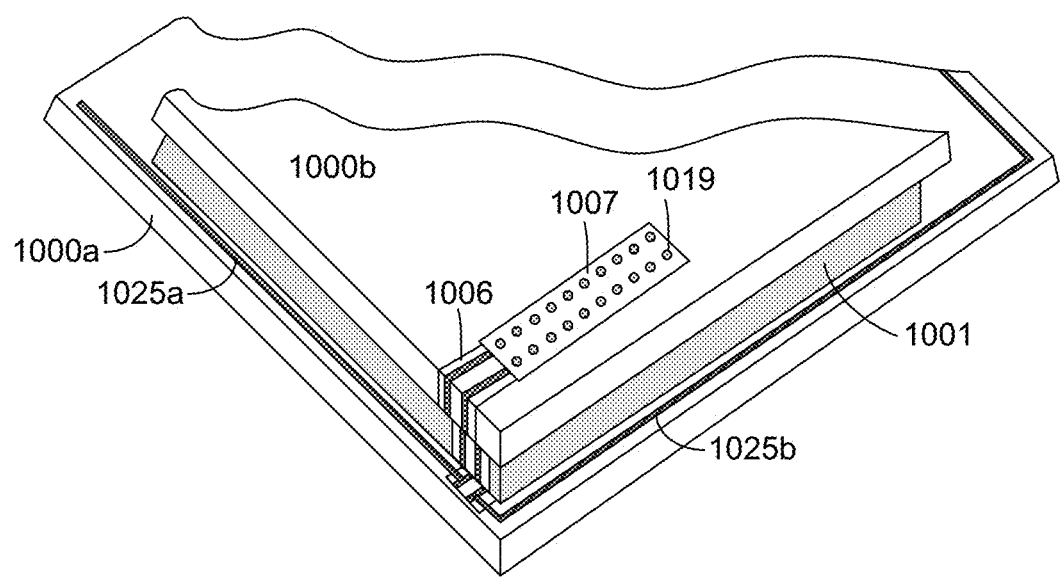
Fig. 10E

LOC ID:   East1    East2    East3    East4    East5
CAN ID:  _____  _____  _____  _____  _____
LITE ID: _____  _____  _____  _____  _____

| NC₁ | |
|---|---|
| CAN ID: XXXX1<br>LITE ID: YYYY1 | LOC ID_____ |
| ⋮ | |
| CAN ID: XXXXm<br>LITE ID: YYYYm | LOC ID_____ |

*Fig. 14E*

| LOC ID: | East1 | East2 | East3 | East4 | East5 |
|---|---|---|---|---|---|
| CAN ID: | | | | | XXXX1 |
| LITE ID: | | | | | YYYY1 |

NC₁

CAN ID: XXXX1
LITE ID: YYYY1      LOC ID: East 5

⋮

CAN ID: XXXXm
LITE ID: YYYYm      LOC ID ____

*Fig. 14G*

SELF-CONTAINED EC IGU

INCORPORATION BY REFERENCE

An Application Data Sheet is filed concurrently with this specification as part of the present application. Each application that the present application claims benefit of or priority to as identified in the concurrently filed Application Data Sheet is incorporated by reference herein in its entirety and for all purposes.

FIELD

The invention relates to electrochromic devices, more particularly to controllers and associated components, systems and networks for electrochromic windows.

BACKGROUND

Electrochromism is a phenomenon in which a material exhibits a reversible electrochemically-mediated change in an optical property when placed in a different electronic state, typically by being subjected to a voltage change. The optical property is typically one or more of color, transmittance, absorbance, and reflectance.

Electrochromic materials may be incorporated into, for example, windows for home, commercial and other uses as thin film coatings on the window glass. The color, transmittance, absorbance, and/or reflectance of such windows may be changed by inducing a change in the electrochromic material, for example, electrochromic windows are windows that can be darkened or lightened electronically. A small voltage applied to an electrochromic device (EC) of the window will cause them to darken; reversing the voltage polarity causes them to lighten. This capability allows control of the amount of light that passes through the windows, and presents an opportunity for electrochromic windows to be used as energy-saving devices.

While electrochromism was discovered in the 1960's, EC devices, and particularly EC windows, still unfortunately suffer various problems and have not begun to realize their full commercial potential despite many recent advancements in EC technology, apparatus and related methods of making and/or using EC devices. For example, there still remain issues with hard wiring EC windows into a building. It would therefore be beneficial to have EC windows that do not require hard wiring, i.e., where wiring is optional and if present, the wiring is less complex than current systems.

SUMMARY

"Localized" controllers for EC windows are described. In some embodiments, a localized controller is an "onboard" or "in situ" controller, where the window controller is part of a window assembly and thus does not have to be matched with a window and installed in the field. Additionally, communication networks and power distribution systems designed for interfacing with localized controllers in a building provide various benefits. For example, some embodiments eliminate the problematic issue of varying wire length from EC window to controller in conventional systems. In some embodiments, a localized controller is incorporated into or onto the IGU and/or the window frame prior to installation. Also described are mesh networks for communicating between electrochromic windows, auto-configuration of electrochromic windows, as well as various features related to power generation, power connections, communication, mapping, and information related to sensors, tracking, learning, etc. The various features described herein are particularly useful in designing easy to install and easy to operate electrochromic windows.

Various embodiments herein relate to electrochromic IGUs, networks of electrochromic IGUs, and methods of manufacturing electrochromic IGUs. In many embodiments, an electrochromic IGU may include an in situ controller.

In one aspect of the disclosed embodiments, an insulated glass unit (IGU) is provided, including: at least one electrochromic lite oriented in a first plane; at least one additional lite oriented in a second plane parallel to the first plane; a sealing separator positioned between the electrochromic lite and the additional pane; and a window controller including logic configured to control the at least one electrochromic pane, where the window controller is mounted between the first plane and the second plane on at least one of the electrochromic pane, the additional pane, and/or the sealing separator.

In certain embodiments, the window controller is accessible through the electrochromic lite and/or the additional lite without uninstalling or deconstructing the IGU. In some such cases, the electrochromic lite and/or additional lite include a notch or cutout shaped to allow access to the window controller. For example, the IGU may include a viewable area surrounded by a perimeter region, the perimeter region designed to fit within a frame, and the window controller and the notch or cutout may be positioned at least partially within the viewable area of the IGU. The window controller may be removably mounted to the electrochromic lite and/or the additional pane. In some cases, the notch or cutout is shaped such that the window controller may pass through the notch or cutout when the IGU is installed in a frame. In various implementations, the sealing separator defines an interior region of the IGU that is sealed off from the ambient environment, the interior region of the IGU located interior of the sealing separator and between the electrochromic lite and the additional pane, and the window controller is positioned proximate the notch or cutout and is exposed to the ambient environment. The IGU may further include a second sealing separator positioned proximate the cutout, where the sealing separator and second sealing separator together define an interior region of the IGU that is sealed off from the ambient environment, the interior region of the IGU located interior of the sealing separator, outside of the second sealing separator, and between the electrochromic lite and the additional pane, where the window controller is positioned proximate the cutout and is exposed to the ambient environment.

In some embodiments, the IGU further includes a mechanism for receiving wireless power and/or generating power such that the IGU does not require external wires for providing power to the IGU. The mechanism for generating power may include a photovoltaic panel, a thermoelectric generator, a battery, or a combination thereof.

The window controller may be capable of communicating with a second controller through wireless communication. In some such cases, the window controller may be configured to operate in a self-meshing network. The window controller may be configured to sense one or more nearby IGUs and receive data from the nearby IGUs to thereby generate a map of all IGUs on the self-meshing network. Wireless power delivery may also be used in certain embodiments. The IGU may further include a wireless power transmitter for delivering power from the IGU to a nearby IGU on the self-meshing network. The IGU may also include a wireless power receiver for receiving power from nearby IGUs on the self-meshing network.

In another aspect of the disclosed embodiments, a network of electrochromic windows is provided, the network including: a plurality of electrochromic windows, each electrochromic window including at least one electrochromic pane, at least one additional pane, a sealing separator positioned between the electrochromic lite and the additional pane, and a window controller positioned on the electrochromic pane or as part of an assembly of the electrochromic window, the window controller including logic for controlling the electrochromic lite and communication logic for wirelessly communicating with other electrochromic windows on a self-meshing network. Other embodiments include a self-meshing network of electrochromic windows, whether or not the controller is onboard or part of the electrochromic window assembly.

In some embodiments, each electrochromic window is capable of sensing nearby electrochromic windows on the self-meshing network to generate relative position data, and at least one controller on the network is configured to process the relative position data to generate a map showing the relative physical locations of the electrochromic windows on the self-meshing network. In some such cases, at least one controller on the self-meshing network may be configured to receive global positioning system (GPS) data related to at least one electrochromic window on the self-meshing network, and the at least one controller may be configured to generate a map showing the absolute physical locations of the electrochromic windows on the self-meshing network based on the global positioning system data and the relative position data.

In certain implementations, at least one of the electrochromic windows on the self-meshing network may further include a GPS sensor for generating GPS data. In these or other cases, at least one of the electrochromic windows on the self-meshing network may further include a compass for generating compass data, and the relative position data may include at least the compass data. At least one of the electrochromic windows on the self-meshing network may include an exterior light sensor and associated logic for generating sun tracking data, and the relative position data may include at least the sun tracking data. As mentioned, the electrochromic windows may transfer power and/or communication wirelessly. In some embodiments, at least one of the electrochromic windows on the self-meshing network includes a wireless power transmitter for wirelessly distributing power to other electrochromic windows on the self-meshing network.

The window controller may be provided at a variety of positions and using a variety of configurations as presented herein. In one embodiment, the window controller of at least one of the electrochromic windows on the network is positioned on the electrochromic lite and/or the additional pane, between a first plane corresponding to the electrochromic lite and a second plane corresponding to the additional pane. In some such cases, the window controller of the at least one electrochromic window on the self-meshing network may be positioned within a viewable area of the electrochromic window, and may be accessible through a notch or cutout on the electrochromic lite or additional lite without uninstalling or deconstructing the electrochromic window. In another embodiment, the window controller may be provided with the electrochromic lite or additional lite, but not between these lites. The controller may be on one lite of a laminate construction, either the electrochromic lite or the mate lite of the laminate. The controller may be in a frame that holds the laminate or an IGU, where the frame is part of the window assembly; that is, the frame is not part of a building's framing system or curtain wall, but is a component of a self-contained window assembly. Such a window assembly may itself fit into traditional framing systems for windows, such as curtain walls and the like.

In a further aspect of the disclosed embodiments, an insulated glass unit (IGU) is provided, the IGU including: at least one electrochromic lite oriented in a first plane; at least one additional lite oriented in a second plane parallel to the first plane; a sealing separator positioned between the electrochromic lite and the additional pane; a sealed interior region between the electrochromic lite and the additional pane, where a perimeter of the sealed region is defined by the sealing separator; and a window controller including logic configured to control the at least one electrochromic pane, where the window controller is positioned between the first plane and the second plane, where the window controller is not positioned within the sealed interior region, and where the window controller is physically accessible by an installer during installation of the IGU.

In yet another aspect of the disclosed embodiments, an insulated glass unit (IGU) is provided, including: an electrochromic lite including: a transparent substrate, an electrochromic device positioned on the transparent substrate, and bus bars for driving an optical transition on the electrochromic device; an additional lite oriented parallel to the electrochromic lite; a spacer positioned between the electrochromic lite and the additional lite; a dock positioned on either the electrochromic lite or on the additional lite, where the dock is configured to secure a carrier onto the electrochromic lite or the additional lite, the carrier including at least one component for controlling optical transitions on the electrochromic device.

In certain implementations, the IGU further includes one or more electrical connections for delivering power from (a) either the dock or the carrier to (b) the bus bars on the electrochromic lite. The dock may be positioned on the additional lite in some cases, while in other cases the dock may be positioned on the electrochromic lite.

The electrical connections can take many forms. In some embodiments, the one or more electrical connections for delivering power from (a) either the dock or the carrier to (b) the bus bars on the electrochromic lite may include flexible tape with conductive lines provided thereon, the flexible tape extending around an edge of the lite on which the dock is positioned. In these or other embodiments, the one or more electrical connections for delivering power from (a) either the dock or the carrier to (b) the bus bars on the electrochromic lite may include a clip that secures around an edge of the lite on which the dock is positioned, the clip including conductive lines for delivering power. In some cases, the one or more electrical connections for delivering power from (a) either the dock or the carrier to (b) bus bars on the electrochromic lite may include flexible tape with conductive lines provided thereon, the flexible tape extending around an edge of the additional lite, proximate the spacer, and onto the electrochromic lite. In these or other cases, the one or more electrical connections for delivering power from (a) either the dock or the carrier to (b) the bus bars on the electrochromic lite may include a clip that secures around an edge of the additional lite, the clip including conductive lines for delivering power, the IGU further including one or more electrical connections for delivering power between the clip and the bus bars on the electrochromic lite. In certain implementations, the one or more electrical connections for delivering power from (a) either the dock or the carrier to (b) the bus bars on the electrochromic lite provide temporary electrical connections. In some cases, the one or more electrical connections for delivering power between the clip and the bus bars on the electrochromic lite may include: (i) a block of material including conductive lines, the block of material being positioned between the electrochromic lite and the additional lite, or (ii) a wire attached to and positioned between the electrochromic lite and the additional lite. A secondary seal material may be positioned proximate a periphery of the IGU in some cases, between the electrochromic lite and the additional lite, peripherally exterior of the spacer, and at least partially peripherally exterior of the electrical connections for delivering power from (a) either the dock or the carrier to (b) bus bars on the electrochromic lite.

A number of different types of docks may be used. For example, the dock may be a socket into which the carrier fits. In some other cases, the dock may be a base onto which the carrier fits. In some embodiments, the IGU further includes the carrier. The carrier may lock into the dock such that it can only be removed from the dock by an authorized person. In some implementations, the dock may be configured to receive power from a wired power source. In some such implementations, the IGU further includes the carrier, and the carrier may receive power from the dock. In these or other embodiments, the carrier may be configured to receive power from a wired power source.

In certain implementations, the IGU further includes the carrier, where the carrier includes an electrical connection structure configured to deliver power either (i) to the dock, or (ii) through the dock, to a component positioned between the dock and the lite on which the dock is positioned. The electrical connection structure may deliver power to an electrical connection that delivers power from (a) a surface on the electrochromic lite or on the additional lite on which the dock is positioned to (b) a different surface on the electrochromic lite or on the additional lite, the electrical connection serving to directly or indirectly provide power to bus bars on the electrochromic lite. The electrical connection structure may deliver power to a component of an antenna that is patterned onto the lite on which the dock is positioned. In some embodiments, the electrical connection structure is a pogo pin. In one embodiment, the IGU further includes a photovoltaic film provided on either the electrochromic lite or on the additional lite, where the pogo pin transfers power via an electrical connection that delivers power between (a) a surface on the electrochromic lite or on the additional lite on which the dock is positioned, and (b) a different surface on the electrochromic lite or on the additional lite, the electrical connection serving to directly or indirectly deliver power from the photovoltaic film to the dock or carrier.

In one embodiment, the IGU further includes the carrier, where the carrier includes a photosensor for sensing exterior light levels, and where the dock includes a perforation through which the photosensor measures the exterior light levels, where the dock, carrier, and photosensor are positioned such that the photosensor has a clear line of sight through the electrochromic lite and the additional lite. The carrier may include a photosensor for sensing interior light levels in some cases. In certain embodiments, the electrochromic lite includes a connection point where power to both bus bars is delivered to the electrochromic lite, the electrochromic lite further including conductive lines printed thereon to provide an electrical connection between the connection point on the electrochromic lite and the bus bars on the electrochromic lite. In some embodiments, multiple connection points are provided such that the dock and carrier can be positioned at a number of different locations on the IGU.

The IGU may have a number of different configurations. In some embodiments, the electrochromic lite may be positioned outboard of the additional lite, and the dock may be positioned on the additional lite such that it is accessible to a person standing in a building in which the IGU is installed. A frame may also be provided, for example surrounding a periphery of the IGU, where the frame includes a perforation positioned proximate the dock, and where an electrical connection passes through the perforation in the frame to bring power to either the dock or the carrier. In some cases, a cover is provided over the dock, where the cover extends no more than about 0.1 inches from a surface on which the dock is positioned. The IGU may further include a memory component storing information about the IGU, where the memory component is provided either (i) in the dock, or (ii) in the carrier.

These and other features and advantages will be described in further detail below, with reference to the associated drawings.

BRIEF DESCRIPTION OF THE DRAWINGS

The following detailed description can be more fully understood when considered in conjunction with the drawings in which:

FIG. 1B depicts a conventional wiring scheme for EC window controllers.

FIGS. 9A-9F show embodiments of an IGU having an integrated photosensor according to certain embodiments.

FIG. 10D depicts a conductive tape that may be used in some embodiments.

FIGS. 10E and 10F illustrate a portion of an IGU having a dock and/or controller installed on an inboard pane of the IGU.

FIGS. 14E and 14G depict example graphical user interfaces that may be used for commissioning electrochromic windows using the method of FIG. 14A.

DETAILED DESCRIPTION

Figure 1A:
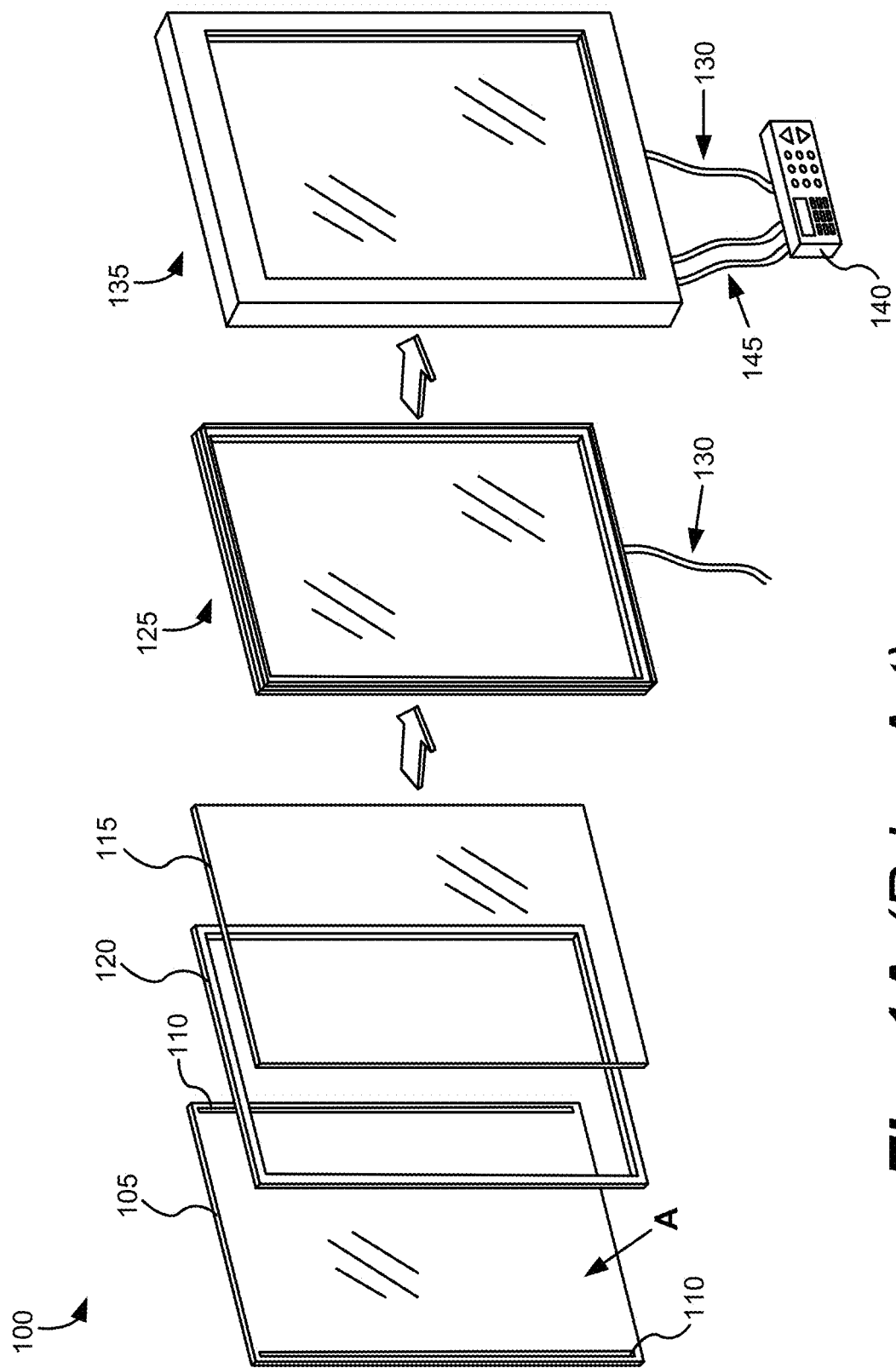
FIG. 1A depicts conventional fabrication of an IGU including an EC lite and incorporation into a window assembly.

Electrochromic windows may be used in a variety of settings, for example in office buildings and residential buildings. The complexity of many conventional electrochromic windows (e.g., wiring, installation and programming of a controller, etc.) may discourage their use. For example, residential customers are likely to have windows installed by local contractors who may be unfamiliar with electrochromic windows and their installation requirements. As such, one goal in certain disclosed embodiments is to provide electrochromic IGUs and window assemblies that are as easy to install as non-electrochromic windows. Certain disclosed features that promote easy installation include wireless power capability and/or self-power capability, wireless control communication, self-meshing networks, on-board controllers, and a form factor matching commonly available windows, e.g., double-pane or triple-pane IGUs. Other features that may be included in various embodiments include, but are not limited to, cellular or other antennae provided on a window, a cellular repeater in a controller, touch panel controls, mountable/removable controllers, learning functionality, weather tracking, sharing of sensor outputs and other control information between windows, sub-frames that may include certain controller components, wireless bus bars, built-in photo sensors and other sensors, etc. Any two or more of these features may be combined as desired for a particular application.

In some embodiments, an IGU or other window assembly is provided as a simple, self-contained, ready-to-go unit that requires at most minimal physical connection (e.g., wires) before use. Such a unit might look like a non-electrochromic IGU or window assembly (with a controller somewhere therein or thereon) and be installed in substantially the same manner as a conventional IGU. These embodiments are particularly beneficial for residential customers who desire a quick install without significant additional work related to routing electrical power, communication lines, etc.

Electrochromic Windows and Localized Window Controllers

An "in situ" controller, as described herein, is a window controller that is associated with, and controls, a single EC window. Typically the controller will be attached to glass of an IGU or laminate but may be in a frame that houses the IGU or laminate. An EC window may include one, two, three or more individual EC panes (an EC device on a transparent substrate). Also, an individual pane of an EC window may have an EC coating that has independently tintable zones. A controller as described herein can control all EC coatings associated with that window, whether the EC coating is monolithic or zoned. As used herein, the terms pane, lite, and substrate are used interchangeably. An EC window may be in the form of an IGU, a laminate structure or both, i.e., where an IGU has one or more laminated panes as its lites, e.g., a double pane IGU where one pane is a single sheet of glass and the other pane is a laminate of two sheets of glass. A laminate may have two, three or more sheets of glass.

The controller is generally configured in close proximity to the EC window, generally adjacent to, on the glass or inside an IGU, within a frame of the self-contained assembly, for example. In some embodiments, the window controller is an "in situ" controller; that is, the controller is part of a window assembly, an IGU or a laminate, and may not have to be matched with the EC window, and installed, in the field, e.g., the controller travels with the window as part of the assembly from the factory. The controller may be installed in the window frame of a window assembly, or be part of an IGU or laminate assembly, for example, mounted on or between panes of the IGU or on a pane of a laminate. In some embodiments, a localized controller may be provided as more than one part, with at least one part (e.g., including a memory component storing information about the associated EC window) being provided as a part of the window assembly and at least one other part being separate and configured to mate with the at least one part that is part of the window assembly, IGU or laminate. In certain embodiments, a controller may be an assembly of interconnected parts that are not in a single housing, but rather spaced apart, e.g., in the secondary seal of an IGU. In other embodiments the controller is a compact unit, e.g., in a single housing or in two or more components that combine, e.g., a dock and housing assembly, that is proximate the glass, not in the viewable area, or mounted on the glass in the viewable area.

It should be understood that while the disclosed embodiments focus on electrochromic windows, the concepts may apply to other types of switchable optical devices such as liquid crystal devices and suspended particle devices.

Certain window controllers described herein have a number of advantages because they are matched to the IGU containing one or more EC devices. In one embodiment, the controller is incorporated into or onto the IGU and/or the window frame prior to installation of the EC window. In one embodiment, the controller is incorporated into or onto the IGU and/or the window frame prior to leaving the manufacturing facility. In one embodiment, the controller is incorporated into the IGU, substantially within the secondary seal. In another embodiment, the controller is incorporated into or onto the IGU, partially, substantially, or wholly within a perimeter defined by the primary seal between the sealing separator and the substrate.

Having the controller as part of an IGU and/or a window assembly, the IGU can be characterized using logic and features of the controller that e.g., travels with the IGU or window unit. For example, when a controller is part of the IGU assembly, in the event the characteristics of the EC device(s) change over time, this characterization function can be used, for example, to redirect into which product the IGU will be incorporated. In another example, if already installed in an EC window unit, the logic and features of the controller can be used to calibrate the control parameters to match the intended installation, and for example if already installed, the control parameters can be recalibrated to match the performance characteristics of the EC pane(s).

In other embodiments, a particular controller is not pre-associated with a window, but rather a dock component, e.g., having parts generic to any EC window, is associated with each window at the factory. After window installation, or otherwise in the field, a second component of the controller is combined with the dock component to complete the EC window controller assembly. The dock component may include a chip which is programmed at the factory with the physical characteristics and parameters of the particular window to which the dock is attached (e.g., on the surface which will face the building's interior after installation, sometimes referred to as surface 4 or "S4"). The second component (sometimes called a "carrier," "casing," "housing," or "controller") is mated with the dock, and when powered, the second component can read the chip and configure itself to power the window according to the particular characteristics and parameters stored on the chip. In this way, the shipped window need only have its associated parameters stored on a chip, which is integral with the window, while the more sophisticated circuitry and components can be combined later (e.g., shipped separately and installed by the window manufacturer after the glazier has installed the windows, followed by commissioning by the window manufacturer). Various embodiments will be described in more detail below.

In this application, an "IGU" includes two (or more) substantially transparent substrates, for example, two panes of glass, where at least one substrate includes an EC device disposed thereon, and the panes have a separator disposed between them. An IGU is typically hermetically sealed, having an interior region that is isolated from the ambient environment. A "window assembly" may include an IGU or for example a stand-alone laminate, and includes electrical leads for connecting the IGU's or laminate's one or more EC devices to a voltage source, switches and the like, and may include a frame that supports the IGU or laminate. A window assembly may include a window controller as described herein, and/or components of a window controller (e.g., a dock).

As used herein, the term outboard means closer to the outside environment, while the term inboard means closer to the interior of a building. For example, in the case of an IGU having two panes, the pane located closer to the outside environment is referred to as the outboard pane or outer pane, while the pane located closer to the inside of the building is referred to as the inboard pane or inner pane. The different surfaces of the IGU may be referred to as S1, S2, S3, and S4 (assuming a two-pane IGU). S1 refers to the exterior-facing surface of the outboard lite (i.e., the surface that can be physically touched by someone standing outside). S2 refers to the interior-facing surface of the outboard lite. S3 refers to the exterior-facing surface of the inboard lite. S4 refers to the interior-facing surface of the inboard lite (i.e., the surface that can be physically touched by someone standing inside the building). In other words, the surfaces are labeled S1-S4, starting from the outermost surface of the IGU and counting inwards. In cases where an IGU includes three panes, this same trend holds (with S6 being the surface that can be physically touched by someone standing inside the building). For context, a discussion of conventional window controller technology follows.

FIG. 1A depicts an EC window fabrication and control procedure, 100. An EC pane, 105, having an EC device (not shown, but for example on surface A) and bus bars, 110, which power the EC device, is matched with another glass pane, 115 (either or both of 110 and 115 may themselves be laminate structures). During fabrication of IGU, 125, a separator, 120, is sandwiched in between and registered with substrates 105 and 115. The IGU 125 has an associated interior space defined by the faces of the substrates in contact with separator 120 and the interior surfaces of the separator. Separator 110 is typically a sealing separator, that is, includes a spacer and sealing between the spacer and each substrate where they adjoin in order to hermetically seal the interior region and thus protect the interior from moisture and the like. Typically, once the glass panes are sealed to the separator, secondary sealing may be applied around the perimeter edges of the IGU in order to impart further sealing from the ambient, as well as further structural integrity to the IGU. The IGU 125 must be wired to a controller via wires, 130. In this example, the IGU is supported by a frame to create a window assembly, 135. Window assembly 135 is connected, via wires 130, to a controller, 140. Controller 140 may also be connected to one or more sensors in the frame via communication lines 145.

As depicted in FIG. 1A, conventional EC window controllers are not in situ, that is, they are not mounted on or otherwise part of the window assembly and are therefore installed outside of the IGU and/or window assembly (or not attached to a stand-alone laminate) and/or not in the frame. Also, conventional window controllers have more associated wiring parts to ship from the manufacturer to the installation site, and this has associated tracking pitfalls such as mismatching of window, associated controller, and cabling. Mismatched controller and window can cause installation delays and damage to the controller and/or IGU. All these factors contribute to higher cost of EC windows. Also, since conventional controllers are remotely located, often with long and differing lengths of low voltage (e.g., less than 10v DC) wiring and thus are wired to one or more EC windows as part of the installation of the EC windows.

Referring to an embodiment herein, an in situ controller may be in a frame that holds the laminate or an IGU, where the frame is part of the window assembly; that is, the frame is not part of a building's framing system or curtain wall, but is a component of a self-contained window assembly. Such a window assembly may itself fit into traditional framing systems for windows, such as curtain walls and the like. The assembly is akin to that depicted in FIG. 1A, but with a clear distinction in that the controller is inside the frame of the assembly and is thus part of a self-contained unit. The frame is part of the assembly that is fabricated as the end product. The framed window assembly is then installed into a glazing pocket or curtain wall in the same manner that traditional IGUs would be installed. The frame may be very thin and therefore the overall dimensions of the assembly are similar to a conventional IGU without such a frame.

Referring to FIG. 1B, controllers 140 each control an EC window 135. Typically the controllers are located proximate to a single location and so low voltage wiring 130 is of varying length. This is true even if only one controller controls multiple windows. There are associated current drop offs and losses due to this long wiring. Also, since the controller is located remotely, any control feedback or diagnostic sensors mounted in the window assembly require separate wiring to be run to the controller-increasing cost and complexity of installation. Also, any identification numbers on the IGU are hidden by the frame and may not be easily accessible, which makes it problematic to check IGU information checking warranty or other vendor information.

In one embodiment, localized controllers are installed as part of framing materials that will serve, at least partially, as the frame for the EC window, where the IGU's or laminates are installed into the framing. Thus, one embodiment is a method of installing an EC window and associated controller into a wall, the method including (a) installing the associated controller unit into a wall, and (b) installing either an EC window unit which includes a window frame of the EC window, or installing an IGU or laminate, where the wall framing serves as the frame for the EC window.

In one embodiment, controllers described herein are part of a window assembly. One embodiment is a window assembly including: a substantially transparent substrate having an electrochromic device disposed thereon; and a controller as part of the window assembly for providing optical switching control for the electrochromic device. In one embodiment, the window assembly further includes: a second substantially transparent substrate; and a sealing separator between the first and second substantially transparent substrates, which sealing separator defines, together with the first and second substantially transparent substrates, an interior region that is thermally insulating. In one embodiment, the controller is embedded in or affixed to the sealing separator. In another embodiment, the controller is attached to one of the first and second substantially transparent substrates. In one embodiment, the controller includes control logic for directing electrochromic device to switch between three or more optical states. In one embodiment, the controller is configured to prevent the electrochromic device from being connected to in a reverse polarity mode to an external power source. In one embodiment, the controller is configured to be powered by a source delivering between about 2 and 10 volts. There can be included in the window assembly, supply lines for delivering both power and communications to the controller or only power where the controller includes wireless communication capability.

In one embodiment, the window assembly includes an IGU with at least one EC pane; and a window controller configured to control the at least one EC lite of the IGU of the window assembly. In some embodiments, the window controller is not positioned within the viewable area of the IGU. In other embodiments, the window controller is positioned fully or partially in the viewable area of the IGU. In one embodiment, the window controller is positioned outside of the primary seal of the IGU. The controller could be in the window frame and/or in between the panes of the IGU or on an outer surface of one of the panes of the IGU. In one embodiment, the window controller is positioned at least partially between the individual panes of the IGU, outside of the primary seal. In one embodiment, the window controller may span a distance from a point between the two panes of the IGU and a point beyond the panes, for example, so that the portion that extends beyond the panes resides in, at least partially, the frame of the window assembly.

In one embodiment, the window controller is between and does not extend beyond the individual panes of the IGU. In this configuration, the window controller can be, for example, wired to the EC device(s) of the EC panes of the IGU and included in the secondary sealing of the IGU. This incorporates the window controller into the secondary seal; although it may be partially exposed to the ambient for wiring purposes. In one embodiment, the controller may only need a power socket exposed, and thus be "plugged in" to a low voltage source (for example a 24v source) because the controller communicates otherwise via wireless technology and/or through the power lines (e.g., like Ethernet over power lines). In another embodiment, a dock may be provided in the secondary seal and the controller (or one or more components typically found in a controller such as a chip storing parameters relevant to the associated electrochromic window) may be inserted into the dock, like a cartridge. The wiring from the controller to the EC device, for example between 2v and 10v, is minimized due to the proximity of the controller to the EC device.

In some embodiments, the controller is incorporated into the IGU, partially, substantially, or wholly within a perimeter defined by the primary seal between the sealing separator and the substrate. Similarly, in some embodiments, an IGU includes a memory component that is programmed with instructions to control the electrochromic device of the IGU, where the memory component is positioned partially, substantially, or wholly within the perimeter defined by the primary seal. In some implementations, the IGU contains a memory element that stores information other than controller instructions; such information may describe characteristics of the window, the electrochromic device, the localized controller, or other information pertinent to the operation of the window.

In some cases, the controller is positioned fully or partially within a spacer. For example, the controller may be provided within the hollow interior of a spacer, or within a spacer key (e.g., within the hollow interior of a spacer key) that attaches two ends of a spacer together. The spacer key having the controller therein can then be popped into the spacer and installed in an IGU. The controller may have certain components that extend beyond the edge of a spacer key into the spacer, or the controller may be substantially within the spacer key. In one example, the controller is wholly within the spacer key, and no part of the controller extends beyond the edges of the spacer key. In another embodiment, a controller is embedded in a foam spacer. In such cases, the controller may not be visible when looking at the foam spacer (e.g., the controller is completely encapsulated by foam). Examples of spacers and spacer keys that may be modified to include a controller are further discussed in U.S. Pat. No. 8,711,465, titled "SPACERS FOR INSULATED GLASS UNITS," which is herein incorporated by reference in its entirety. In various cases where the controller is at least partially within the perimeter defined by the primary seal, the controller does not extend past the edges of the panes of the IGU. One advantage of having a controller wholly within the perimeter defined by the primary seal is that the controller is protected from the elements.

A controller may itself have a sealing component in some embodiments. For instance, a sealing material may be placed on one or more sides of a controller, such sealing material/sides mating with one or more of the panes of the IGU. In one embodiment, a dock may reside between the panes of an IGU, and may have sealing material where the dock mates with the glass panes. In some such cases, the controller (or various components thereof) may be provided as a cartridge that inserts into the dock in between the glass panes. The controller may extend beyond the edges of the glass panes, or not. In one embodiment, a controller (or dock as described herein) has a height (thickness) that is nearly the distance between the panes of the IGU, the remaining distance being occupied by sealant on both sides of the controller (or dock).

As used herein, the term controller refers to the logical hardware and/or software for controlling and powering window transitions, and for communicating with other components on a network and/or communicating with power supplies. The various components of the controller may be provided together in a single controller unit in some cases, while in other cases one or more controller components may be provided separately from the others, sometimes in a different piece of hardware.

In a number of embodiments, the controller may be provided in a carrier (sometimes referred to as a casing or housing) that interfaces and/or mates with a dock positioned somewhere on the window assembly, for example in a socket or on a base. A dock may be mounted on or near the window assembly to provide a convenient configuration for attaching the carrier, which often houses some or all of the components of the controller. In certain implementations, the dock is a piece of plastic or other material that is sized and located to hold and/or lock the carrier at an appropriate location on or near the IGU. The dock serves as a positioning element for the carrier on the window, and may also facilitate an electrical connection between the carrier and bus bars of the electrochromic device. The dock may include the aforementioned chip or memory containing physical characteristics or other parameters of the EC window to which it is associated (such characteristics/parameters are typically programmed into the chip/memory at the factory in which the EC window is fabricated).

Figure 10A:
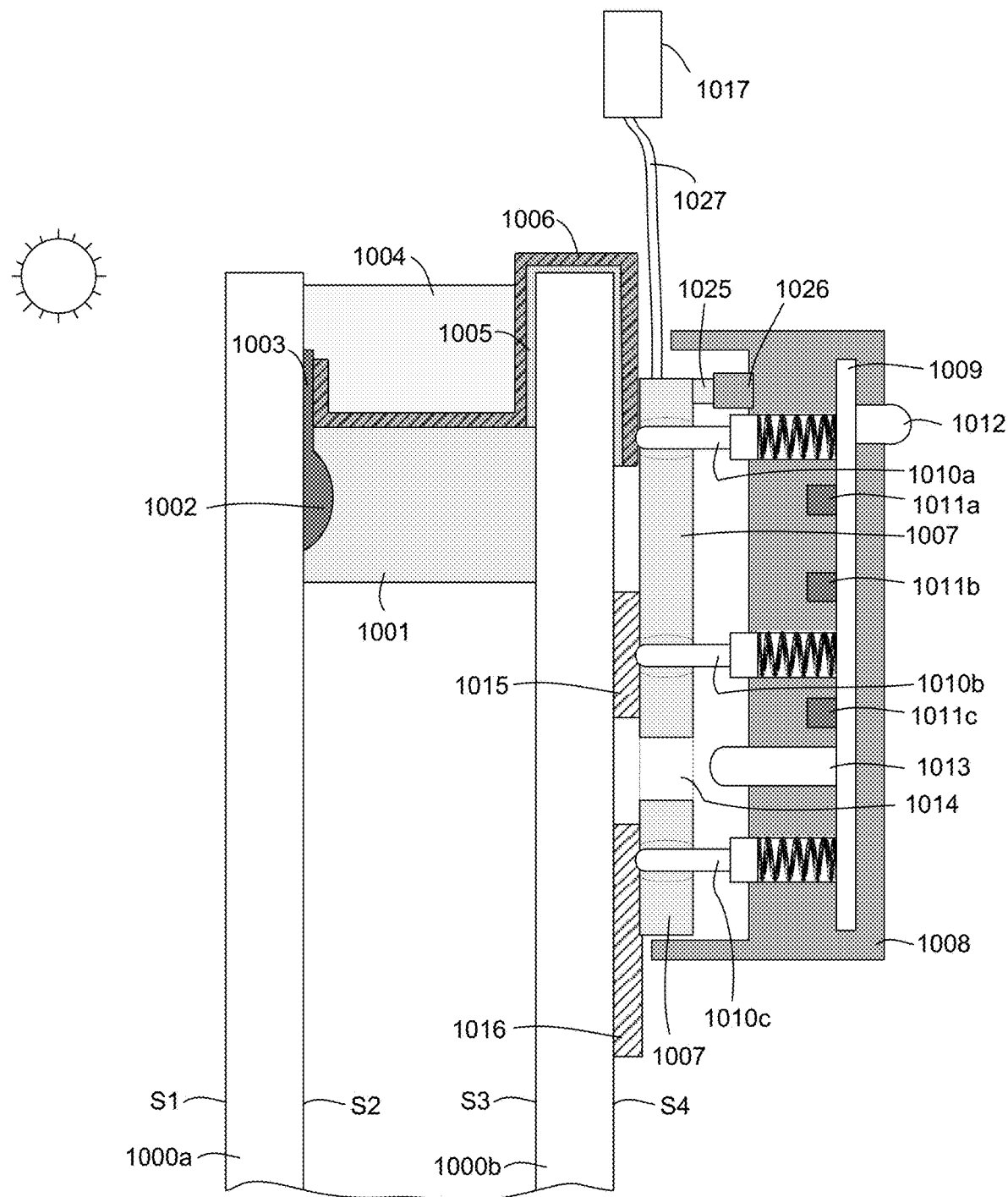
FIGS. 10A-10C depict embodiments of an IGU having a controller mounted on a dock on an inboard pane of the IGU.
Figure 10B:
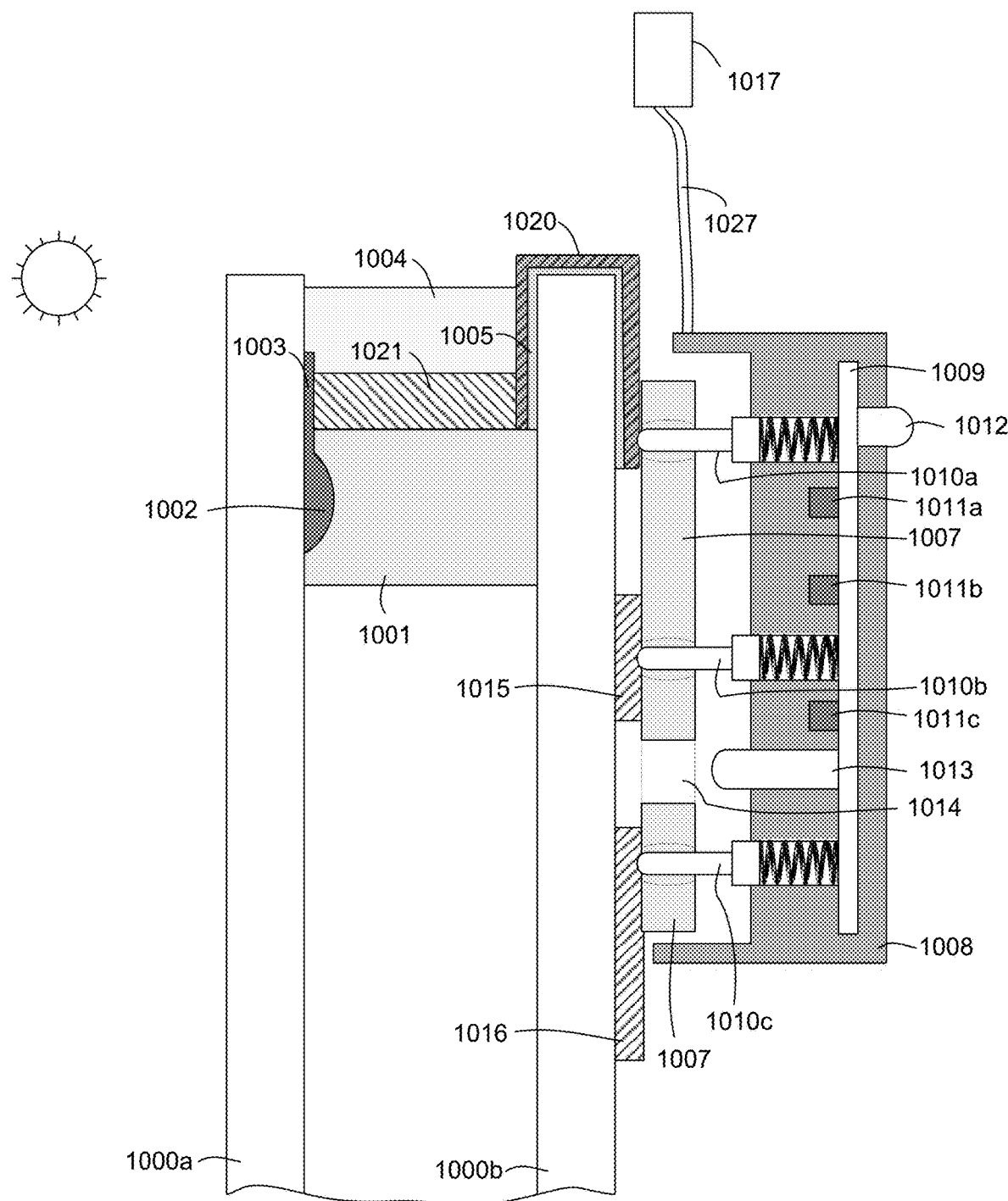
Figure 10C:
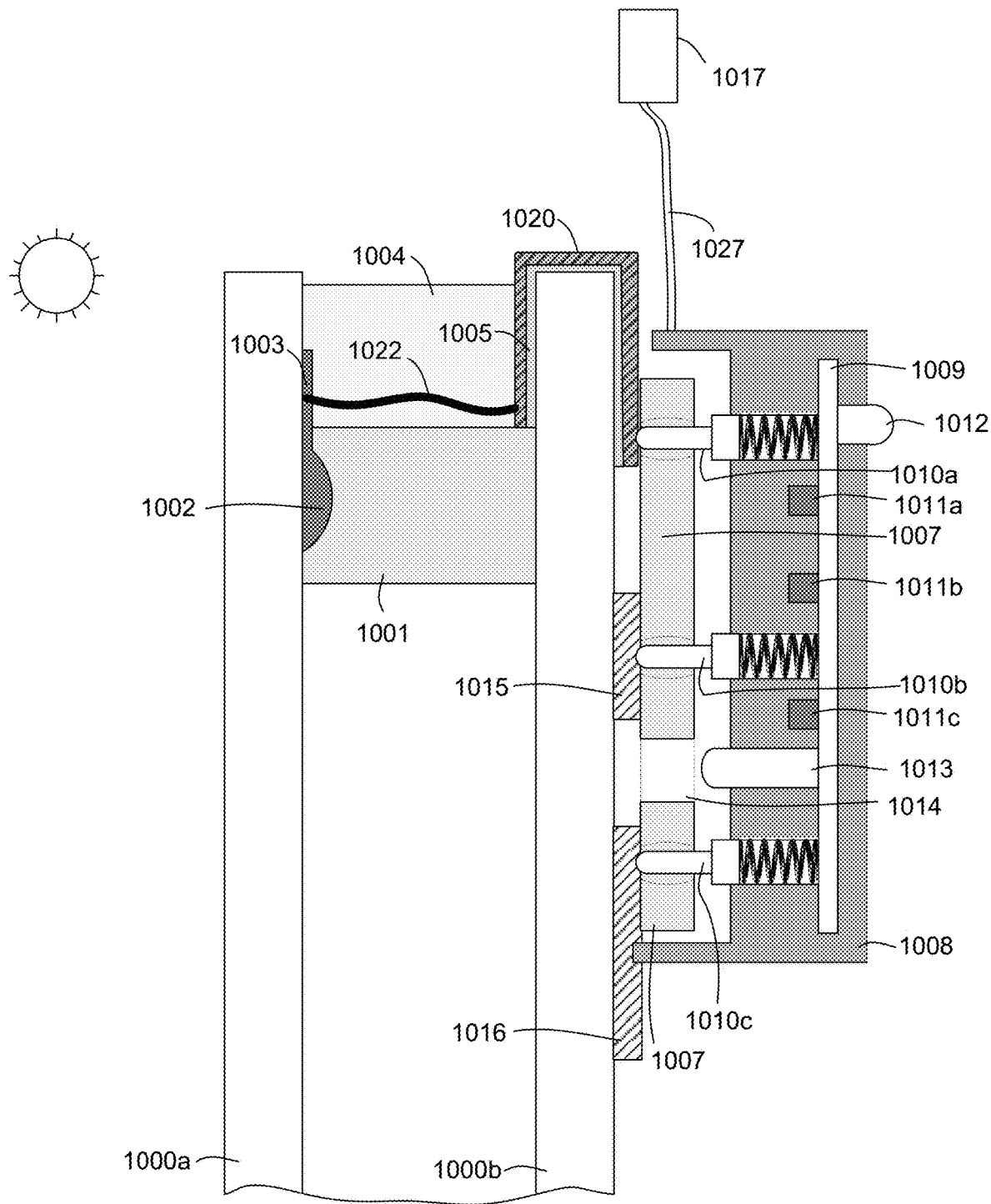

As mentioned, the dock may be a socket or a base in some embodiments. A socket may be a housing or frame into which the carrier may be inserted and removed. Similarly, a base may be a piece of hardware onto which the controller may be installed. In various cases, a base may engage with a carrier on only the back side of the carrier. In one embodiment, a base will have a smaller footprint (area on the window or other surface on which it is mounted) than a carrier, and a carrier will essentially surround the base such that the base is not visible when the carrier is mated with the base. A socket may engage with a carrier on additional sides of the carrier, supporting the carrier at its periphery. A socket may have a larger or smaller footprint than a carrier. In many cases, a socket may be at least partially visible when the carrier is installed in the socket. FIG. 10H, further described below, provides one example of a carrier 1051 mounted in a socket 1050. FIG. 10A, also described further below, provides an example of a carrier 1008 mounted on a base 1007.

Sockets, bases, and similar mounting hardware may be generally referred to as docks. In various cases, one or more components typically found in a controller may be provided in a dock. One example is a memory component, which may store information and/or control algorithms related to the associated EC window. As noted above, the term controller refers to the logical hardware and/or software for controlling and powering window transitions and for communicating as needed. Therefore, in such cases, the term "the controller" may generally refer to the dock, the carrier, or both (whichever component(s) include the relevant hardware and/or software).

Figure 8:
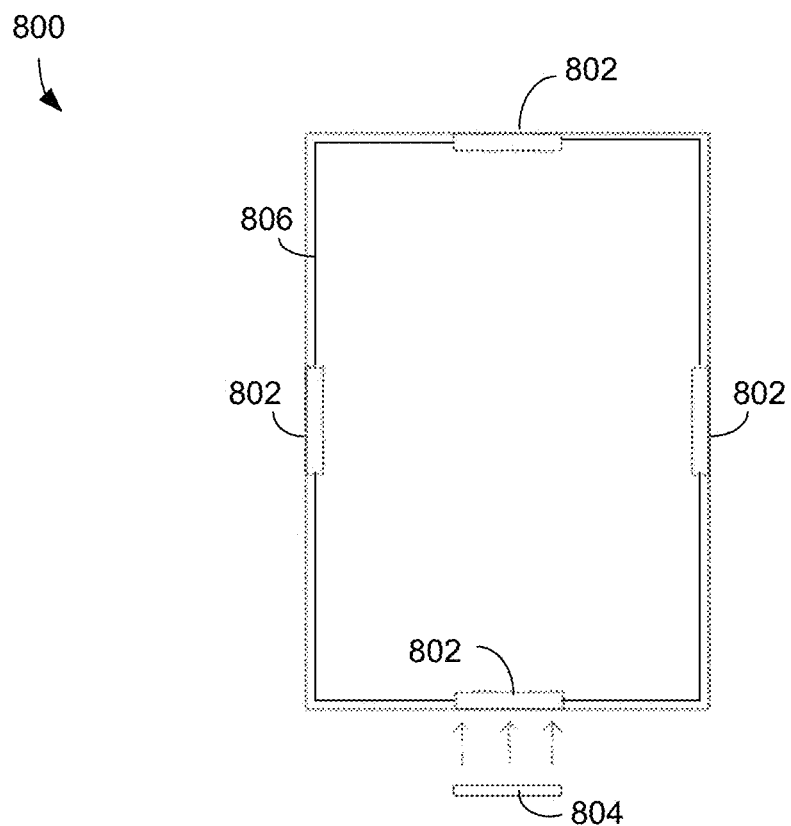
FIG. 8 illustrates an embodiment of an IGU having multiple docks configured to hold a window controller.

The dock may be positioned anywhere on the IGU. In various cases the dock is provided at a perimeter of the IGU. The dock may be partially, substantially, or wholly embedded in a secondary seal. This allows a carrier (which may include some or all of the controller components) to be removed/swapped/upgraded without damaging the secondary seal. Similarly, the dock may be partially, substantially, or wholly located within a perimeter defined by the primary seal. The dock may be on the glass, e.g., on surface 4, and close to the frame of the window. The dock may include sealing material to mate with one or both panes of glass. In some embodiments, the dock hermetically seals the carrier from the secondary seal material, or otherwise protects the carrier from the secondary seal material. One, two, three, four or more docks may be provided on a single window, thus increasing flexibility during installation. FIG. 8 provides an example of an IGU 800 having four separate docks 802, one positioned on each edge of the IGU 800. Each dock has wiring to the bus bars of the EC window, thus there is redundant wiring to the bus bars. A carrier 804 housing a controller may be placed in one of the docks 802, as indicated by the dotted arrows. Advantages to this system include that installers can use any one of the redundant docks for the controller, thus increasing installation flexibility; and, since there is redundant wiring to the bus bars, if one dock's wiring should fail for some reason, the carrier (controller) can be inserted into one of the other docks, without having to replace or repair the window.

In various embodiments, the dock is provided between the panes or on the lite closer to the building interior (i.e., the inboard lite, e.g., on surface S4, e.g., near the frame that holds the EC window so as to not interfere with the user's view through the window). The inboard lite may include a notch or cutout, for example as described with relation to FIGS. 2B-2D. The sealing separator may be shaped to permit such notch or cutout on the inboard lite while maintaining a sealed interior region of the IGU. The outboard lite may be rectangular, without any notches or cutouts. The outboard lite therefore protects the carrier from the elements.

In some embodiments, the carrier shaped such that it fits on or in a dock on a lite of the IGU, and does not extend beyond the perimeter of the IGU. Further, the carrier may be shaped such that it does not extend beyond the thickness of the IGU, the thickness being measured in a direction normal to the surface of the panes.

Docks may be electrically connected to one another, as shown by wire 806 for instance, such that power provided to any dock can be routed to the dock where a carrier is installed. The wire 806 may travel through the interior region of a hollow spacer in some cases. The wire 806 may also be provided around a secondary seal (e.g., in the secondary seal, or around the outer perimeter of the secondary seal). The docks can have bus bar lead connectors to provide power to the bus bars. The docks may also be electrically connected with other components, for example one or more antennae patterned into a surface of one of the panes (discussed further below). In a particular example the wire connecting the docks carries 24V power. A number of different electrical connection configurations may be used to provide power to the carrier docked in/on the dock. The docks may also be configured to include a memory component as mentioned above. The memory component may hold information related to IGU identification, cycling data, window characteristics/properties, any data that is particular to the individual IGU, etc. An IGU-specific memory component may also be provided separately from the dock, for instance in a local window controller/carrier that interfaces with the dock, or embedded separately into a secondary seal of the IGU. While FIG. 8 shows an IGU having four docks, the embodiments are not so limited. Any number of docks can be provided on any side of the IGU, with greater numbers of docks providing greater flexibility during installation, and lower numbers of docks being less expensive to manufacture. In one embodiment, only a single dock is provided. In another embodiment, only two docks are provided, e.g., where rectangular IGUs are constructed, each of one long side and one short side of the IGU may have its own dock, or the two docks may be positioned on opposite sides of the IGU.

The dock may be made from a variety of materials and can have many different shapes, so long as it interfaces with the carrier to hold the carrier in place as desired. In some implementations where a dock includes a chip (e.g., including information related to the associated IGU), the dock may be formed by placing the chip (and any associated connections) in a mold and pouring curable material (e.g., epoxy resin, plastic, etc.) around and over the chip (i.e., "potting" the circuit), or the chip may simply be covered with a conformal polymeric protection layer. After the material is cured, the dock can be installed on the IGU. Injection molding or similar techniques may be used. The chip may be attached to the dock via various other methods, so long as the chip remains readable by the controller/carrier.

A carrier/controller may be formed in a similar manner in certain embodiments, with all relevant components (see FIGS. 10A-10C, for example) being potted or otherwise covered with a polymeric protection layer. In a particular embodiment, substantially all of the controller components are provided in this manner to form the carrier, with the exception of a battery or battery pack and/or supercapacitor, which can interface with the molded carrier while being easily swappable/replaceable. The battery may be shaped like a cover for the carrier in some cases. In another embodiment, all or substantially all of the controller components are provided together via a molding process, including a battery, to form the carrier. In certain embodiments the battery is a flat battery. If/when the battery dies, the entire carrier may be replaced. In another embodiment, the various components of the controller may each be provided either (i) in the carrier itself or (ii) in a dock that interfaces with the carrier. Where the dock itself includes components typically found in the controller, the dock may be considered part of the controller.

The various controller components may be provided in the dock and/or in the carrier that interfaces with the dock. The carrier may be swappable/replaceable as desired. In one example, controller components that are specifically adapted to an associated IGU may be provided on the dock, while more generic controller components may be provided in/on the carrier. Examples of controller components that are adapted to an associated IGU include a chip, card, or board having a memory component that is programmed to include information specific to the associated IGU. By providing these specially adapted controller components directly on the dock, the risk of mismatching the component with a different IGU is minimized. By contrast, there is no such risk of mismatch with respect to the more generic controller components such as sensors (e.g., interior and exterior photosensors, interior and exterior temperature sensors, motion sensors, occupancy sensors, etc.), etc.

In some embodiments, a carrier may lock into a dock. This feature may prevent theft and minimize the risk of damaging a carrier and the controller components therein. This also ensures that the only people who have access to the carrier and the components therein are people who are authorized to do so (e.g., an owner, installer, or other servicer). In some cases, a special tool may be used to unlock and undock a carrier (or a portion thereof) from a dock. In some such cases, this tool may be provided on a long handle, making it easy to access carriers that are positioned high on a window or skylight, for example. The tool may utilize mechanisms that slip, slide, rotate, or otherwise move into and out of place to allow the carrier to be removed from the dock as needed. The tool may also utilize hardware to ensure that the carrier is supported after it is removed from the dock, minimizing the risk that the carrier falls to the floor after it is undocked. For example, the removal tool may have one or more pins that when inserted into apertures in the carrier, engage a mechanism that releases the carrier from the dock. For example, there can be interlocking components, held together by tension, and the pins relieve the tension and the carrier can be removed from the dock (much like the mechanism for tamper proof removal of some car stereo receivers or face plates from their associated docks). The removal tool can be a lock and key mechanism. One of ordinary skill in the art would appreciate that a number of interlocking and releasing mechanisms would fall within the scope of these embodiments.

The use of docks further enables additional features that may be present in certain embodiments. Specifically, custom carriers may be provided for different purposes, which may interface with the dock as needed. In one example, an installation carrier may be provided. This installation carrier may include controller components useful for installing and testing an electrochromic window, and may be used by an installer when positioning and/or hooking up an IGU. These components may be less complex than the controller used to control the window during its intended end use. In another embodiment, a carrier may be configured for use in the factory setting, for more complex testing than an installation carrier, e.g., used in the field. Installation carriers and other custom carriers/controllers are discussed further below in the section related to Packaging and Installation.

In certain implementations, a controller may include a photovoltaic panel that, although the controller is mounted on surface 4, faces the outside environment when the controller is in position on the window or in a notch adjacent to the window, for example. Such PV-enabled controllers are particularly useful when the controller can be positioned in an area exposed to light, as in the case of FIGS. 2B-2D, for example. Power generated by the PV on the controller may be used to power the controller, or any components or functions thereof (e.g., communication function), e.g., to charge a battery or supercapacitor in the controller. If the PV is sufficiently efficient and the energy/power requirements for driving an optical transition are sufficiently low, the power generated by the PV on the controller may be used to drive optical transitions on the window. In one example, the PV (or any other power source that does not rely on delivering power to the IGU via wires connected to a building's power supply) on a controller or elsewhere on the IGU may be used to power a controller such that it can communicate with other nearby controllers/windows to establish and on a mesh network (described further below). As such, the windows may be able to auto-configure themselves without or before hooking them up to another power source (in some cases 24V wired power). Where PV-configured controllers (or other self-powered controllers that do not rely on wired power from a building power supply) are used to communicate without hooking up to another power supply, the controller may use a low power communication method, for example low power radio frequencies using WiFi or Bluetooth low energy (BLE).

In certain cases, the controller may be positioned in the viewable area of the IGU on the inboard pane, e.g., S4 of a double-pane IGU or S6 of a triple pane IGU. Such a configuration may be beneficial in providing an accessible on-board controller e.g., by building occupants. Controller accessibility is beneficial in the event that the controller needs servicing. One example of where servicing may be needed is where a controller needs to have new batteries installed. Further, certain components within a controller, or the controller itself, may break and need to be fixed, upgraded, or replaced. Where a controller is sealed into an IGU in a non-accessible manner, such servicing can be very challenging. In embodiments where the controller is in the secondary seal, even if docked as a cartridge type controller, the framing holding the window may have to be opened to access the controller and remove it from the dock.

To provide easy accessibility to the on-board controller, one or both of the panes may be specifically designed. For example, one or more panes may have a notch or cutout that is positioned at least partially (and sometimes wholly) within what would otherwise be the viewable area of the IGU. The on-board controller may be positioned at this notch or cutout, and access to the controller may be achieved through such notch or cutout. In some cases the controller may be placed partially or wholly outside of the viewable area, but access to the controller is achieved through a notch or cutout located partially or wholly within what would otherwise be the viewable area. For instance, the controller may slide into place through the notch or cutout in the pane, into a position that is behind a frame. A cover may be provided over the notch/cutout to help protect the controller when it is not being actively accessed. In one embodiment, the IGU includes a conventionally shaped (e.g., rectangular) first lite (e.g., the outboard pane) on which the controller is removably mounted, and a second lite (e.g., the inboard pane) having a notch, cutout or other accessibility point allowing the controller to be accessed. The conventionally shaped lite may be the lite facing the outside or the lite facing the inside of a building, depending upon e.g., desired access to the controller. Typically the controller access is desired from within the building.

It may be beneficial to have the notched/cutout lite facing the interior of the building to provide easy access to the controller from the room in which the IGU is located. In other cases, it may be beneficial to have the notched/cutout lite facing the outside environment. One reason this may be useful is to provide easy access to the controllers from outside, which may be more convenient, particularly if a large number of windows are installed in different rooms. Where outside access is provided, security measures may be taken to ensure that only people with proper permission are able to access the controllers (e.g., there may be a locked cover over the notch/cutout). In another embodiment, both the inside- and outside-facing panes are modified to include a notch or cutout through which the controller may be accessed. In order to accommodate the notched/cutout EC pane(s), the sealing separator may be designed to accommodate the accessible controller while maintaining a sufficient seal to protect the EC device(s) of the EC panes.

In another embodiment, an IGU having no notches or cutouts in the lite is provided with an easily accessible local window controller. In these cases, the controller may be a "stick on" controller, which may be positioned on an inboard lite (with the controller facing the interior of a building, on surface S4), or on a frame of the window, or on a wall next to a window. A ribbon cable or other electrical connection may be provided to connect the controller to other components such as the IGU itself (e.g., electrical connections for powering the bus bars) or to upstream network components/cabling. The ribbon cable may provide power and/or communication. A ribbon cable works well for this purpose because it can wrap around the edge of a pane, and a frame of a window can clamp over the ribbon cable without damage. One benefit of these embodiments is that there is no need to drill holes/notches/cutouts in the panes for feeding wires.

Ribbon cables (and other electrical connections as described herein) can be provided at various positions/sides of the IGU for flexibility during installation, similar to the embodiment shown in FIG. 8. Where the controller is provided in a carrier in this "stick on" manner, it may be installed in a dock. The dock for the carrier/controller may be provided as a part of the indoor-facing inboard lite of the IGU, provided directly on surface S4 such that the position of the controller on the window is pre-determined, or it may be provided as a separate mountable unit. Where the dock is provided as part of the IGU, it is often positioned near an edge or corner of the viewable area of the IGU, in some cases proximate a top or bottom edge of the viewable area. Where the dock for the carrier/controller is provided as a separate mountable unit, a user may mount the dock anywhere on the inboard pane, window frame, or wall, so long as it is within reach of the ribbon cable or other electrical connector.

In these or other embodiments, the controller (which may or may not include a dock and/or carrier) may be relatively small. For instance, the controller (e.g., dock, carrier, or both) may have a height (thickness, as measured from the mounting surface of the dock or the surface it's mounted to, to the opposite surface of the dock) of about ½ inch or less, for example about ⅜ inch or less, for example ⅛ inch or less. The controller may also have a length of about 5 inches or less, for example about 4 inches or less, or about 3 inches or less, or about 2 inches or less. Further, the controller may have a width that is about 1 inch or less, for example about ½ inch or less. The height (thickness), length, and width may be measured in directions that are orthogonal to one another. In certain embodiments, the controller has a surface area of about 4 $in^2$ or less when considering the side of the controller that faces indoors, in other embodiments 3 $in^2$ or less, in yet other embodiments 2 $in^2$ or less. When the controller is provided in a carrier that interfaces with a dock, the dock may be larger or smaller than the carrier. In a number of embodiments where the dock is a base onto which the carrier is installed, the base may be smaller (in many cases significantly smaller) than the carrier. In one example, a base may have a length that is about 4 inches or less, for example about 3 inches or less, or about 2 inches or less, a width of about ½ inch or less, and a height (thickness) that is about ¼ inch or less, or about 0.125 inches or less, or 0.08 inches or less. In one embodiment, the base may be a flexible printed circuit material. Such materials are often quite thin. Such a flexible printed circuit material may be adhesively attached to the glass in some cases.

Figure 12:
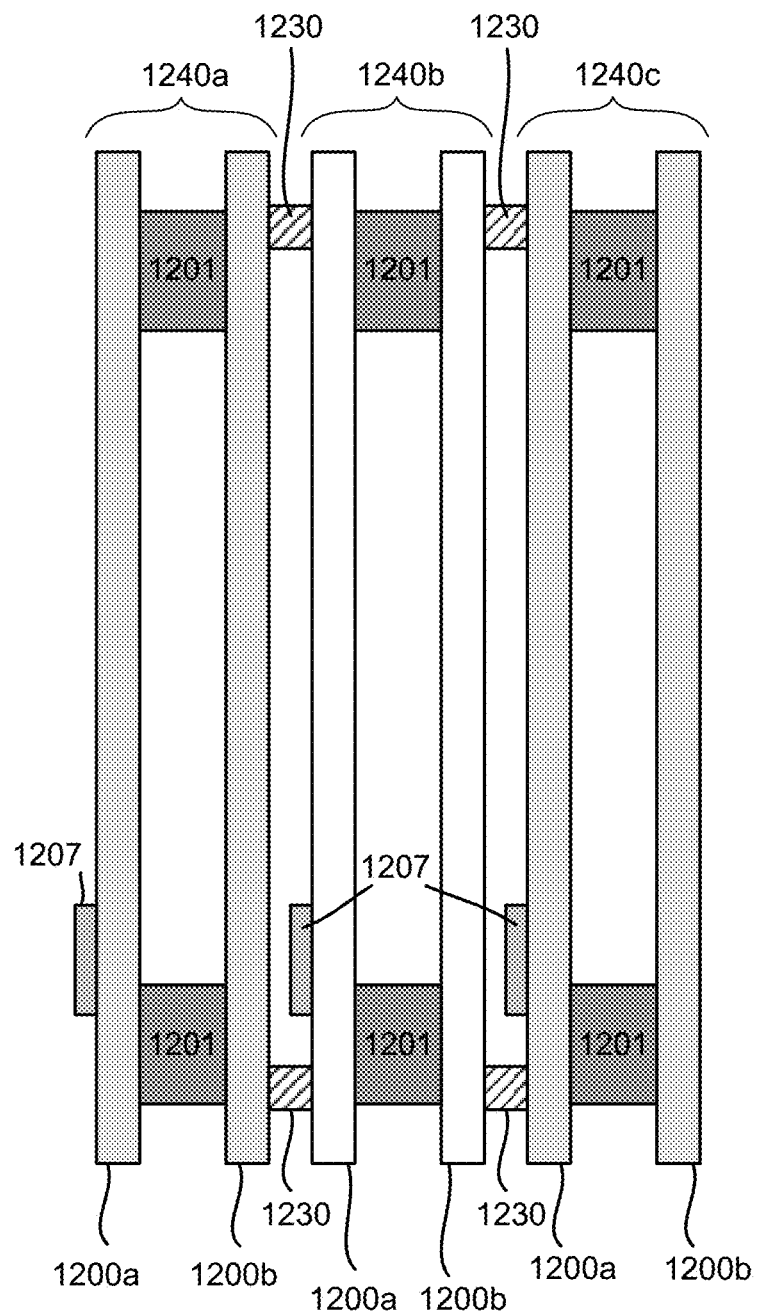
FIG. 12 illustrates a stack of IGUs having docks thereon, the IGUs being separated by pads for shipping.

Often, IGUs are shipped with small pads (e.g., cork pads) separating adjacent IGUs in order to protect the IGUs during shipping. FIG. 12 depicts three electrochromic IGUs 1240*a-c* stacked next to one another for shipping. Each IGU 1240*a-c* includes a first lite 1200*a* separated from a second lite 1200*b* by a spacer 1201. A dock 1207 is provided on an outer surface of each IGU 1240*a-c*. In a similar example, the dock 1207 may be omitted, and element 1207 may be a controller that is positioned directly on the first lite 1200*a* of each IGU (e.g., through adhesives, etc.). In another example, dock 1207 is provided with a carrier therein (not shown) during shipping. Adjacent IGUs are separated by small pads 1230, e.g., cork pads commonly used in the glass industry. An onboard controller, carrier, and/or dock 1207 may be designed such that it is thinner than pads 1230 used to separate the adjacent IGUs 1240*a-c*, thereby ensuring that the onboard controller, carrier, and/or dock 1207 does not scratch or otherwise damage an adjacent IGU and likewise, is not damaged by contact with adjacent IGUs. Alternatively or in addition, a cover (not shown) may be provided over the onboard controller, carrier, and/or dock to prevent the relevant component from scratching an adjacent IGU during shipping. One embodiment is a cover, e.g., a plastic cover or tape, which covers the dock, controller and/or carrier. The cover can be removed, e.g., after the window is installed to keep the dock and its associated electrical contacts (described further herein) from getting dirty during shipment and installation. The cover could also be a vinyl peel off, held in place by electrostatic forces.

Electrochromic windows which are suitable for use with controllers described herein include, but are not limited to, EC windows having one, two or more electrochromic panes. Windows having EC panes with EC devices thereon that are all solid state and inorganic EC devices are particularly well suited for controllers described herein due to their excellent switching and transition characteristics as well as low defectivity. Such windows are described in the following U.S. patent application Ser. No. 12/645,111, entitled, "Fabrication of Low-Defectivity Electrochromic Devices," filed on Dec. 22, 2009 and naming Mark Kozlowski et al. as inventors; Ser. No. 12/645,159, entitled, "Electrochromic Devices," filed on Dec. 22, 2009 and naming Zhongchun Wang et al. as inventors; Ser. Nos. 12/772,055 and 12/772,075, each filed on Apr. 30, 2010, and in U.S. patent application Ser. Nos. 12/814,277 and 12/814,279, each filed on Jun. 11, 2010—each of the latter four applications is entitled "Electrochromic Devices," each names Zhongchun Wang et al. as inventors; Ser. No. 12/851,514, filed on Aug. 5, 2010, and entitled "Multipane Electrochromic Windows," each of which is incorporated by reference herein for all purposes. As mentioned, the controllers disclosed herein may useful for switchable optical devices that are not electrochromic devices. Such alternative devices include liquid crystal devices and suspended particle devices.

In certain embodiments, the EC device or devices of the EC windows face the interior region of the IGU to protect them from the ambient. In one embodiment, the EC window includes a two-state EC device. In one embodiment, the EC window has only one EC lite, the lite may have a two-state (optical) EC device (colored or bleached states) or a device that has variable transitions. In one embodiment, the window includes two EC panes, each of which includes a two-state device thereon and the IGU has two optical states, in another embodiment, the IGU has four optical states. In one embodiment, the four optical states are: i) overall transmittance of between about 60% and about 90%; ii) overall transmittance of between about 15% and about 30%; iii) overall transmittance of between about 5% and about 10%; and iv) overall transmittance of between about 0.1% and about 5%. In one embodiment, the EC window has one lite with an EC device having two states and another lite with an EC device with variable optical state capability. In one embodiment, the EC window has two EC panes, each having an EC device with variable optical state capability. In one embodiment, the EC window includes three or more EC panes.

In certain embodiments, the EC windows are low-defectivity windows. In one embodiment, the total number of visible defects, pinholes and short-related pinholes created from isolating visible short-related defects in an EC device of the EC window is less than about 0.1 defects per square centimeter, in another embodiment, less than about 0.045 defects per square centimeter.

Figure 2A:
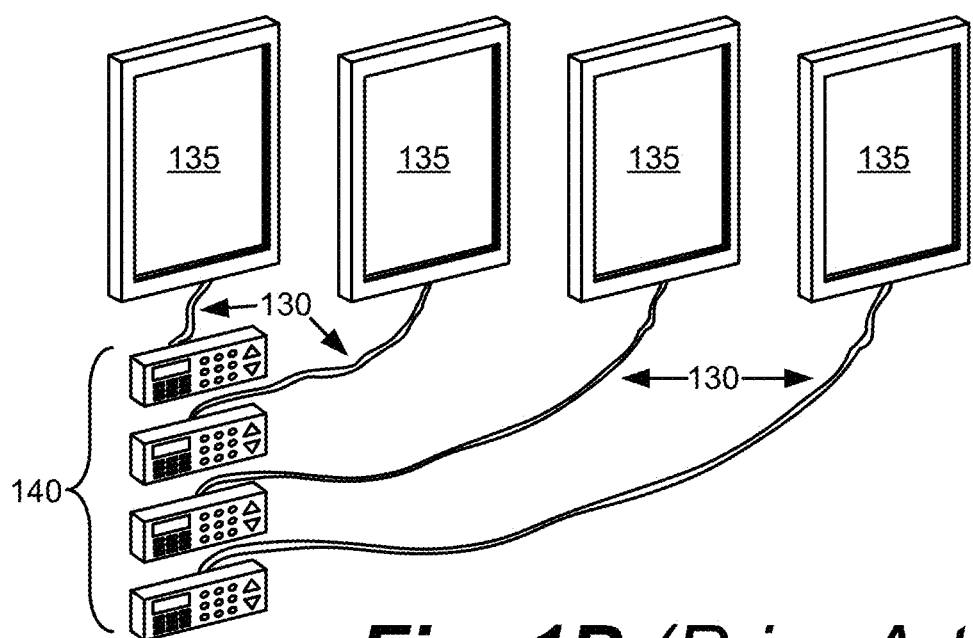
FIGS. 2A-2D show schematic views of window assemblies having IGUs with onboard controllers.
Figure 2A:
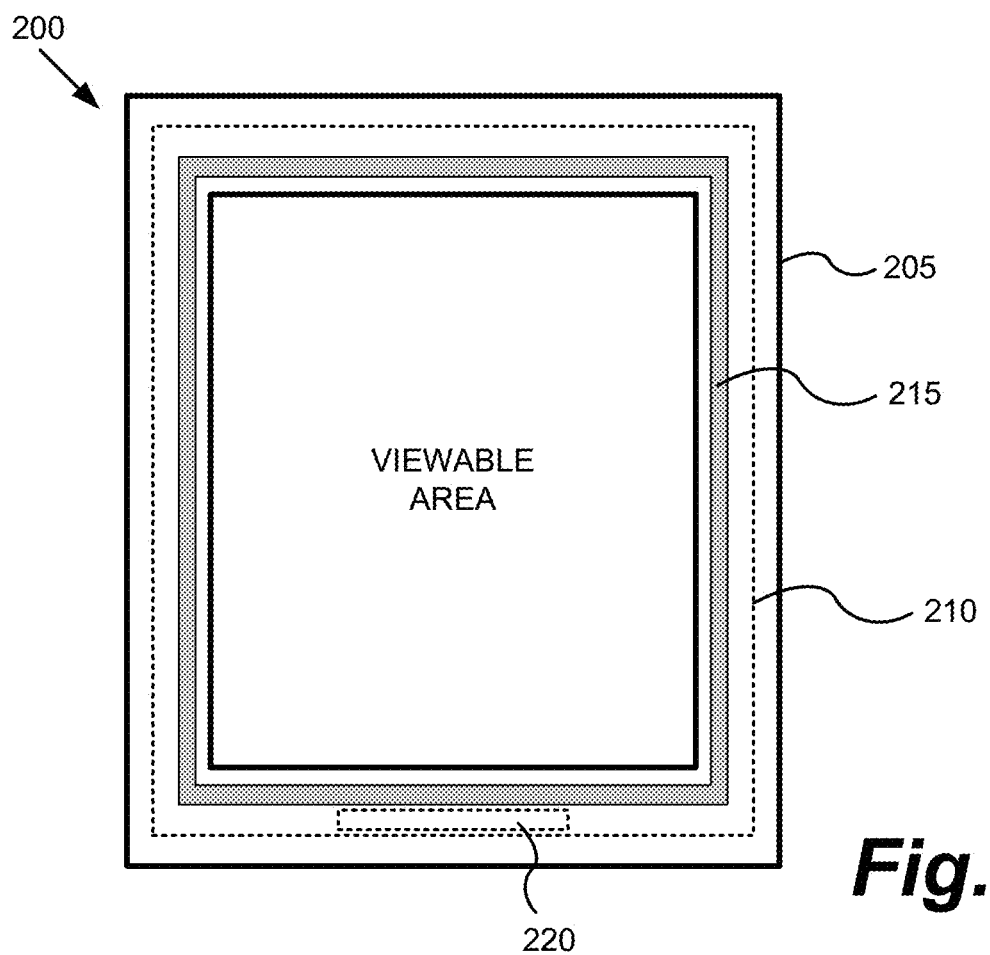

FIG. 2A depicts a window assembly, 200, including a window frame, 205. The viewable area of the window unit is indicated on the figure, inside the perimeter of frame 205. As indicated by dotted lines, inside frame 205, is an IGU, 210, which includes two glass panes separated by a sealing separator, 215, shaded in gray. Window controller, 220, is between the glass panes of IGU 210 and, in this example, does not extend beyond the perimeter of the glass panes of the IGU. The window controller need not be incorporated into a single enclosure as depicted, and need not be along a single edge of the IGU. For example, in one embodiment, the controller resides along two, three or four edges of the IGU, in some instances, all within the secondary seal zone. In some embodiments, the window controller can extend beyond the perimeter of the IGU and into a frame of the window assembly.

The controller between the panes of glass may have electrical wiring directly to it for control, and/or it may operate wirelessly, e.g., using magnetic induction control or infrared control through the glass, e.g., as described in U.S. Pat. No. 4,340,813, which is incorporated by reference herein in its entirety. In one embodiment, the controller is configured between the panes of the IGU as described herein. For example, the controller is in the secondary seal of the IGU, but has a control panel on an outward surface, e.g., S1 or S4 of the glass. In this embodiment, electrical connections to the controller can be wireless and/or hard wired as described herein. If hard wired, the connections can be made through apertures in the glass and/or around the edge of the glass as further described herein.

There are advantages to having the window controller positioned in the secondary seal or otherwise in situ of an IGU, some of these include: 1) wiring from the controller to one or more EC devices of the IGU panes is very short, and consistent from window to window for a given installation, 2) any custom pairing and tuning of controller and IGU can be done at the factory without chances of mis-pairing controller and window in the field, 3) even if there are no mismatches, there are fewer parts to ship, track and install, 4) there is no need for a separate housing and installation for the controller, because the components of the controller can be incorporated into the secondary seal of the IGU, 5) if hard wired, wiring coming to the window can be higher voltage wiring, for example 24V or 48V, and thus line losses seen in lower voltage lines (e.g., less than 10V DC) are obviated, 6) this configuration allows in-situ connection to control feedback and diagnostic sensors, obviating the need for long wiring to remote controllers, and 7) the controller can store pertinent information about the IGU, for example using an RFID tag and/or memory such as solid state serial memory (e.g., I2C or SPI) which may optionally be programmable. Stored information may include, for example, the manufacturing date, batch ID, window size, warranty information, EC device cycle count, current detected window condition (e.g., applied voltage, temperature, % $T_{vis}$), window drive configuration parameters, controller zone membership, and like information, which will be further described below. These benefits save time, money and installation downtime, as well as providing more design flexibility for control and feedback sensing.

In other embodiments, window controllers are separable from the window (e.g., dockable) and read a chip associated with the dock as described herein. In such embodiments the controller may be configured in the field for the specific window to which it is associated by virtue of mating with the dock and reading the chip therein.

More details of such window controllers are described herein.

Further, on-board controllers enable certain window powering configurations that could not otherwise be attained. For instance, in some systems, a trunk line (e.g., a 24 V trunk line) is used to route power throughout a building, intermediate lines (often referred to as drop lines) connect the local window controllers to the trunk line, and a window line connects the window controllers to the windows. The window lines may be lower voltage power lines. Due to line losses, low voltage window lines are typically limited to a length of about 15 feet or less. This 15 foot limitation can present problems in certain window configurations, particularly where large panels of windows are used (e.g., in a conference room, lobby, atrium, etc.) and where skylights are used. The use of on-board controllers can eliminate the need for the low voltage window lines, since the higher voltage intermediate lines can route power directly from a main trunk line to the controller/window. As such, the low voltage power lines that otherwise introduce a 15 foot limitation (due to line loss) can be avoided. Where on-board controllers are coupled with wireless communication, the wiring of the windows is greatly simplified compared to previous systems, especially in the difficult contexts mentioned above. There is no need to provide expensive cable that can carry both power and communication. Instead, all of the wiring can be simple 2 wire format that carries only power, e.g., 24V DC that does not experience significant line loss.

Figure 2C:
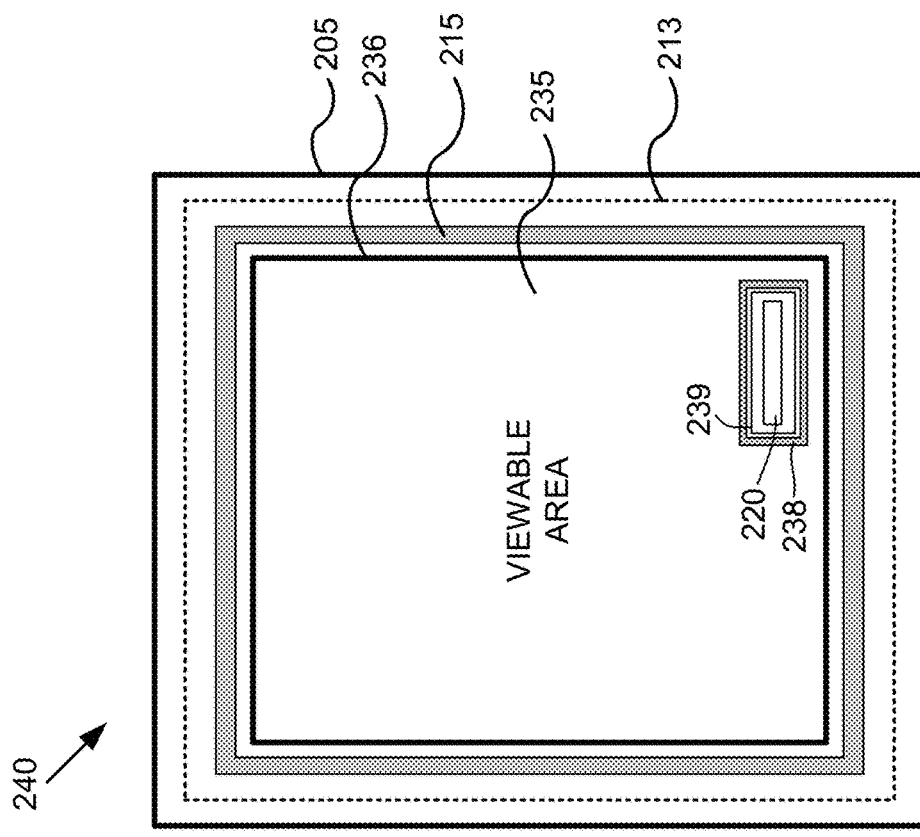
Figure 2B:
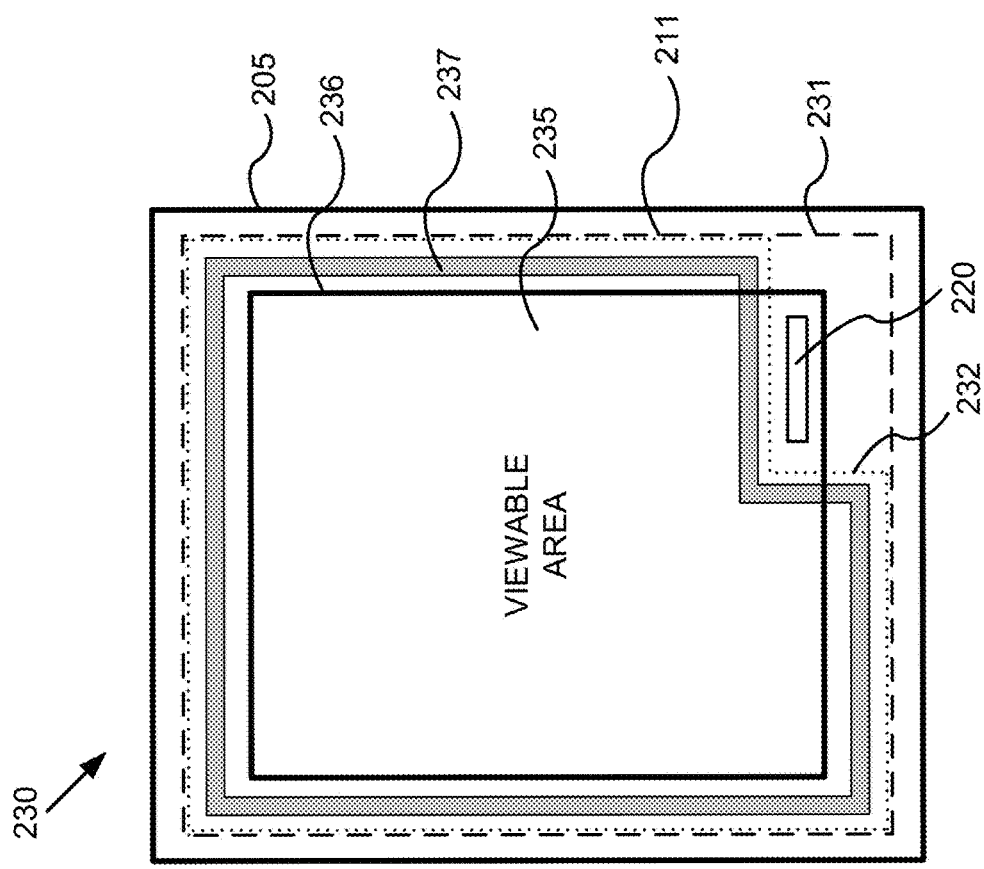

FIG. 2B illustrates a window assembly 230 having a more readily accessible window controller 220 positioned within what would otherwise be the viewable area 235. Area 235 is located within the interior border 236 of frame 205. Because the controller and components are at least partially opaque, this portion of the viewable area may be blocked. Though, as described herein, the controllers may have a very small footprint, so that they are unobtrusive, e.g., compared to a 6'×10' area of a large electrochromic window. In other embodiments, some or all the controller is behind window framing. In the embodiment of FIG. 2B, the IGU 211 includes a first lite 231 and a second lite 232. Either or both of the first and second panes 231 and 232 may be EC panes. The first lite 231 is shown in a dashed line and the second lite 232 is shown in a dotted line. The second lite 232 is shown to be slightly inside of the first lite 231, though this is done merely for the sake of clearly illustrating the edges of each pane. While either the first or second lite may extend beyond the other pane, as shown, frequently these panes have the same dimensions or substantially the same dimensions (e.g., within manufacturing tolerances), except for the region where the controller is located.

In FIG. 2B, the controller 220 is mounted on the first lite 231. In some cases, the controller 220 is removably mounted on the first lite 231, such that the controller can be removed and serviced as needed. Mounting hardware may be provided for easy installation and removal (e.g., the lite may include a bracket into which the window controller 220 can snap in/out). The second lite 232 is shaped to include a notch where the controller 220 is located, in this example in the bottom right corner of the second lite 232. As such, the controller 220 may be easily accessed through the notch in the second lite 232. In some embodiments, the notch in the second lite 232 may be covered by a removable cover (not shown). The cover may be used to protect the controller 220 from damage. The cover may provide instant access to the controller 220 (e.g., the cover may rotate open, slide open, pop open, etc.), especially where the controller is expected to be accessed frequently. The cover may also be attached by screws or other mechanisms (e.g., the locking mechanisms described herein) that provide relatively easy, but not instant, access to the controller 220. Such designs may be beneficial in preventing children, animals, etc. from damaging the controller 220. These designs may be useful where the controller itself does not need to be accessed frequently, for example where a user inputs control commands from a web browser, smart phone, or other device separate from the controller 220. The edges of the notch in the second lite 232, as well as the edges of the cover, may be rounded or coated with a material (e.g., plastic, rubber, etc.) to prevent injury and/or protect the edges of the substrate pane.

In order to adequately seal the IGU 211 of FIG. 2B, sealing separator 237 may be configured as shown. In particular, sealing separator 237 (which includes a separator and sealant (including, for example, a primary seal between the separator and each pane, as well as a secondary seal that surrounds the perimeter of the separator) between the separator and each lite 231 and 232) may be shaped to provide an air-tight, water-tight seal to an interior IGU region that excludes the controller 220. Because the controller 220 is accessible, there needs to be an adequate seal between the controller 220 and the interior IGU region. As noted above, the interior IGU region includes the space between the panes and inside the interior edges of the sealing separator 237. In various conventional designs, the sealing separator is positioned completely outside the viewable area, e.g., hidden by a window frame. In contrast, in the embodiment of FIG. 2B, at least a portion of the sealing separator 237 can be seen in the viewable area 235. In certain embodiments the carrier or dock of or associated with the controller may obscure the sealing separator in this area around the controller. In another embodiment, an obscuration material, such as paint or ink, may be added to S4 to hide the sealing separator at least in the area around the controller.

In certain embodiments, it may be aesthetically desirable to maintain the entire viewable area free of any view-blocking elements such as separators or controllers (or obscuration materials to hide the separator). However, for various applications, the benefits related to easily accessible on-board controllers, provided in windows having a convenient modular form, outweigh such aesthetic concerns.

In some embodiments, the controller 220 is connected to one or more wires (not shown) that may provide power and/or communication to/from the controller 220. Where power and control information are delivered wirelessly and/or where the windows are self-powered, such wires can be eliminated. Further, where control information is delivered wirelessly and certain alternative power sources are used (e.g., batteries, supercapacitors, photovoltaic cells, thermoelectric devices, piezoelectric devices, etc.), such wiring may be omitted. The controller 220 may be shaped such that it can be removed through the notch in the second lite 232. In such cases the second lite 232 and frame 205 may be shaped/designed to accommodate such removal/access.

FIG. 2C depicts an additional embodiment of a window assembly 240 having a window controller 220 positioned to be accessible to users and which may be within the viewable area 235. The viewable area 235 is the region interior of the inner edge 236 of the frame 205. In this embodiment, the IGU 213 includes two panes: a first lite is conventionally shaped and does not include any notches or cutouts (the edge of this lite is shown as the dotted line marked 213), and a second lite is similarly shaped but includes a cutout 239 where the controller 220 is located (the outer edge of this lite is also shown as the dotted line marked 213, and the cutout edge of this lite is shown by the line marked 239). As used herein, the term "cutout" as applied to a lite in an IGU/window assembly refers to a portion of the lite where the substrate (e.g., glass, plastic, etc.) is not present, i.e., an aperture, and that has a surrounding region where the substrate is present. In other words, a cutout is an aperture or hole in a lite having a shape that does not fully extend to any edge of the pane. This contrasts with a notch, shown in FIG. 2B, which may extend all the way to one or more edges of the pane.

As in the case of FIG. 2B above, there is a seal between the controller 220 (which is accessible and therefore open to ambient) and the interior region of the IGU. In this embodiment, the interior region of the IGU is the area between the panes, inside of the inner edge of sealing separator 215, and outside the outer edge of a second sealing separator 238. The second sealing separator 238 seals the interior region of the IGU, protecting it from the ambient environment exposed to the controller 220. The controller 220 may or may not be connected to wires (not shown) as described above with reference to FIG. 2B. Further, a removable cover (not shown) may be provided over the cutout 239, as described above.

Figure 2D:
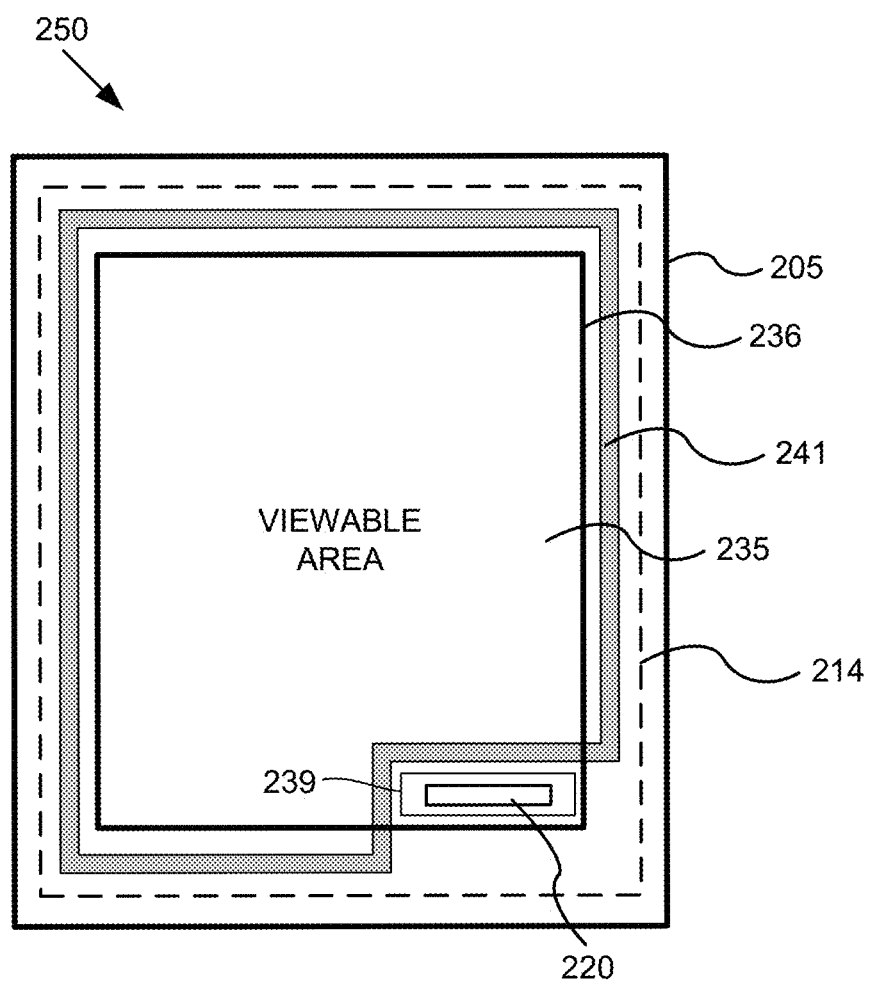

FIG. 2D illustrates an additional example of a window assembly 250 having an accessible controller 220 within the viewable area 235 of the IGU 214. The area 235 is the area inside the interior edge 236 of the frame 205. The IGU 214 includes two panes: one lite that is conventionally shaped and does not include any notches or cutouts, and a second lite that includes cutout 239. The controller 220 is positioned in the cutout 239, and is accessible therethrough. The cutout 239 may be positioned interior of the interior edge 236 of the frame 205, as shown in FIG. 2D. In other cases, the cutout 239 may extend into the frame on one or more sides or may be wholly within the area of the frame (where the frame has a similarly positioned access point to allow access to the cutout/controller). In contrast with the embodiment of FIG. 2C, only a single sealing separator 241 is used in the embodiment of FIG. 2D. The sealing separator 241 is shaped to provide an air-tight, water-tight seal between the interior region of the IGU and the region where the controller is located (which is accessible and therefore open to ambient). Wires (not shown) may be connected to the controller in some embodiments, for example to provide power and/or communication.

In the embodiments described in relation to FIGS. 2A-D, the controller is substantially within the thickness of the IGU; that is for example, in FIG. 2A, the controller is between the panes of the IGU and thus thinner than the IGU, and in FIGS. 2B-D, the controller is, for example, about as thick as the IGU, although it may be thicker or thinner than the IGU. One advantage of these configurations is that the controller does not protrude into the interior of the building (or exterior environment) very much and thus is less likely to be knocked off the glass or damaged due to impacts with other objects during shipping, handling, installation or during use. In embodiments where the controller is between the glass panes, it is also protected by the glass panes from impacts. In some embodiments where the controller is accessible from the interior and/or exterior, that is, in what otherwise would be viewable area of the window, the controller may be impacted from objects impinging at an acute angle to the surface of the window.

In another embodiment, the controller may be positioned wholly or partially within the viewable area, but may not be easily accessible. For example, the controller may be sealed into the interior region of the IGU, within the interior edge of a sealing separator, with no cutouts/notches/other ways to easily access the controller. Such an embodiment may be appropriate for applications where modular/easy to install window assemblies are desired. While controller accessibility is beneficial, it is not required in all embodiments. Having the controller present in the viewable area may be beneficial where certain types of line-of-sight wireless communication are used, for example infrared communication.

In some implementations, the controller may be positioned on a pane of the IGU, for example on a surface that can be accessed from the interior of the building. In the case of an IGU having two panes, for example, the controller may be provided on surface S4. FIGS. 10A-10C depict embodiments where various controller components are provided in a carrier 1008 that is mounted in this manner. In each case, the carrier 1008 is provided on a base 1007, which may be attached to surface S4 of an inboard lite 1000b via pressure sensitive adhesive (e.g., double-sided tape and the like, not shown) or a different adhesive (e.g., an epoxy or other adhesive). In various cases, the carrier 1008 may also be referred to as a casing or controller (and may or may not have all the components typically found in a window controller).

In FIG. 10A, an IGU includes an outboard lite 1000a and an inboard lite 1000b, having surfaces S1-S4 as shown. Lites 1000a and 1000b are separated by a spacer 1001, which is hermetically sealed to the lites 1000a and 1000b through a primary seal material (not shown). A bus bar 1002 runs under the spacer 1001, e.g., along its length, with a bus bar lead 1003 that extends peripherally outward past the edge of spacer 1001. A carrier 1008 registers with and fits onto a base 1007. In this example, base 1007 is connected to a connector 1017 via a cable 1027. The connector 1017 may be an M8 connector in some cases. Cable 1027 may deliver power and/or communication information to the IGU. The power and/or communication information may be transferred from base 1007 to carrier 1008 through any available connections. In FIG. 10A, power and/or communication information may be transferred from the base 1007 to the carrier 1008 through one or more connections 1025 and 1026 on the base 1007 and carrier 1008, respectively.

The carrier 1008 includes a printed circuit board (PCB) 1009, with a variety of components 1011a, 1011b, and 1011c installed thereon. The components 1011a-c may be a number of different components typically used by those of ordinary skill in the art and, e.g., described in relation to FIG. 2E. The various components on the circuit board may all be provided on a single side of the circuit board in some cases, while in other cases components may be provided on both side of the circuit board. The controller may have more than one circuit board, e.g., in a stacked format or side to side in the same plane. Optionally, an interior light sensor 1012 may protrude beyond (or measure through) an aperture or hole in the carrier 1008, thereby enabling the interior light sensor 1012 to measure the level of light in a room in which the IGU is installed. Similarly, an optional exterior light sensor 1013 may be provided to measure the level of light in the external environment. The exterior light sensor 1013 may be positioned interior of the perimeter defined by the spacer 1001, within the viewable area of the IGU in some cases. A hole 1014 may be provided in the base to ensure that the exterior light sensor 1013 can measure exterior light levels.

A series of electrical connection structures such as spring-loaded pogo pins 1010a, 1010b, and 1010c may provide power from the carrier 1008 through the base 1007, to components located below the base 1007. The electrical connection structures may provide permanent or temporary electrical connections. The electrical connection structures may provide a secure attachment by adhesion, metallurgical bonding, friction, etc. In some cases, friction may be provided by spring loading (e.g., in the case of pogo pins), pressure from the overall connections between the carrier 1008/base 1007/lite 1000b, etc. While the following examples present pogo pins, this is merely an example. The connections may be gold plated, e.g., to increase reliability and prevent corrosion.

For example, pogo pin 1010a provides power to an electrical connection 1006, which routes power from S4 to S2, where the EC film (not shown) and bus bar 1002 are provided. The electrical connection 1006 may provide power to the bus bar lead 1003 (directly or indirectly through another electrical connection as explained below in relation to FIGS. 11B and 11C). Electrical connection 1006 may be a thin tape patterned with conductive lines (e.g., copper ink, silver ink, etc.), a ribbon cable, another type of cable, a clip patterned with conductive lines thereon or therein, or a different type of electrical connection. A seal material 1005 may be provided in some cases between the inboard lite 1000b and the electrical connection 1006, which may help ensure that the interior of the IGU remains hermetically sealed. In some such cases (not shown), this seal material 1005 (or anther seal material) may extend to reach along the outer perimeter of the spacer 1001 to help keep the electrical connection 1006 in place next to the spacer 1001. The seal material 1005 may be a pressure sensitive seal material or another kind of seal material. Located peripherally outside of the spacer 1001 and the electrical connection 1006 is a secondary seal material 1004. Alternatively, connector 1006, rather than passing around the edge of the inner pane, may pass through an aperture through the inner pane, e.g., where 1006 emanates at the base and thus is not seen by the end user. In this case a sealing material like 1005 may be used to seal around 1006 (e.g., a wire) to seal between 1006 and the aperture in the inner lite through which 1006 passes.

A second pogo pin 1010b may provide an electrical connection between the carrier 1008 and component 1015, while a third pogo pin 1010c may provide an electrical connection between the carrier 1008 and component 1016. In various embodiments, components 1015 and 1016 may form part of an antenna that is patterned onto surface S4, as described below. For instance, component 1015 may provide a ground connection for the antenna, and component 1016 may be a part of the antenna element itself. In other embodiments, the spacer of the IGU and/or the bus bars of the IGU may serve the function of an antennae. In these or other cases, antennae may be printed on any one or all of S1-S4 (or additional surfaces where an IGU includes more than 2 panes). Electrical connections to the antennae are configured appropriately depending upon the location of components on glass surfaces or in between the panes, e.g., in, or on the spacer surfaces. Although only three pogo pins are shown in FIGS. 10A-10C, any number of pogo pins may be provided, as needed to power different components or receive input from antennae and the like. In one example, an additional pogo pin (not shown) is provided, which transmits power to/from a PV connector similar to the electrical connector 1006. The PV connector may have the same shape/properties as electrical connector 1006, but instead of delivering power to the bus bars, the PV connector delivers power from a PV film positioned on surface S2 to the carrier 1008. In cases where the PV film is positioned on surface S3, the PV connector may simply deliver power from the PV film on surface S3 to the base and/or carrier on surface S4, similar to the electrical connector 1020 shown in FIG. 10B. The PV connector may supply power from the PV cell to an onboard battery or supercapacitor as described. Any of the mechanisms and hardware described herein for routing power between (a) a carrier and/or base and (b) bus bars (or conductors electrically connected with the bus bars) may also be used for establishing an electrical connection between (a) a carrier and/or base and (b) a PV film positioned on one of the lites of the IGU.

The carrier 1008 may fit securely over the base 1007, and in some cases may lock into place (e.g., to prevent theft and minimize any possible damage). A mouse hole, thin slit, or other opening may be provided in the carrier 1008, through which cable 1027 may run. Cable 1027 may be hidden from sight by virtue of the carrier being positioned sufficiently close to the frame of the window so as to obscure cable 1027 (which may pass into the frame, as indicated by the dotted line; e.g., connector 1017 is within the frame and makes electrical connection within the frame).

FIG. 10B presents an embodiment similar to the one shown in FIG. 10A, and only the two primary differences will be described. In FIG. 10B, cable 1027 connects directly to the carrier 1008 rather than to the base 1007 (though in an alternative embodiment, it may be configured as in FIG. 10A). Thus, there is no need for any connections (such as 1025 and 1026 of FIG. 10A) for bringing power and/or communication information from the base 1007 to the carrier 1008. In this example, the base 1007 may be unpowered, with power being transferred directly from the carrier 1008 to the electrical connection 1020 (and to components 1015 and 1016) through the pogo pins 1010a-c. In another embodiment, one or more of the pogo pins 1010a-c may terminate on top of the base 1007 instead of going through the base 1007. The base 1007 may then transfer power, via any available electrical connections, to the components below the base 1007. In one example, the base 1007 includes conductive traces, each trace electrically connecting (a) the point at which a pogo pin 1010a-c touches the base 1007 and (b) the component below the base 1007 that is powered by the associated pogo pin (e.g., components 1015 and 1016, and electrical connections 1006 or 1020). Alternatively or in addition, the base may include electrical connections that pass through the base, rather than being provided only on a surface of the base.

Another difference in FIG. 10B compared to FIG. 10A is that the electrical connection 1006 is replaced by a different electrical connection 1020 and a block 1021. The electrical connection 1020 brings power from S4 to S3, around the edge of the inboard lite 1000b. The block 1021 brings power from S3 to S2, where it can deliver power to the bus bar lead 1003. The block 1021 may be conductive or have conductors thereon or therein to accomplish this purpose. In one example, the block 1021 is made of a material that is easy to securely insert between the lites 1000a and 1000b. Example materials include foam, rubber, silicone, etc. In some cases, conductive lines may be printed on the block to electrically connect S2 and S3, in some embodiments the block is mated with an adhesive backed ribbon cable or flexible printed circuit to make the connections between S2 and S3.

The electrical connection 1020 may be any of the types of connections described with respect to electrical connection 1006. Seal material (not shown) may be provided between the spacer 1001 and the block 1021 to ensure a hermetic seal.

FIG. 10C presents an embodiment similar to the one shown in FIG. 10B, and only the primary difference will be described. In FIG. 10C, the block 1021 is replaced by a wire 1022 (or series of wires), which brings power from S3 to S2. In a similar embodiment, a block or sheet (not shown) may be provided to secure the wire 1022 (or other electrical connection) against the spacer 1001. This technique may ensure that the wire 1022 or other electrical connection is out of the way when the secondary seal 1004 is formed. In an alternative configuration, wire or wires 1022 may pass through pane 1000b via an aperture or apertures and optionally a sealant material may be used to form a hermetic seal so that moisture cannot also pass through the aperture(s).

In each of FIGS. 10A-10C, one set of electrical connections is shown providing power from S4 to S2. However, it should be understood that each electrochromic window has two (or more) bus bars, and the electrical connections should be configured to bring appropriate power connections to each bus bar. This is further explained with reference to FIGS. 10E, 11B, and 11C, below.

Although not explicitly shown in FIGS. 10A-10C, either or both of the base 1007 and the carrier 1008 may include a programmable chip that includes information relevant to the associated IGU such as information about an electrochromic lite in the IGU. Such information may relate to the size of the window, materials of the window, current and voltage limitations particular to the window, control algorithms or other control parameters particular to the window (e.g., required drive and hold voltages and ramps), cycling and other lifetime information, etc. It may be particularly beneficial to include the chip in the base 1007 to eliminate the risk that the chip gets mis-matched through a mistaken installation on a different window. In this way, the carrier 1008 may be essentially generic/swappable, such that it would make no difference which carrier gets paired with which IGU. This feature may significantly decrease installation complications and errors. Similarly, some of the other components typically found in a controller may be provided in a base or other dock, as desired (e.g., as opposed to being provided in the carrier). As mentioned elsewhere, in cases where the dock itself includes components typically found in the controller, the term "the controller" may refer to the dock, the carrier, or both. Also not shown in FIGS. 10A-10C, either or both of the base 1007 or carrier 1008 may include a port (e.g., a USB port, mini USB port, micro USB port, etc.). In various embodiments, the port may be oriented such that the device that interfaces with the port (e.g., a USB drive) inserts in a direction that is parallel with the lites of the IGU. In some other embodiments, the port may be oriented such that the device that interfaces with the port inserts in a direction that is normal to the lites of the IGU. Other options are possible, for example where the dock and/or carrier are not rectangular.

FIG. 10D presents an example of a piece of flexible tape that has been patterned with conductive lines (e.g., a flexible printed circuit). The conductive tape is shown in the shape it would have if used for the electrical connection 1006 shown in FIG. 10A. The tape wraps around the inboard lite 1000b, extends over the outer perimeter of the spacer 1001, and rests on S2 of the outboard lite 1000a, where it can provide a powered connection to the bus bars/bus bar leads (not shown), with one lead for each bus bar. Similarly, the flexible tape can be used to provide electrical connections to antenna components such as a ground plane and antenna element. In certain embodiments, the flexible tape includes an adhesive surface allowing it adhere to the IGU structures it traverses.

FIG. 10E presents a view of a portion of an IGU as described in relation to FIG. 10A. The base 1007 is shown mounted on the inboard lite 1000b. The electrical connection 1006 delivers power from S4 to S2, thereby bringing power to a first bus bar lead 1025a and to a second bus bar lead 1025b. The first bus bar lead 1025a may deliver power to a first bus bar, while the second bus bar lead 1025b may deliver power to a second bus bar. In embodiments where additional bus bars are provided (e.g., to define different zones within a single EC lite), additional lines on the conductive tape, and additional bus bar leads connecting to such tape, may be provided. Likewise, if other electrical components of the window assembly reside on S1, S2, S3 and/or S4, such as antennae, the flexible tape circuit can be configured to make electrical connection to these additional components. Base 1007 is shown in FIG. 10E to include a number of features 1019. These features may be a variety of different components including, but not limited to, holes provided to accommodate sensors (e.g., light sensors), holes to accommodate pogo pins, connections for transferring power and/or communication information between the base and the carrier, locking mechanisms for ensuring that the carrier doesn't come off the base unless appropriate, etc. Although the base is depicted with a single flexible circuit tape type connector e.g., running to one side of the base, there may be other flexible tape circuits running to the base. For example, one tape may run as depicted and another tape may run to another side of the base. This embodiment may facilitate having contacts on e.g., S2, S3 for coatings, antennae, etc. thereon and not having to make a single circuit tape make all the connections. Though in certain embodiments a single circuit tape is desirable for simplicity of fabrication, e.g., a convergent fabrication where all the electrical connections between the lites are made using a single location (flexible circuit).

Figure 10F:
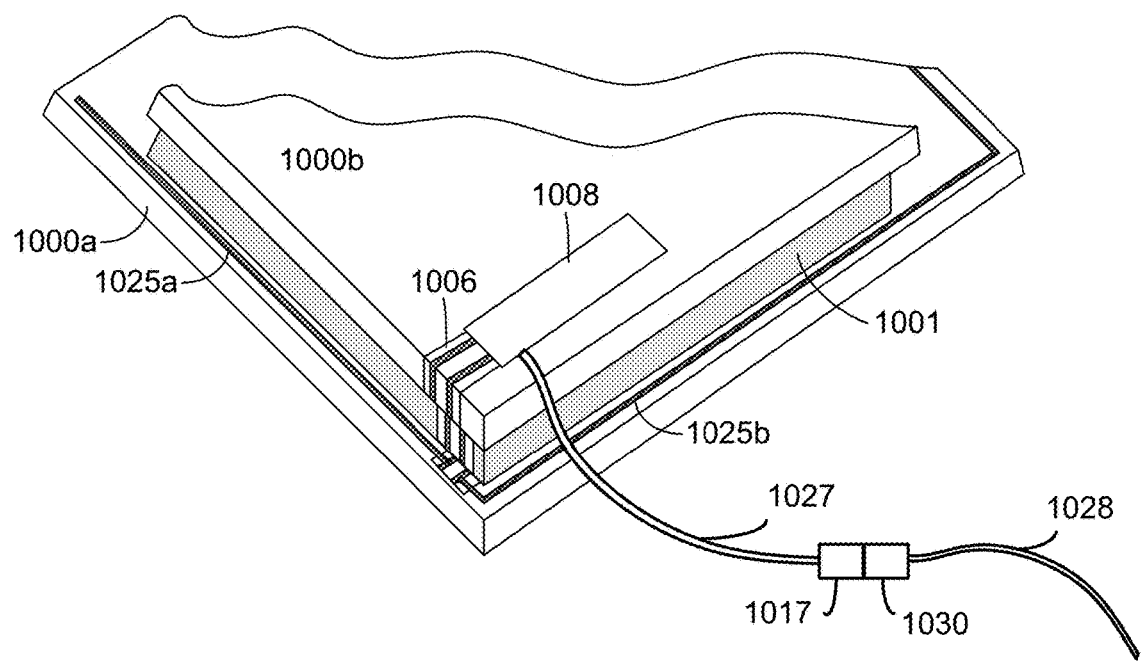

FIG. 10F illustrates the embodiment of FIG. 10E with the carrier 1008 installed on the base (not shown). Cable 1027 provides power and/or communication information to the IGU, and may connect to the base 1007 (as shown in FIG. 10A) or to the carrier 1008 (as shown in FIGS. 10B and 10C). The connector 1017 may mate with another connector 1030, which may provide power and/or communication via cable 1028. The connectors 1017 and 1030 may be M8 connectors, and cable 1028 may be a drop line, which may connect directly to a trunk line as described herein. Cable 1027 may be a window cable, also referred to as an IGU cable. FIG. 10F shows the cable 1027 and the electrical connection 1006 emanating from different sides of the carrier 1008 (and/or base 1007), though in other embodiments these two connections may emanate from the same side of the carrier 1008 (and/or base 1007). Even though having a hard wired connection to power is present in this embodiment, it still has the advantage that the controller is readily accessible on e.g., S4 of the IGU and the controller can be removable, e.g., in a modular, cartridge-type format.

One embodiment is an electrochromic window having a window controller mounted on a pane of the window, where the components of the window controller are provided in a dock and a carrier that mate with one another. In one embodiment the window controller has a cartridge format, where the dock and the carrier interface with each other in a reversible interlocking fashion. In one embodiment, the controller includes a battery. In one embodiment the battery is removable from the controller. In one embodiment the battery is part of the dock. In another embodiment, the battery is part of the carrier. In one embodiment the battery is a flat battery. In one embodiment the battery is rechargeable. In one embodiment, the battery is a lithium ion based battery. In one embodiment the carrier and dock have a tamper proof mechanism to detach the carrier from the dock. In one embodiment, the dock is adhesively attached to the pane. In one embodiment the dock is in electrical communication with an electrochromic device of the electrochromic window via a circuit tape or a ribbon cable. In one embodiment the dock is in electrical communication with an antennae of the electrochromic window via a circuit tape, ribbon cable, or other electrical connection. In one embodiment the dock is in electrical communication with a bus bar of the electrochromic window via a circuit tape, ribbon cable, or other electrical connection. In one embodiment the dock is in electrical communication with a sensor of the electrochromic window via a circuit tape, ribbon cable, or other electrical connection. In one embodiment the top (outermost facing from the pane) surface of the base is about ½ inch or less from the surface of the pane to which it is attached, for example about ⅜ inch or less from the surface of the pane, for example ⅛ inch or less from the surface of the pane. In one embodiment, the top (outermost facing from the pane) surface of the carrier, when docked with the base, is about 1 inch or less from the surface of the pane to which it is attached, for example about ¾ inch or less from the surface of the pane, for example ½ inch or less from the surface of the pane. In one embodiment the base is rectangular. In one embodiment the base's shape has at least one right angle so that it can fit into a corner of a frame that supports the electrochromic window. In one embodiment, the controller includes at least one display. The display may be e.g., an LCD display, and LED display or the like. The display may indicate the tint level of the electrochromic window. In one embodiment the controller includes control switches, e.g., buttons, dials, and/or a keypad. The control switches may for example, correspond to tint states of the electrochromic window. The controller may include one or more indicator lights, e.g., LEDs, to indicate a tint level change, wireless communication connectivity, power status and the like; these functions may also be displayed via the aforementioned display with or without separate indicator lights. In one embodiment the controller includes a USB port. In one embodiment the controller includes an optical fiber communication port. In one embodiment the controller includes a coaxial connection port. In one embodiment the controller includes an antennae. In one embodiment the controller has wireless communication, e.g., Bluetooth. Any of the features described herein may be combined in a particular embodiment.

IGUs are typically installed in a frame or framing system for support. Individual IGUs may be installed in individual frames, while larger numbers of IGUs may be installed in a curtain wall or similar structure, with mullions and transoms separating adjacent windows. All of these components may be considered to form the frame of an IGU. In a number of embodiments, a hole, slit, or other perforation may be provided in a frame that surrounds an IGU, and one or more wires/cables may be fed through the perforation. For example, in the context of FIG. 10F, cable 1027 may be routed through such an aperture in a frame surrounding the IGU. In a similar embodiment, both the cable 1027 and the electrical connection 1006 emanate from the same side of the carrier 1008 (or a dock thereunder), and the frame into which the IGU is installed includes a hole proximate where the electrical connection 1006 wraps around the edge of the inboard lite 1000b. This hole may be hidden by the edge of the carrier 1008 (or dock in another embodiment), which may abut against the interior edge of the frame. In some cases, the outer casing of the carrier 1008 may be made of a material that has a certain degree of give (e.g., rubber, pliable plastic, etc.) such that it is easy to abut the carrier against the frame without any space in between. In other embodiments, though the case of the carrier is rigid, a flexible material, such as foam or rubber is applied to one side of the casing and/or the frame around the hole, so that when the carrier is docked with the base, the flexible material obscures connection 1006 and/or cable 1027. Similarly, the portion of the carrier that abuts the edge of the frame may be made of such a material, with the remaining portions of the carrier being made of different materials. Cable 1027 may be routed through the hole in the frame and connected with power and/or communication delivered via cable 1028. In this way the on glass controller has a very clean look because no wiring or electrical connections to the controller can be seen by the end user; and since the controller's footprint is small (e.g., less than 4 in$^2$, less than 3 in$^2$, or less than 2 in$^2$), it takes up very little of the viewable area of the window.

Although the carrier 1008 is shown schematically as a simple rectangle in FIG. 10F, in some embodiments the carrier 1008 may be provided with a mechanism for providing user input for controlling optical transitions on the IGU. As mentioned above, the carrier 1008 can include buttons, switches, dials, touchscreens, or other mechanisms that a user can interact with to control the optical state of the associated IGU. In one simple example, the carrier includes two buttons—one which causes the electrochromic IGU to become clear and one which causes the electrochromic IGU to become tinted. In a more complex example, multiple intermediate tint states may be available. For example, there may be four buttons, each corresponding to one of four tint states of the electrochromic window. In another example, the carrier may include a touch panel/screen that allows a user to control optical transitions on the electrochromic IGU. The touch panel can be programmed in any appropriate way to allow for such control. In various cases, the mechanism for providing user input may be provided on the front face of the carrier or other on-board controller, for example the face that is visible in FIG. 10F. The mechanism may also be provided elsewhere on the carrier or other controller depending on the geometry of the carrier/controller and its orientation on the IGU.

FIG. 10F can also be used to illustrate another embodiment. For example, rather than 1008 being a carrier (controller), it can be a user interface, e.g., a control pad, e.g., a touch pad, key pad or touch screen display (and thus thin, for example) and the electrical connection 1006 is used to connect the user interface to a controller in the secondary seal or at another location in situ of the IGU. This is akin to the embodiment where the carrier contains the controller circuitry and a user control interface, but moving the controller circuitry between the glass, e.g., in the secondary seal and keeping the user interface on the glass. Thus wiring 1006 would connect the bus bars, antennae and other features as described above between the panes, but also the controller circuitry, which is also between the panes in this example, to the control pad. The user interface may be affixed, e.g., with an adhesive, and may be removable/replaceable. The user interface may be very thin, having e.g., only keypad connections to flexible electrical connection 1006, or the control pad may be a digital display (which can also be thin and e.g., flexible). The control interface may be at least partially transparent. In one embodiment, the user control interface and electrical connection 1006 are a single component. For example, an adhesive sealant 1005 on the back of 1006 (as described above) may also be on the back of the user control interface with e.g., a protective backing for a "peel and stick" form factor. For example, during fabrication, appropriate electrical contacts to the bus bars, antennae, controller and other components between the panes are made to a local area on S2 and/or S3 as appropriate. When the panes are brought together during IGU formation, the local areas, if one on both S2 and S3 for example, are registered. Then the user interface is peeled and stuck onto the glass, e.g., with an appropriate electrical connection starting from S3, across the spacer, onto S2, around the edge of pane 1000*b* and then onto S4. In this way a convergent (and thus efficient) fabrication process is realized.

Figure 10G:
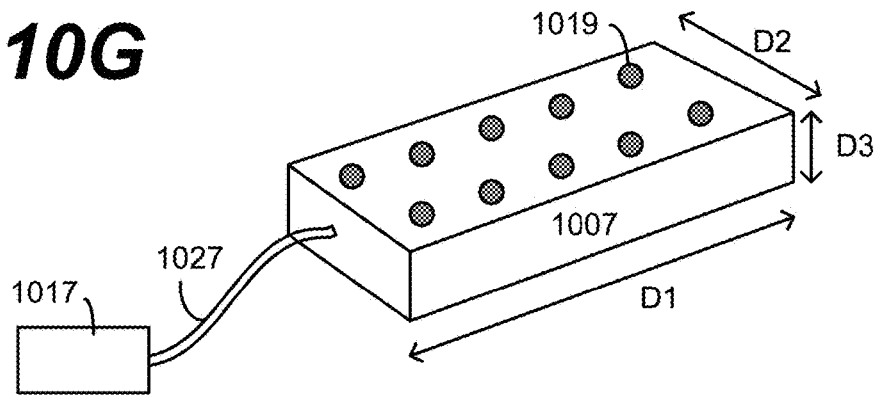
FIG. 10G depicts one embodiment of a dock that may be used in some embodiments.
Figure 10H:
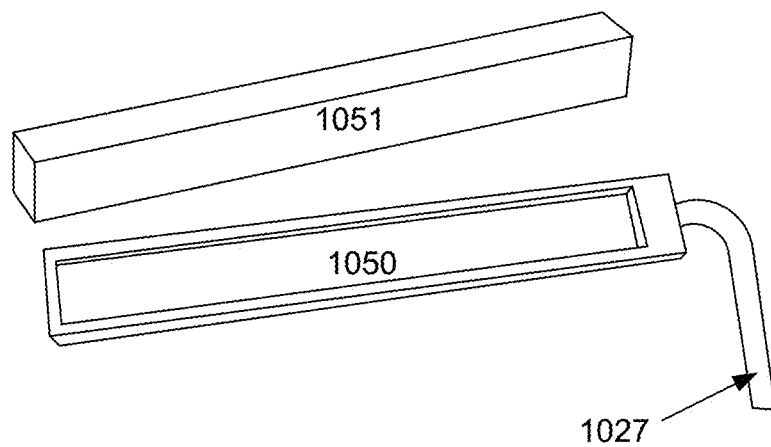
FIG. 10H illustrates a controller and dock according to one embodiment.

FIG. 10G depicts a close up view of a base 1007 according to one embodiment. Although the base 1007 (and carrier) is shown as rectangular, it can have any shape that allows the carrier to be docked to the window. In some cases, one or more surfaces of the base 1007 may be round. One example is a base that has a cross-section shaped as a semi-circle, quarter-circle, triangle, or other polygon. In one embodiment, the base has at least one 90 degree corner/angle so that it can nest adjacent to or in a corner of the framing of the window. Typically, the base will include at least one flat surface that can be mounted on a lite of the IGU, for example via adhesive. The base may include ridges, snaps, locks, or other hardware that facilitates docking/securing the carrier onto the base. The features 1019 shown on the base 1007 in FIG. 10G may be any of the features 1019 described in relation to FIG. 10E. While FIG. 10G shows cable 1027 connected to the base 1007, this is not always the case, as explained in relation to FIGS. 10B and 10C, above. Cable 1027 may include five wires in some cases, some of which are for delivering power to the electrodes of an EC device, and some of which may be used for data communication to the memory and/or integrated circuit device. In cases where communication occurs wirelessly, cable 1027 may have fewer wires. The dimensions of the base 1007 are shown in FIG. 10G, with D1 representing the length, D2 representing the width, and D3 representing the height (thickness). In various cases, these dimensions may be fairly small, with length D1 about 5 inches or less, for example about 4 inches or less, or about 3 inches or less, or about 2 inches or less, and with width D2 about 1 inch or less, for example about ½ inch or less, or about ¼ inch or less, and with thickness D3 about ½ inch or less, for example about ⅜ inch or less, or about ¼ inch or less, or about 0.08 inches or less. As mentioned above, the thickness D3 of the base 1007 may be less than the pads used to separate adjacent IGUs during shipment, thereby preventing the bases 1007 from scratching and damaging the lites of adjacent IGUs.

Figure 10I:
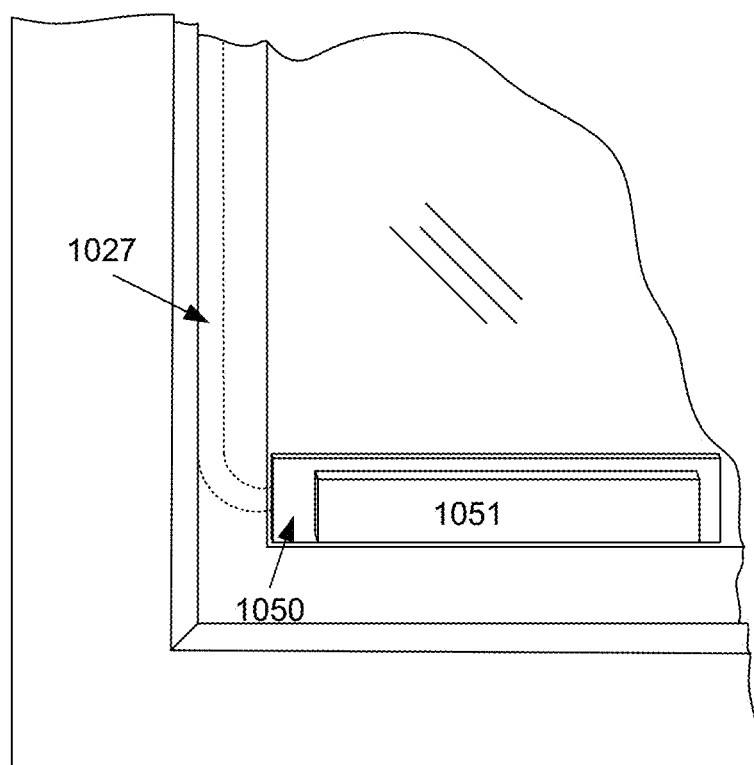
FIG. 10I illustrates the controller and dock of FIG. 10H positioned on a lite of an IGU according to one embodiment.

A 3D printed mock-up model of a carrier 1051 and dock 1050 is shown in FIGS. 10H and 10I. In this example, the dock 1050 is a socket into which the carrier 1051 fits. Dock 1050 mounts to the pane, e.g., S4 of pane 1000*b* as depicted in FIGS. 10A-10C. Carrier 1051 includes some or all of the components of a window controller for controlling optical transitions on the electrochromic device. In this embodiment, carrier 1051 has a cartridge form factor. FIG. 10H depicts the carrier 1051 lifted out of the dock 1050, while FIG. 10I depicts the carrier 1051 in the dock 1050, with the dock 1050 supported on a lite of an IGU in one possible dock location. The L-shaped piece 1027 extending from the side of dock 1050 is meant to represent cable 1027, for example for delivering power and/or communication information to the dock 1050 and/or carrier 1051. When installed on an IGU, cable 1027 may be hidden behind inside a framing component of the IGU. Although FIG. 10I shows the cable 1027 positioned in front of the framing components, it is understood that in some cases, this piece may be hidden.

Any appropriate electrical connection can be used to route power to the individual bus bars/bus bar leads. In some cases, the bus bar leads themselves, or a similar printed electrical connection, may be patterned around the perimeter of a lite, or a portion thereof. One example is to use silver or copper ink, though other conductive inks may also be used. Another option is to route tape that has been patterned with conductive lines, as discussed in relation to FIG. 10D. Wires, ribbon cable or other electrical connections may also be used.

Figure 11A:
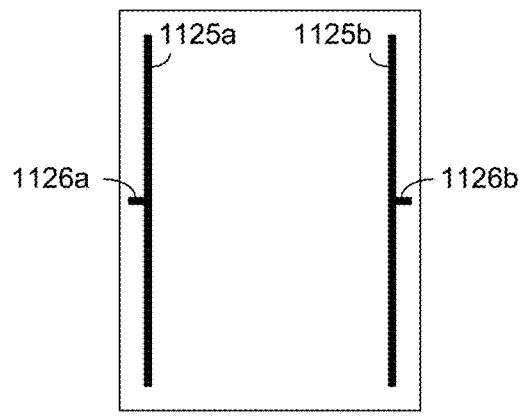
FIGS. 11A-11C depict lites having various wiring schemes for providing power to the bus bars of an electrochromic device.
Figure 11B:
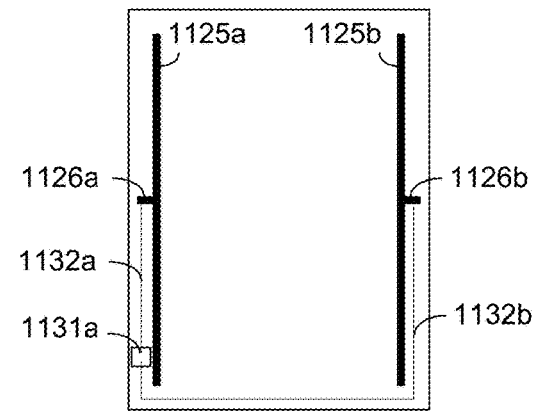
Figure 11C:
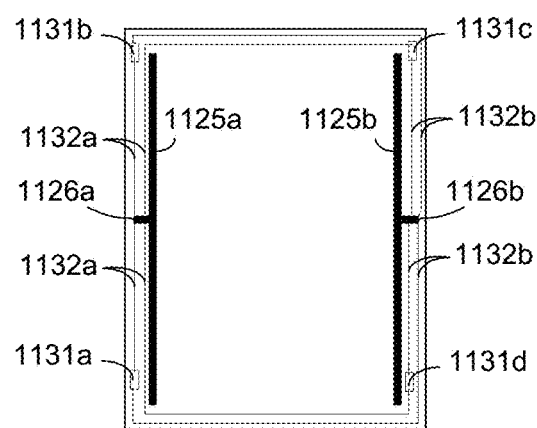

FIGS. 11A-11C depict various embodiments of an electrochromic lite having two bus bars 1125*a* and 1125*b*, each having a bus bar lead 1126*a* and 1126*b*, respectively. No additional electrical connections are shown in FIG. 11A. FIGS. 11B and 11C depict electrical connections 1132*a* and 1132*b* that may be used to provide power to the bus bars 1125*a* and 1125*b* of the electrochromic lite. As mentioned, the electrical connections 1132*a* and 1132*b* may be any available electrical connection, as described above, with non-limiting examples including wires, printed conductive lines, conductive/patterned tape, etc. The different types of electrical connections present different advantages and disadvantages. For instance, one advantage of using conductive lines printed directly on the electrochromic lite is that the risk of moisture breaching the hermetic seal around the electrochromic device is minimized. By contrast, where wires are used for the electrical connections, there is some risk that the wires will shift and loosen within the seal material over time, thereby potentially allowing moisture to travel along the wires and into the hermetically sealed region of an IGU. However, such wires can be buried within the secondary seal material, thereby hiding the electrical connections from view and creating an aesthetically pleasing window. Also, the wires can be secured to a spacer, e.g., via hot glue or other adhesive, tape, blocks, sheets, or another mechanism, to reduce the likelihood that they become loose. By contrast, conductive lines printed directly on a lite cannot be hidden within secondary seal material because such lines will necessarily be visible from the opposite side of the lite on which they are patterned. Methods and structures for obscuring bus bars or other electrical connections are further described in PCT Patent Application No. PCT/US14/72362, titled "OBSCURING BUS BARS IN ELECTROCHROMIC GLASS STRUCTURES," which is herein incorporated by reference in its entirety. In some cases, the conductive lines may be printed using ink that is color matched to the secondary sealant and/or to the spacer. In these or other cases, the lines may be hidden behind framing, and/or may be sufficiently thin that they do not cause any aesthetic problems (e.g., the lines are not substantially visually perceptible by humans).

In FIG. 11B, a single connection area (or connection "point") 1131*a* is provided on the electrochromic lite. The connection point may be, e.g., a pad having contacts, e.g., flexible circuit material, or simply be a small area on the glass where electrical traces are congregated. The connection point 1131*a* provides power for routing to the bus bars 1125*a* and 1125*b* via electrical connections 1132*a* and 1132*b*, and the bus bar leads 1126*a* and 1126*b*, respectively. In one example, the connection point 1131*a* is where a piece of conductive tape is installed on the electrochromic lite, which may route power from a non-electrochromic lite as shown in FIG. 10A. In the context of FIGS. 10A and 11B, the connection point 1131a may be a portion of the electrical connection 1006, positioned where the electrical connection 1006 is shown meeting the bus bar lead 1003. The connection point 1131 may be similarly positioned in the context of FIGS. 10B and 10C. In FIGS. 10E and 10F, the connection point is shown on surface S2 of the outboard lite 1000a, where the bus bar leads 1025a and 1025b meet the electrical connection 1006 which delivers power from surface S1 on the inboard lite 1000b. In various embodiments, a connection point 1131 may be provided on a lite at a location proximate where a dock, carrier, and/or controller is (or will be) provided. There may also be a similar connection point on S3 and connector 1006, for example, may provide electrical connection from components on S2 and S3 to components, such as a controller described herein, on S1.

FIG. 11C presents a similar embodiment to the one shown in FIG. 11B. In this example, however, four different connection points 1131a-d are provided. Thus, in this embodiment there are redundant connection points. The use of multiple connection points 1131a-d increases the flexibility regarding where the dock/carrier will be located. These connection points are also useful, e.g., when using redundant docks in the secondary seal with cartridge type controllers (see description in relation to FIG. 8) or redundant docks on, e.g., S1 or S4, or, e.g., redundant control interfaces on S1 and/or S4 where the controller is between the panes. While FIG. 11C shows four connection points 1131a-d, it should be understood that any number of connection points may be provided. The use of a greater number of connection points increases flexibility, but may also increase manufacturing costs. Any number of connection points (and docks) may be provided. In certain implementations, an IGU may be manufactured to include multiple connection points (including, for example, the electrical connections that connect the connection points to the bus bars/bus bar leads), though only one dock is actually installed. This leaves the other connection points without a corresponding dock, e.g., when shipped from the manufacturer. Similarly, only a single connection point and dock may be provided, but the electrochromic lite may be patterned to include multiple redundant electrical connections, for example using printed conductive lines or another connection described herein. Such an embodiment may include an electrochromic lite similar to the one shown in FIG. 11C, including all of the electrical connections 1132a and 1132b, but with only a single connection point 1131a (or 1131b/c/d) provided. These manufacturing methods may be beneficial in that flexibility regarding placement of the dock/casing/controller can be maintained until the point at which the dock/casing/controller is actually installed. One particular reason this may be advantageous is the convenience of mass-producing windows with flexible orientations. Once the orientation of a window becomes known (e.g., as a result of input from a customer), an IGU of appropriate size can be provided, and the dock/carrier or other controller can be installed in the most convenient or aesthetically pleasing location/orientation available.

Figure 13A:
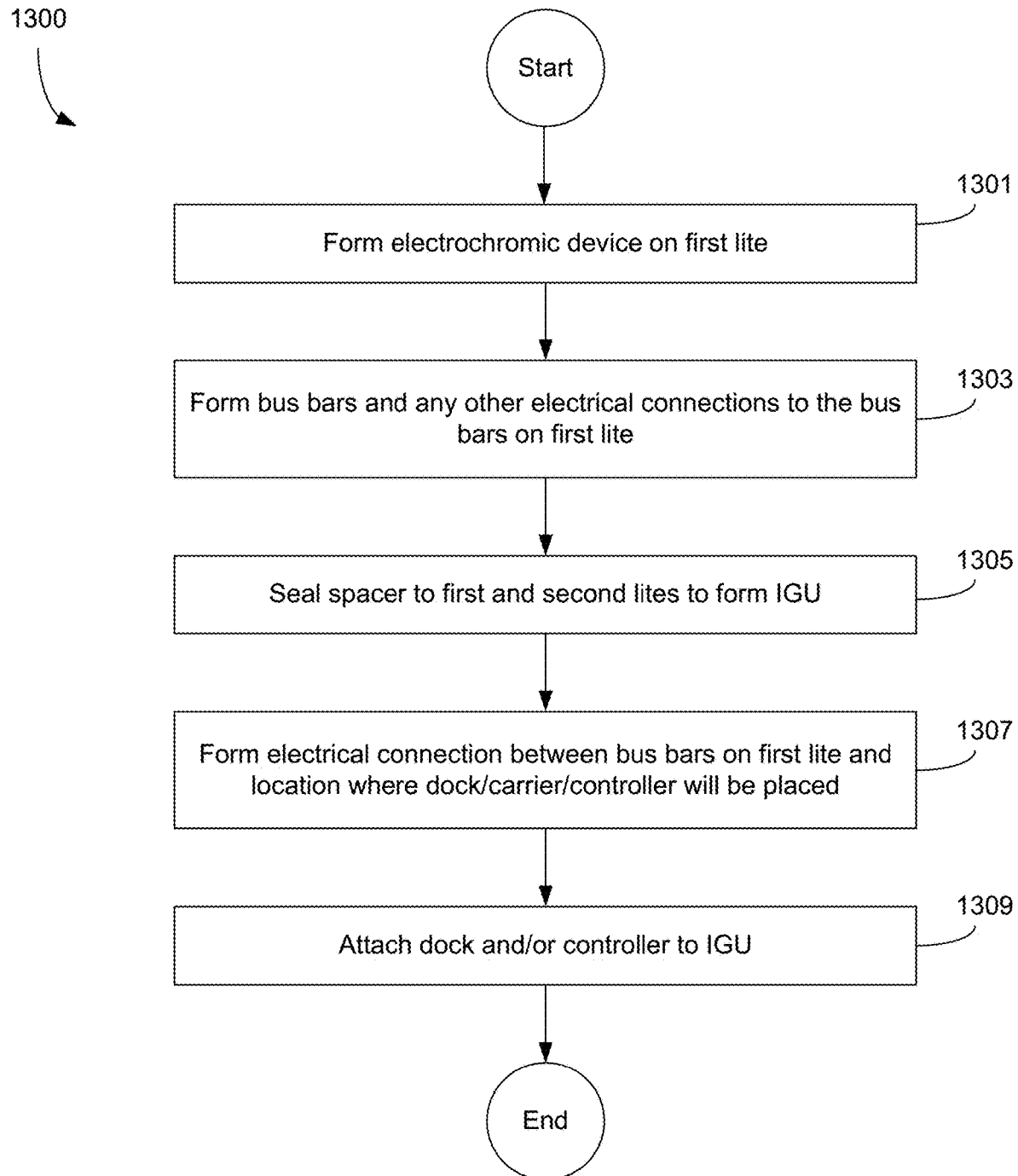
FIGS. 13A and 13B present flow charts for methods of manufacturing electrochromic IGUs according to certain embodiments.
Figure 13B:
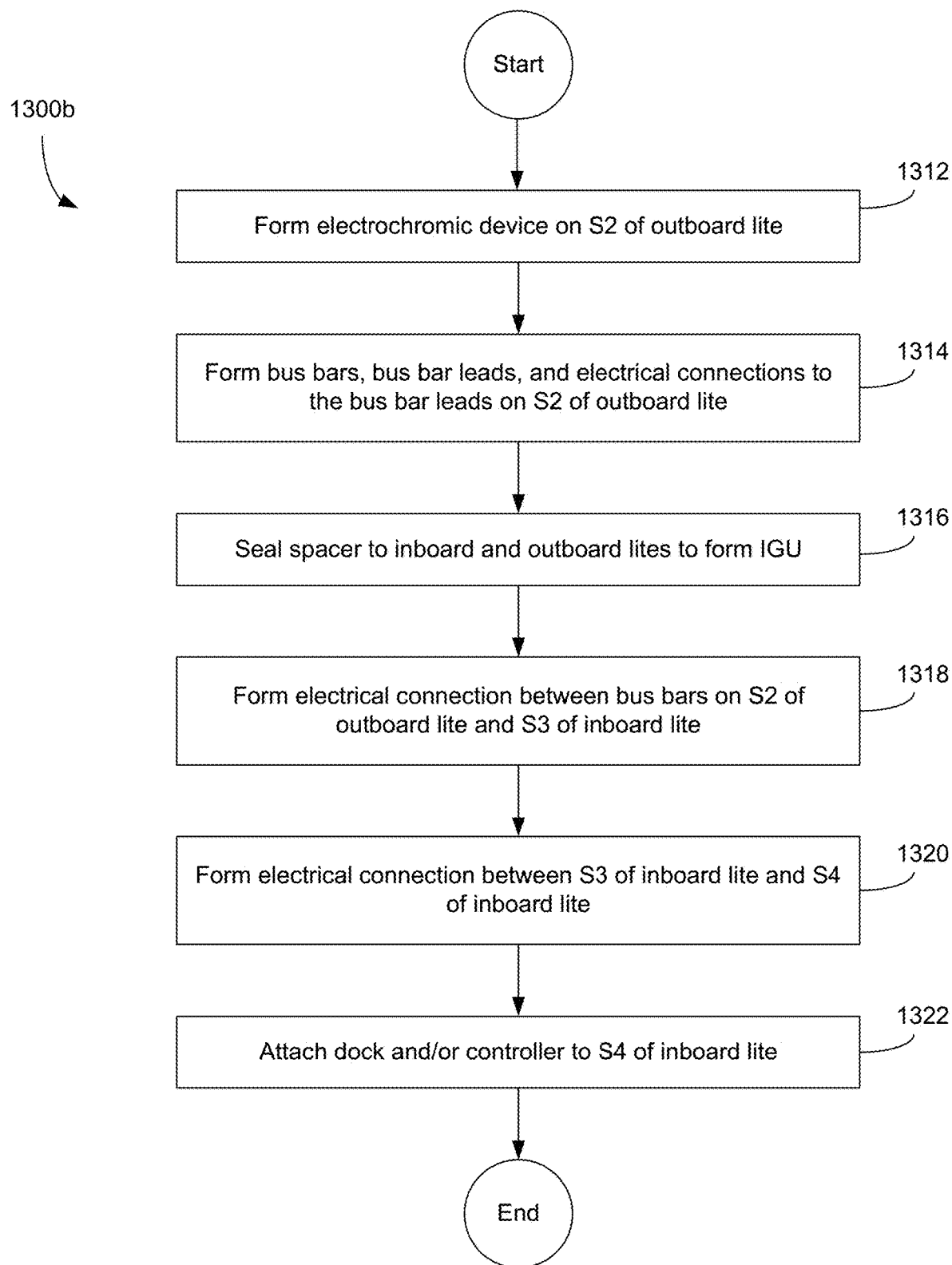

FIGS. 13A and 13B present flowcharts for methods 1300 and 1300b of manufacturing an electrochromic IGU according to certain embodiments. The method 1300b of FIG. 13B presents a particular embodiment of the method 1300 of FIG. 13A, where the IGU includes (1) an electrochromic device positioned on surface S2 of the outboard lite, and (2) an on-board controller provided in a carrier that interfaces with a dock positioned on surface S4 of the inboard lite, as shown in FIGS. 10A-C, 10E, and 10F. The method 1300 of FIG. 13A begins at operation 1301, where the electrochromic device is formed on the first lite. Formation of electrochromic devices is discussed further in U.S. patent application Ser. No. 12/645,111, filed Dec. 22, 2009, and titled "FABRICATION OF LOW DEFECTIVITY ELECTROCHROMIC DEVICES," which is herein incorporated by reference in its entirety.

At step 1303, the bus bars are formed on the first lite, as are any additional electrical connections that feed power to the bus bars (e.g., bus bar leads, and any electrical connections that may be printed on the first lite, such as connections 1132a and 1132b from FIGS. 11B and 11C), including connection points as described. At step 1305, the spacer is sealed between the first and second lites, thereby forming the IGU. This step may include applying a primary seal material between the spacer and each lite. Eventually, a secondary seal material may be applied around the perimeter of the spacer to impart further sealing. At operation 1307, the electrical connection is formed between the bus bars on the first lite and the location where a dock/carrier or other on-board controller will be positioned. This may be accomplished using a wide variety of dock/carrier, controller, user interface positions and many different kinds of electrical connections, including those as described herein. At step 1309, the dock and/or controller are attached to the IGU at the desired location. Secondary seal material may be applied any time after step 1307, for example.

With reference to FIG. 13B, the method 1300b begins at step 1312, where the electrochromic device is formed on surface S2 of the outboard lite. At step 1314, the bus bars, bus bar leads, and electrical connections to the bus bar leads are formed on surface S2 of the outboard lite. In one example, this step involves printing conductive lines around the perimeter of the electrochromic lite. The conductive lines may connect to the bus bar leads to thereby deliver power to the bus bars. The conductive lines may themselves be bus bar leads in some cases. The conductive lines may be provided at a number of locations (as shown in FIG. 11C, for instance), thereby enabling a dock/carrier or other controller to be positioned at any of the different locations, as desired during later manufacturing. At step 1316, the space is sealed between the inboard and outboard lites, typically via a primary sealant positioned between the spacer and each lite. As mentioned with reference to FIG. 13A, an additional secondary seal material may be provided at a later time, for example after step 1320. At step 1318, the electrical connection is formed between the bus bars positioned on surface S2 of the outboard lite and surface S3 of the inboard lite. This may involve installing any of various types of electrical connections, for example electrical connection 1006 in FIG. 10A, or block 1021 in FIG. 10B, or wire 1022 in FIG. 10C. At step 1320, the electrical connection is formed between surface S3 of the inboard lite and surface S4 of the inboard lite. Like step 1318, this may be accomplished using a variety of electrical connections, such as electrical connection 1006 from FIG. 10A, or electrical connection 1020 from FIGS. 10B and 10C. At step 1322, the dock and/or controller may be attached to surface S4 of the inboard lite. The steps shown in FIGS. 13A and 13B may be performed in any appropriate order.

In certain other embodiments, an on-board window controller (provided as a carrier and/or dock, or as a different on-board controller that does not utilize a dock) may be provided outside the viewable area of the IGU. One example is described above with reference to FIG. 2A. The window controller in these cases may be positioned at a variety of locations. For example, the window controller may be positioned wholly or partially between the panes of the IGU. The window controller may be positioned wholly or partially within a frame of window assembly. The window controller may be positioned outside the outer edge of the spacer, or inside the inner edge of the spacer, or within the hollow interior of the spacer itself. The different designs provide varying advantages and disadvantages in terms of aesthetics and accessibility/serviceability, and may be chosen as appropriate for a particular application. In some embodiments it is beneficial to position the window controller such that it is not in the interior sealed region of the IGU, e.g., to prevent damage from any substance that may outgas from the controller and allow access to the controller for servicing.

An IGU may be provided in a sub-frame in certain embodiments. A sub-frame is a frame that extends around the perimeter of the IGU (or a portion or substantial portion thereof), which is positioned within a conventional frame when the IGU is installed. The sub-frame may house one or more components of the electrochromic window. For instance, the sub-frame may house a window controller or portions of a window controller. Example components that may be positioned within or on a sub-frame include, but are not limited to, sensors, receivers, transmitters, electrical connections, and cellular repeaters. Often, the sub-frame is affixed to an IGU and is constructed such that it is fairly close to the outer dimensions of the IGU. In certain embodiments, the sub-frame extends no more than about 2 inches for instance no more than about 1 inch or 0.5 inches from the outer perimeter of the panes of the IGU. The sub-frame may be solid or hollow, or a combination thereof. The hollow portions may house various components as mentioned above. The components may also be attached to, but not within, the sub-frame. The sub-frame may include docks into which a controller may be positioned, similar to the embodiment shown in FIG. 8.

One embodiment is a window assembly having at least one EC pane, where the window assembly includes a window controller. The window assembly may also include a frame or sub-frame. The window assembly may include a laminate or an IGU (which may have panes that are laminates or not). In one embodiment, the window controller includes: a power converter configured to convert a low voltage, for example 24V, to the power requirements of said at least one EC pane, for example between 2V and 10V; a communication circuit for receiving and sending commands to and from a remote controller, and receiving and sending input to and from; a microcontroller comprising a logic for controlling said at least one EC lite based at least in part by input received from one or more sensors; and a driver circuit for powering said at least one EC device.

Figure 2E:
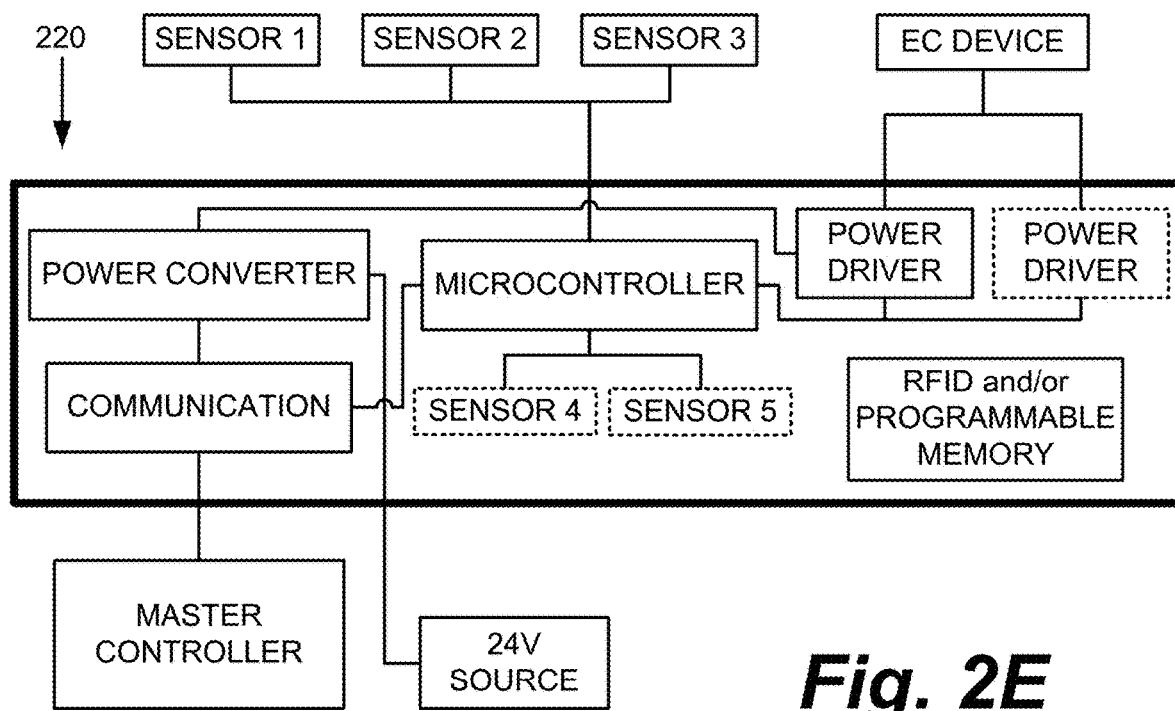
FIG. 2E is a schematic of an onboard window controller.

FIG. 2E, depicts an example window controller 220 in some detail. Controller 220 includes a power converter configured to convert a low voltage to the power requirements of an EC device of an EC lite of an IGU. This power is typically fed to the EC device via a driver circuit (power driver). In one embodiment, controller 220 has a redundant power driver so that in the event one fails, there is a backup and the controller need not be replaced or repaired.

Controller 220 also includes a communication circuit (labeled "communication" in FIG. 2E) for receiving and sending commands to and from a remote controller (depicted in FIG. 2E as "master controller"). The communication circuit also serves to receive and send input to and from a microcontroller. In one embodiment, the power lines are also used to send and receive communications, for example, via protocols such as ethernet. The microcontroller includes a logic for controlling the at least one EC lite based, at least in part, by input received from one or more sensors and/or users. In this example sensors 1-3 are, for example, external to controller 220, for example in the window frame or proximate the window frame. In one embodiment, the controller has at least one or more internal sensors. For example, controller 220 may also, or in the alternative, have "onboard" sensors 4 and 5. In one embodiment, the controller uses the EC device as a sensor, for example, by using current-voltage (I/V) data obtained from sending one or more electrical pulses through the EC device and analyzing the feedback. This type of sensing capability is described in U.S. patent application Ser. No. 13/049,756, naming Brown et al. as inventors, titled "Multipurpose Controller for Multistate Windows," which is incorporated by reference herein for all purposes. A window assembly may also include a PV cell, and the controller may use the PV cell not only to generate power, but also as a photosensor.

In one embodiment, the controller includes a chip, a card or a board which includes appropriate logic, programmed and/or hard coded, for performing one or more control functions. Power and communication functions of controller 220 may be combined in a single chip, for example, a programmable logic device (PLD) chip, field programmable gate array (FPGA) or similar device. Such integrated circuits can combine logic, control and power functions in a single programmable chip. In one embodiment, where the EC window (or IGU) has two EC panes, the logic is configured to independently control each of the two EC panes. In one embodiment, the function of each of the two EC panes is controlled in a synergistic fashion, that is, so that each device is controlled in order to complement the other. For example, the desired level of light transmission, thermal insulative effect, and/or other property are controlled via combination of states for each of the individual devices. For example, one EC device may have a colored state while the other is used for resistive heating, for example, via a transparent electrode of the device. In another example, the two EC device's colored states are controlled so that the combined transmissivity is a desired outcome.

Controller 220 may also have wireless capabilities, such as control and powering functions. For example, wireless controls, such as RF and/or IR can be used as well as wireless communication such as Bluetooth, WiFi, Zigbee, EnOcean and the like to send instructions to the microcontroller and for the microcontroller to send data out to, for example, other window controllers and/or a building management system (BMS). Various wireless protocols may be used as appropriate. The optimal wireless protocol may depend on how the window is configured to receive power. For instance, if the window is self-powered through a means that produces relatively less power, a communication protocol that uses relatively less power may be used. Similarly, if the window is permanently wired, for example with 24V power, there is less concern about conserving power, and a wireless protocol that requires relatively more power may be used. Zigbee is an example of a protocol that uses relatively more power. WiFi and Bluetooth Low Energy are examples of protocols that use relatively less power. Protocols that use relatively less power may also be beneficial where the window is powered intermittently.

Wireless communication can be used in the window controller for at least one of programming and/or operating the EC window, collecting data from the EC window from sensors as well as using the EC window as a relay point for wireless communication. Data collected from EC windows also may include count data such as number of times an EC device has been activated (cycled), efficiency of the EC device over time, and the like. Each of these wireless communication features is described in U.S. patent application Ser. No. 13/049,756, naming Brown et al. as inventors, titled "Multipurpose Controller for Multistate Windows," which was incorporated by reference above.

In certain embodiments, light is used to communicate with and/or power a window controller. That is, light generated at a distance by, for example, a diode laser transmits power and/or control signals to a window controller via an appropriate light transmission medium such as a fiber optic cable or free space. Examples of suitable photonic transmission methods for window controllers are described in PCT Application No. PCT/US13/56506, filed Aug. 23, 2013, and titled "PHOTONIC-POWERED EC DEVICES," which is herein incorporated by reference in its entirety. In a particular embodiment, power is provided through photonic methods, while communication is provided via one or more antennae patterned onto a lite of an electrochromic window or an associated IGU component. In another embodiment, power is provided through photonic methods, while communication is provided via Wi-Fi or another wireless communication method.

Returning to the embodiment of FIG. 2E, controller 220 may also include an RFID tag and/or memory such as solid state serial memory (e.g., I2C or SPI) which may optionally be a programmable memory. Radio-frequency identification (RFID) involves interrogators (or readers), and tags (or labels). RFID tags use communication via electromagnetic waves to exchange data between a terminal and an object, for example, for the purpose of identification and tracking of the object. Some RFID tags can be read from several meters away and beyond the line of sight of the reader.

Most RFID tags contain at least two parts. One is an integrated circuit for storing and processing information, modulating and demodulating a radio-frequency (Rf) signal, and other specialized functions. The other is an antenna for receiving and transmitting the signal.

There are three types of RFID tags: passive RFID tags, which have no power source and require an external electromagnetic field to initiate a signal transmission, active RFID tags, which contain a battery and can transmit signals once a reader has been successfully identified, and battery assisted passive (BAP) RFID tags, which require an external source to wake up but have significant higher forward link capability providing greater range. RFID has many applications; for example, it is used in enterprise supply chain management to improve the efficiency of inventory tracking and management.

In one embodiment, the RFID tag or other memory is programmed with at least one of the following types of data: warranty information, installation information (e.g., absolute and relative position and orientation of the window), vendor information, batch/inventory information, EC device/IGU characteristics, EC device cycling information and customer information. Examples of EC device characteristics and IGU characteristics include, for example, window voltage ($V_W$), window current ($I_W$), EC coating temperature ($T_{EC}$), glass visible transmission (% $T_{vis}$), % tint command (external analog input from BMS), digital input states, and controller status. Each of these represents upstream information that may be provided from the controller to a BMS or window management system or other building device. The window voltage, window current, window temperature, and/or visible transmission level may be detected directly from sensors on the windows. The % tint command may be provided to the BMS or other building device indicating that the controller has in fact taken action to implement a tint change, which change may have been requested by the building device. This can be important because other building systems such as HVAC systems might not recognize that a tint action is being taken, as a window may require a few minutes (e.g., 10 minutes) to change state after a tint action is initiated. Thus, an HVAC action may be deferred for an appropriate period of time to ensure that the tinting action has sufficient time to impact the building environment. The digital input states information may tell a BMS or other system that a manual action relevant to the smart window has been taken. Finally, the controller status may inform the BMS or other system that the controller in question is operational, or not, or has some other status relevant to its overall functioning.

Examples of downstream data from a BMS or other building system that may be provided to the controller include window drive configuration parameters, zone membership (e.g., what zone within the building is this controller part of), % tint value, digital output states, and digital control (tint, bleach, auto, reboot, etc.). The window drive parameters may define a control sequence (effectively an algorithm) for changing a window state. Examples of window drive configuration parameters include bleach to color transition ramp rate, bleach to color transition voltage, initial coloration ramp rate, initial coloration voltage, initial coloration current limit, coloration hold voltage, coloration hold current limit, color to bleach transition ramp rate, color to bleach transition voltage, initial bleach ramp rate, initial bleach voltage, initial bleach current limit, bleach hold voltage, bleach hold current limit. Examples of the application of such window drive parameters are presented in U.S. patent application Ser. No. 13/049,623, titled "Controlling Transitions In Optically Switchable Devices," which is incorporated herein by reference in its entirety.

The % tint value may be an analog or digital signal sent from the BMS or other management device instructing the onboard controller to place its window in a state corresponding to the % tint value. The digital output state is a signal in which the controller indicates that it has taken action to begin tinting. The digital control signal indicates that the controller has received a manual command such as would be received from an interface 504 as shown in FIG. 5B. This information can be used by the BMS to, for example, log manual actions on a per window basis.

In one embodiment, a programmable memory is used in controllers described herein. This programmable memory can be used in lieu of, or in conjunction with, RFID technology. Programmable memory has the advantage of increased flexibility for storing data related to the IGU to which the controller is matched.

Figure 3A:
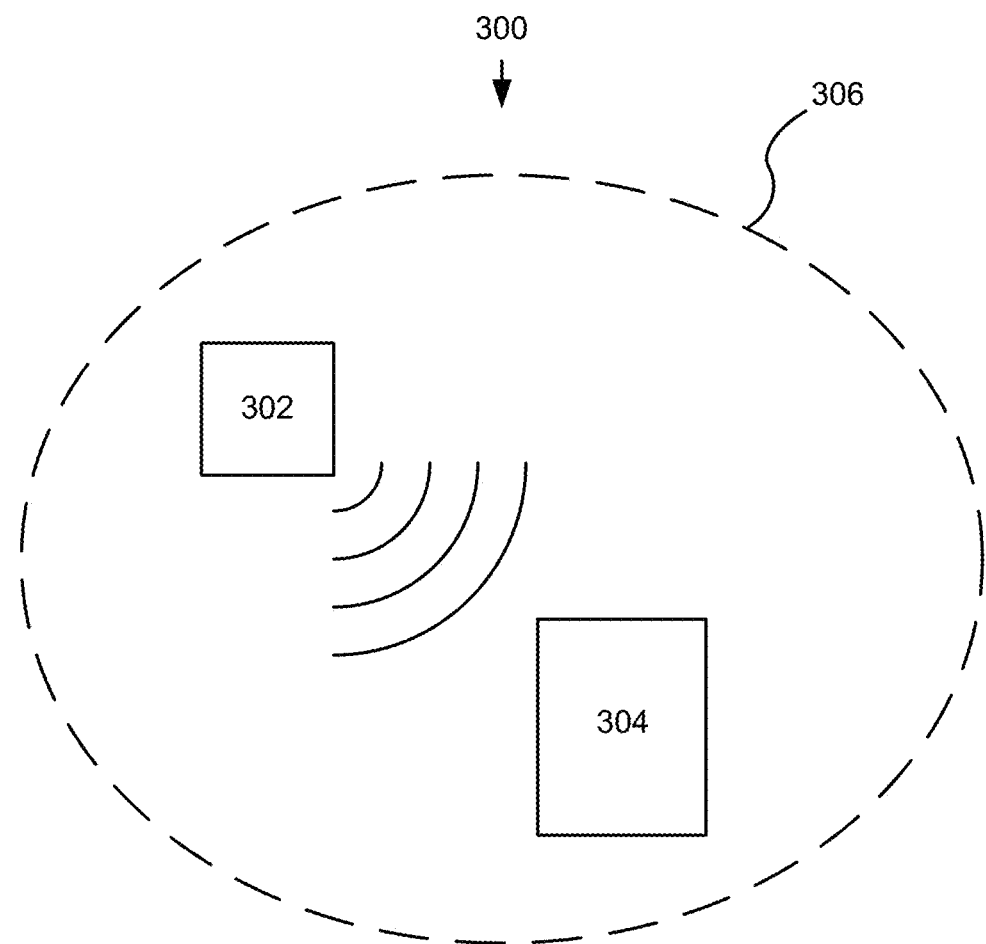
FIGS. 3A-3F are schematic representations of wireless power transmission networks as described herein.
Figure 3B:
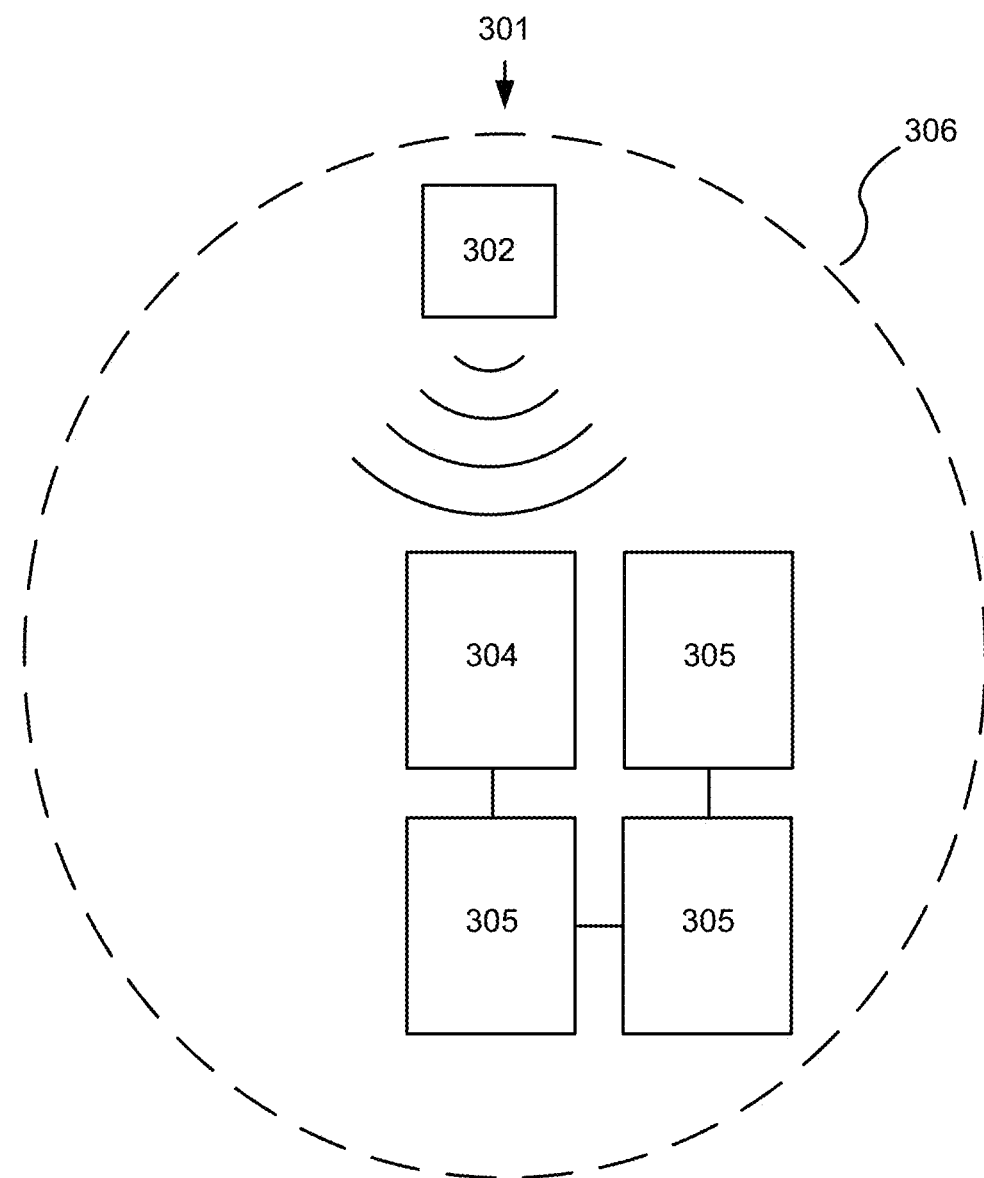
Figure 3C:
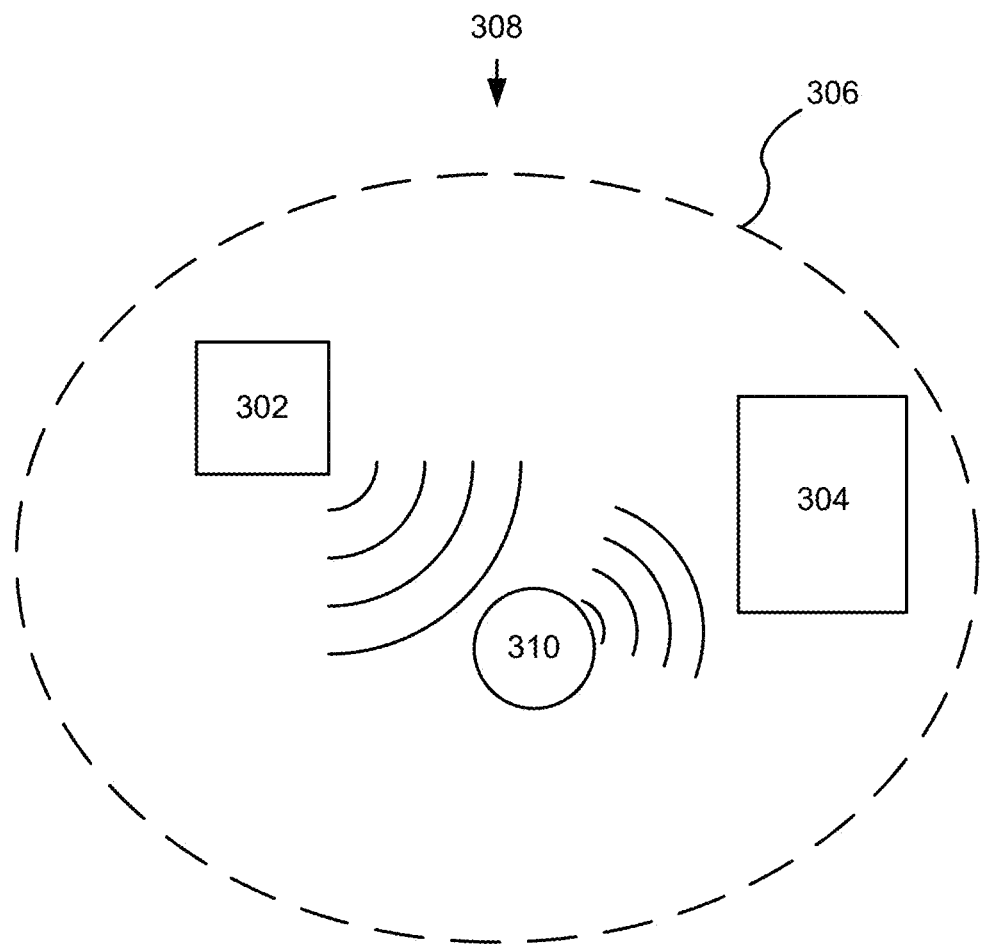
Figure 3D:
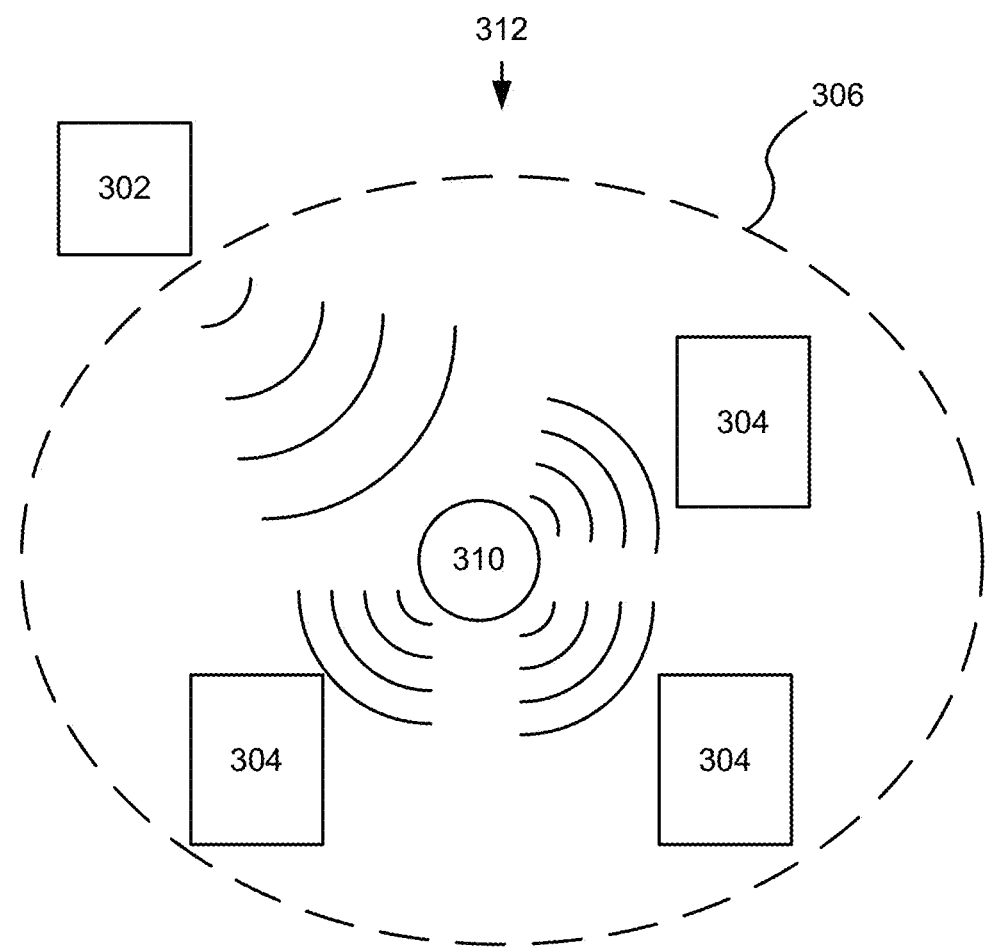
Figure 3E:
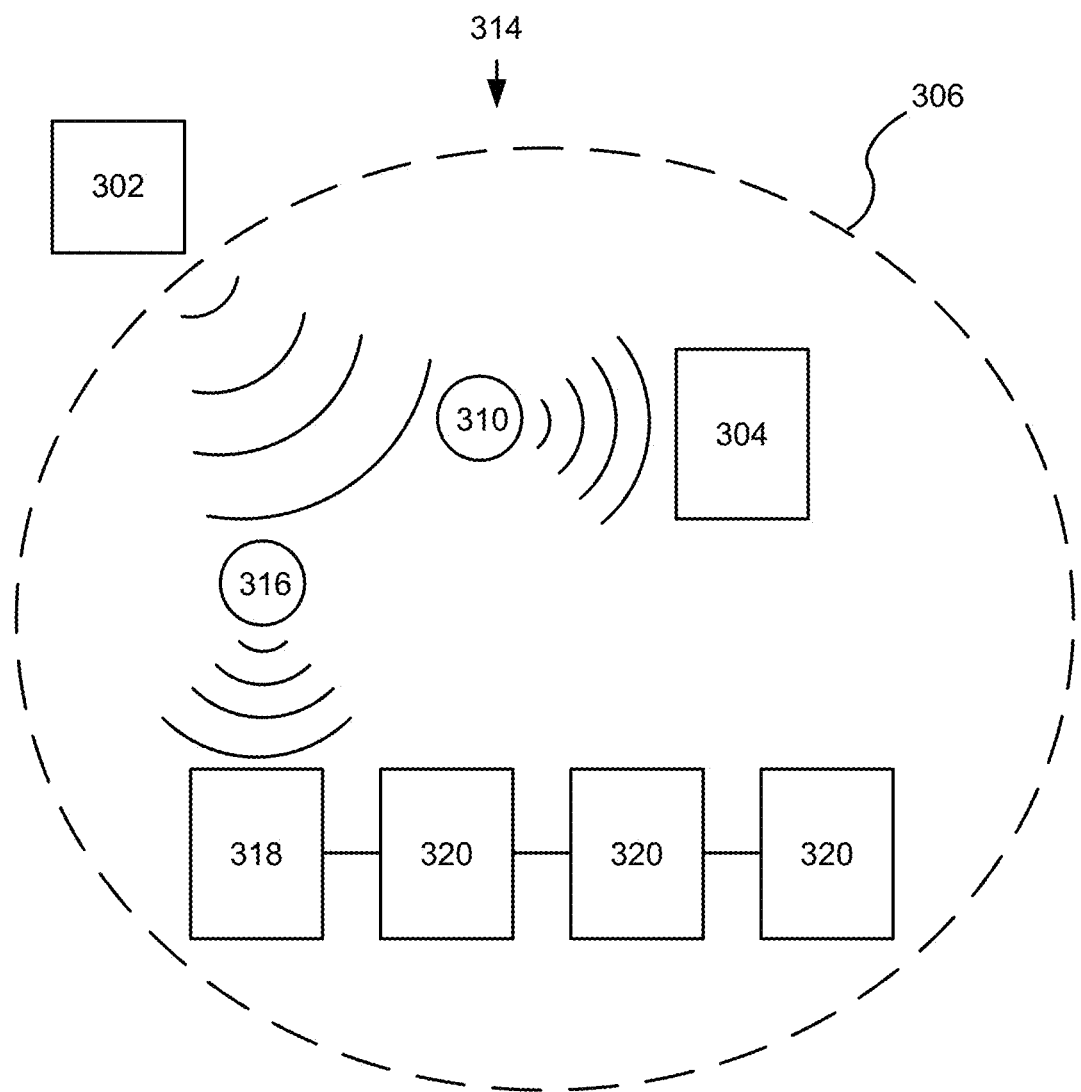
Figure 3F:
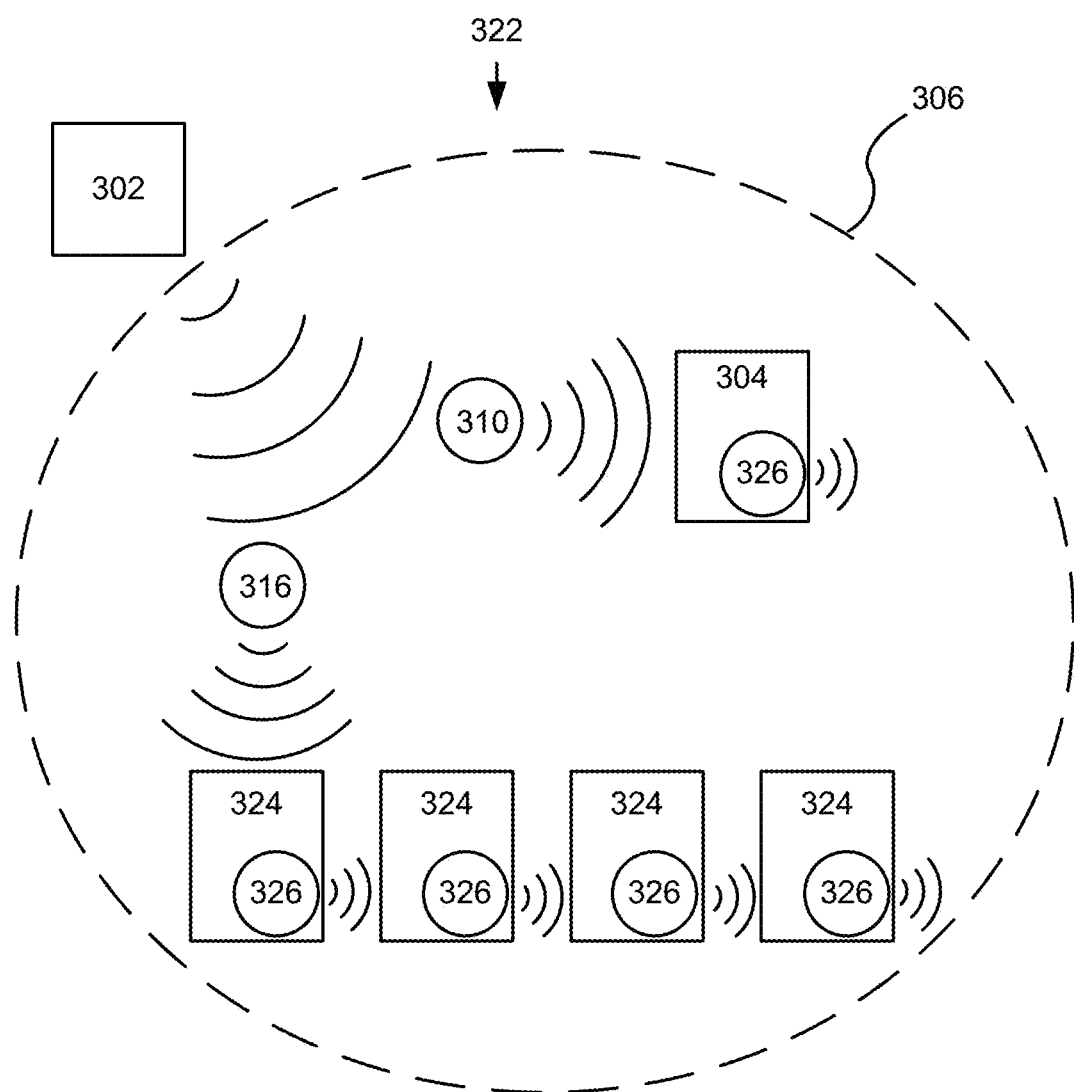
Figure 3G:
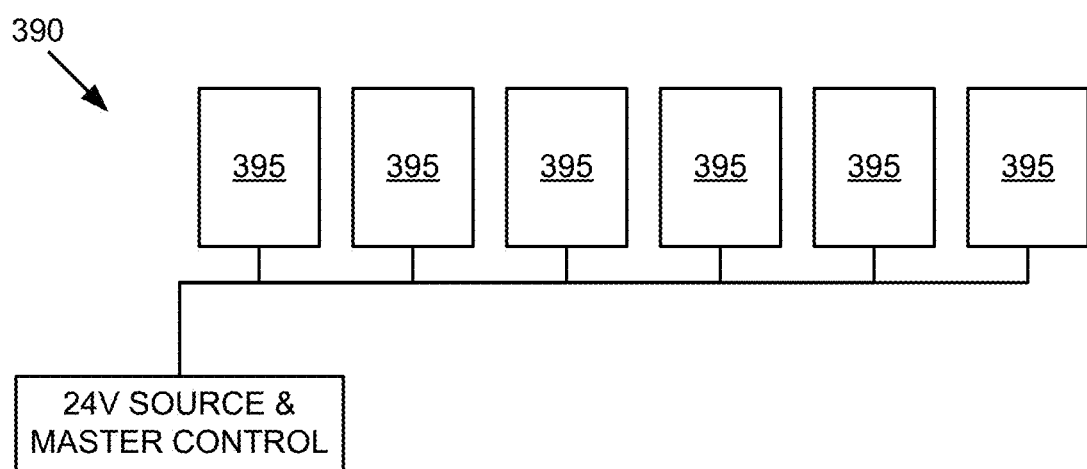
FIG. 3G depicts a wiring scheme including EC windows with onboard window controllers.
Figure 4A:
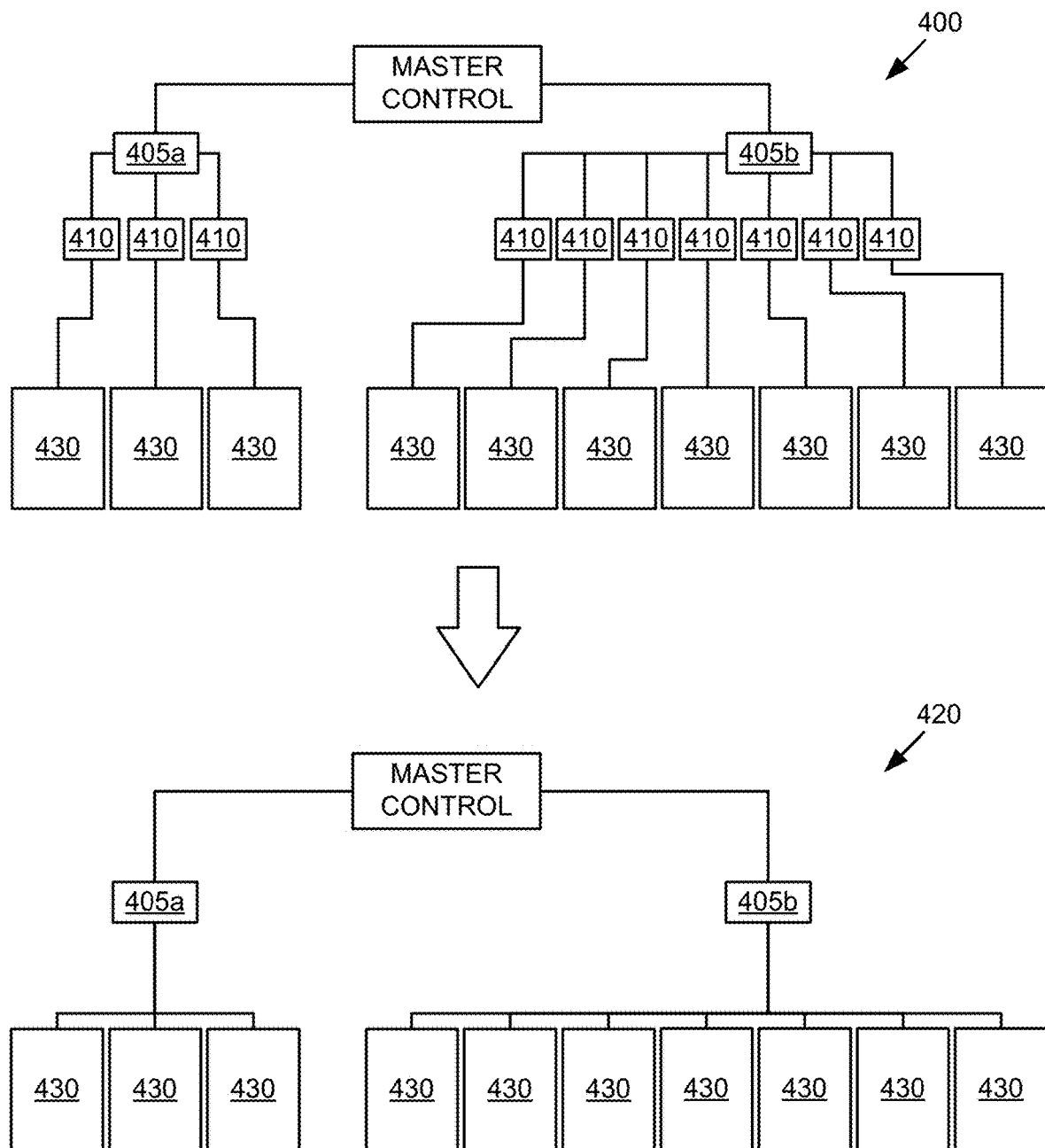
FIG. 4A depicts a distributed network of EC window controllers with conventional end or leaf controllers as compared to a distributed network with EC windows having onboard controllers.

Advantages of "localized" controllers, particularly "in situ" or "onboard" controllers, described herein are further described in relation to FIGS. 3G and 4A. FIG. 3G depicts an arrangement, 390, including EC windows, 395, each with an associated localized or onboard window controller (not shown). FIG. 3G illustrates that with onboard controllers, wiring, for example for powering and controlling the windows, is very simplified versus, for example, conventional wiring as depicted in FIG. 1B. In this example, a single power source, for example low voltage 24V, can be wired throughout a building which includes windows 395. There is no need to calibrate various controllers to compensate for variable wiring lengths and associated lower voltage (e.g., less than 10V DC) to each of many distant windows. Because there are not long runs of lower voltage wiring, losses due to wiring length are reduced or avoided, and installation is much easier and modular. If the window controller has wireless communication and control, or uses the power lines for communication functions, for example ethernet, then only a single voltage power wiring need be strung through the building. If the controller also has wireless power transmission or generation capabilities, then no wiring is necessary, since each window has its own controller. These factors significantly decrease the complexity of installing electrochromic windows, thereby making electrochromic windows more desirable for all customers (and especially for residential customers).

Window controllers and network controllers are further discussed in U.S. Provisional Patent Application No. 62/248,181, filed Oct. 29, 2015, and titled "CONTROLLERS FOR OPTICALLY-SWITCHABLE WINDOWS", which is herein incorporated by reference. As discussed elsewhere herein, the window controllers may communicate with network or master controllers in some cases.

Wireless Powered and Self-Powered Windows

Electrochromic windows utilize a power source to drive optical transitions. In many conventional cases, the power source is a building power source that is routed, via wires, throughout the building to the individual IGUs. As a result, installation of electrochromic windows is often relatively labor intensive. In some embodiments herein, electrochromic windows may be wirelessly powered and/or self-powered, which eliminates the need to run wires throughout the building to power each IGU. Such windows are particularly easy and convenient to install. In some cases, an entire network of electrochromic windows may be wirelessly powered and/or self-powered. In some other cases, certain electrochromic windows on a network may be wirelessly powered and/or self-powered, while other electrochromic windows on the network may be powered through a wired building power supply. In some such cases, the wirelessly and/or self-powered windows may be the windows on the network that are most difficult to route wires to, for example a skylight. In still other cases, one or more electrochromic windows on a network may be self-powered in addition to being powered via wires connected to a building's power supply, as discussed further below.

In various embodiments, the window/controller may have wireless power and/or self-power functionality. Returning to the embodiment of FIG. 2E, controller 220 may have one or more wireless power receivers, that receive transmissions from one or more wireless power transmitters and thus controller 220 can power the EC window via wireless power transmission. Wireless power transmission includes, for example but not limited to, induction, resonance induction, radio frequency power transfer, microwave power transfer and laser power transfer. In one embodiment, power is transmitted to a receiver via radio frequency, and the receiver converts the power into electrical current utilizing polarized waves, for example circularly polarized, elliptically polarized and/or dual polarized waves, and/or various frequencies and vectors. In another embodiment, power is wirelessly transferred via inductive coupling of magnetic fields. Exemplary wireless power functions of electrochromic windows is described in U.S. patent application Ser. No. 12/971,576, filed Dec. 17, 2010, titled "Wireless Powered Electrochromic Windows", and naming Robert Rozbicki as inventor, which is incorporated by reference herein in its entirety. In some embodiments, power may be transmitted through the glass panes, for example to a controller within the IGU, or directly to bus bars of the IGU.

In certain embodiments, the controller may be configured to have dimensions that are relatively small. Smaller controllers are beneficial, particularly where the controllers are on-board.

Wireless power transmission is the process that takes place where electrical energy is transmitted from a power source to an electrical load, without interconnecting wires. In the broadest sense, electrical current can pass through the environment, be it air, water or solid objects without the need for wires. More useful (controlled) forms of wireless power transmission exist, for example transmitting power via RF, magnetic induction, lasers or microwave energy. Wireless transmission finds particular use in applications where instantaneous or continuous energy transfer is needed, but interconnecting wires are inconvenient, problematic, hazardous, or impossible (e.g., in the residential glass market such wires can be quite inconvenient or even prohibitive for many customers). Wireless power transfer may be inductive, including electrodynamic induction, or based upon other known energy transfer mediums such as radio frequency (RF), microwaves and lasers. The wireless power may power a window directly, or it may be used to charge a battery that directly powers the window.

In some embodiments, power is transferred via RF, and transformed into electrical potential or current by a receiver in electrical communication with an EC device, particularly an EC window. One particularly useful method of transferring power via RF is described in US Patent Publication 2007/0191074, from application Ser. No. 11/699,148 filed Jan. 29, 2007, entitled "Power Transmission Network and Method," by Daniel W. Harrist, et al., which is herein incorporated by reference for all purposes.

In other embodiments, power is transferred via magnetic induction using a first resonator powered by an external power supply and a second resonator which converts the magnetic field energy created by the first resonator into power that supplies the EC device of the EC window. One particularly useful method of transferring power via magnetic induction is described in US Patent Publication 2007/0222542, from application Ser. No. 11/481,077 filed Jul. 5, 2006, entitled "Wireless Non-radiative Energy Transfer," by John Joannapoulos, et al., which is herein incorporated by reference for all purposes. Another useful method of controlling wireless inductive power is described in U.S. Pat. No. 7,382,636, filed Oct. 14, 2005, entitled "System and Method for Powering a Load," by David Baarman, et al., which is herein incorporated by reference for all purposes. EC windows described herein can incorporate such methods of controlling wireless power transmission.

Certain embodiments include more than one wireless power transmission source, that is, the invention is not limited to embodiments where a single wireless power transmission source is used. For example, in embodiments were a wireless power transmission network is used, one wireless power transmission method, for example RF power transmission, is used in part of the network, while another method, for example, magnetic induction, is used in another part of the network. Further, where the windows are connected in a network, for example a mesh network, wireless power may be delivered from one window on the network to another. In this way, the wireless power may transfer from window to window as needed across the network.

One aspect of the disclosed embodiments is an EC window powered by a wireless power transmission source. In one embodiment, the EC window can be of any useful size, e.g., in automotive use, such as in a sunroof or a rear view mirror where wiring is inconvenient, for example having to pass through a windshield of a car. In one embodiment, the EC window uses architectural scale glass as a substrate for the EC device of the window. Architectural glass is glass that is used as a building material. Architectural glass is typically used in commercial buildings, but may also be used in residential buildings and typically, but not necessarily, separates an indoor environment from an outdoor environment. Architectural glass is at least 20 inches by 20 inches, and can be as large as about 80 inches by 80 inches. In some embodiments, the EC device is all solid state and inorganic. The window will have a receiver, for example an RF receiver or resonator, as part of a window assembly and sometimes part of the IGU itself (e.g., between panes of the IGU). In one example, the wireless power receiver is positioned wholly or partially within a frame of a window assembly. The wireless power receiver may also be integrated into the IGU. In fact, the wireless power receiver may be positioned at any location where the on-board controller is located. As such, descriptions relating to the position of the on-board controller may also be applied to the position of the wireless power receiver. The on-board controller may include the wireless power receiver in some cases, while in other cases these may be separate elements.

In one embodiment, the wireless power transmission source transmits power via a radio frequency. In such embodiments, the EC window includes a radio frequency receiver, where the radio frequency receiver configured to convert the radio frequency to electrical energy (e.g., an electrical current or potential) used to power an EC device in the EC window. Powering the EC device includes at least one of powering an optical transition or an optical state of the EC device. In another embodiment, power is wirelessly transferred via inductive coupling of magnetic fields. In general terms, a primary coil (that converts electrical energy, e.g., AC, running through the coil into a magnetic field) supplied by a power source generates a magnetic field and a secondary coil is coupled to the magnetic field and thereby produces electrical energy via induction. The electrical energy produced by the secondary coil is used to power the EC device, in particular embodiments an EC device of an EC window. In a specific embodiment where resonance coupled magnetic energy is utilized, power is wirelessly transferred via a first resonator, which receives power from an external supply hard wired to the first resonator, and a second resonator, which acts as the receiver by producing an electric current via coupling of the magnetic resonance fields of the first and second resonators. Although embodiments utilizing magnetic induction need not necessarily use resonance coupled magnetic fields, in those that do, near-field resonance from localized evanescent magnetic field patterns is a relatively efficient method of wireless power transfer.

In particular embodiments, the receiver is of relatively small dimensions. "Small dimensions" means, for example, that the receiver occupies not more than about 5% of the viewable area of the EC window. In one embodiment, the receiver occupies none of the viewable area of the EC window, that is, the receiver is of sufficiently small dimensions that the user of the window may not recognize the receiver as being part of the window, but rather the receiver is hidden from the view of the user, e.g., housed in the frame of the window. In one embodiment, where the receiver is housed in seal area of the IGU, the frame of the window can have one or more access ports for servicing the receiver or the receiver can be sealed permanently in the window frame. There may also be ports and/or materials transparent to the wireless power transmission, so that the receiver can properly receive the wireless power transmissions without interference from the window frame material.

In one embodiment, the wireless power transmission is carried out via a network which includes one or more power nodes for transmitting power to window receivers in particular areas. Wireless power transmission networks described herein can use RF, magnetic induction or both, depending on the need. Depending on the building, one or more, sometimes several nodes are used to form a network of power nodes which feed power to their respective window receivers. In one embodiment, where radio frequency is used to transmit power and there are more than one power node, there are more than one frequency and/or polarization vector used in the power nodes, so that different levels or types of power are transferred from the various nodes to windows having different power needs.

In one embodiment, where magnetic induction is used for wireless power transfer, there also are one or more power nodes, but in this embodiment, the power nodes are themselves resonators. For example, in one embodiment, a first resonator, which receives power via a power supply, is resonance coupled to a second resonator, and the second resonator is resonance coupled to a third resonator, for example that delivers power to an EC window. In this way, the second resonator acts as a power node in a power transfer network from the first resonator, to the second resonator, to the third resonator, the third resonator acting as the receiver and transmitting power to the EC window via conversion of magnetic field to electrical power. In this way, near field magnetic energy can span longer distances in order to suit the needs of the particular building's EC windows.

FIG. 3A is a schematic representation of a wireless power transmission network, 300. The wireless power transmission network has a wireless power transmitter, 302, that transmits wireless power, for example via RF power or magnetic induction as described herein, to an EC window 304. Electrochromic window 304 is configured with a receiver that converts the wirelessly transmitted power to electrical energy that is used to operate the EC device in the EC window and/or window controllers, sensors and the like. In one embodiment, the electrical energy is a voltage potential used to power the EC device's transitions and/or maintain optical states. Typically, the EC device will have an associated controller, e.g., a microprocessor that controls and manages the device depending on the input. Additionally, the EC device can be controlled and managed by an external controller which communicates with the device via a network. The input can be manually input by a user, either directly or via wireless communication, or the input can be from an automated heat and/or energy management system of a building of which the EC window is a component.

The wireless power transmission network is generally defined by area, 306, that is, transmission of power generally is localized to area 306, but not necessarily so. Area 306 can define an area where one or more windows reside and where wireless power will be transmitted. Transmitter 302 can be outside area 306 in some embodiments (and transmit power into the area) or inside area 306 as depicted in FIG. 3A. In one embodiment, the wireless power receiver resides proximate the IGU of the EC window. In another embodiment, the wireless power receiver is part of the IGU. In some cases the receiver does not obstruct the view through the EC window, and in other cases the receiver may be positioned within the viewable area, in the same or similar configuration as the on-board window controller 220 in FIGS. 2B-2E. One of ordinary skill in the art would appreciate that a wireless power network as described can contain a plurality of EC windows to which power is supplied wirelessly via one or more transmitters. Also, the electrical energy produced via the wireless power can be used to augment a battery supply or a photovoltaic power supply in the EC window. In one embodiment, the photovoltaic power supply is used to augment battery charging performed via wireless power transmission.

FIG. 3B is a schematic representation of another wireless power transmission network, 301. Network 301 is much like network 300 as described above in relation to FIG. 3A, except that the wireless power transmitted from transmitter 302 that is received by a receiver in EC window 304 is used to power not only window 304 but also windows 305. That is, the receiver in a single window is configured to convert wireless power transmissions into electrical energy in order to power more than one EC window, either directly or via a battery or batteries that are charged by the receiver. In this example, a receiver associated with window 304 converts the wireless power transmissions into electrical energy and transfers the energy via wires to windows 305. This has the advantage of not relying on a receiver for each window, and, although some wiring is used, it is localized to the window installation area, providing electrical communication between the windows, rather than having to be run throughout a building. Also, since EC windows do not have high power requirements, this configuration is practical.

FIG. 3C is a schematic representation of another wireless power transmission network, 308. Network 308 is much like network 300 as described above in relation to FIG. 3A, except that the wireless power transmitted from transmitter 302 is not received directly by a receiver in EC window 304, but rather relayed via a power node 310. Power node 310 can either relay the power in the same form as that which it received (e.g., via an RF antenna or induction coil) or be configured to change the wireless power and transmit it to the receiver in a form more suited to the (ultimate) requirements of window 304. In one example, the power node receives the wireless power transmission in one form, either RF or magnetic induction, and transmits wireless power to window 304 in the other of the other of the aforementioned forms. In certain cases, one or more electrochromic windows on a network include power nodes, such that power can be transferred throughout the building by jumping from one window/power node to the next. One embodiment is power node including: a wireless power transmission receiver; configured to receive wireless power transmissions in one or more forms and convert the transmissions to electrical energy; and a wireless power transmitter configured to convert the electrical energy into wireless power transmissions in said one or more forms. In one embodiment, the wireless power transmitter is configured to convert the electrical energy into the same form of wireless power transmission than the wireless power receiver is configured to receive. Although the form is the same, there may be, for example, different frequency or polarity used so that the receiver of the power node can distinguish between the wireless transmissions from transmitter 302 and the transmitter of the power node 310. In one embodiment, the wireless power transmitter is configured to convert the electrical energy into a different form of wireless power transmission than the wireless power receiver is configured to receive.

FIG. 3D is a schematic representation of another wireless power transmission network, 312. Network 312 is much like network 308 as described above in relation to FIG. 3C, except that the wireless power transmitted from transmitter 302 is relayed via a power node 310 to a plurality of windows 304. Again, power node 310 can either relay the power in the same form as that which it received (e.g., via an RF antenna or induction coil) or be configured to change the wireless power and transmit it to the receiver in a form more suited to the (ultimate) requirements of windows 304. In this example, transmitter 302 is outside of area 306. In this example, the power requirements of windows 304 are the same, however the invention is not so limited. That is, the wireless power transmitted from node 310 can be of a sufficient level so as to satisfy the power requirements of EC windows having different power needs, for example, where components for appropriately converting the wireless power transmissions from power node 310 to electrical energy are part of each window 304's receiver.

In one embodiment fulfilling the varying power requirements of different windows within a wireless power transmission network is accomplished using different power nodes for windows with different power needs. The power relayed from each node can be, for example, of different power level and/or transmitted in a different way. FIG. 3E is a schematic representation of one such wireless power transmission network, 314. Network 314 is much like network 312 as described above in relation to FIG. 3D, except that the wireless power transmitted from transmitter 302 is relayed via two power nodes, 310 and 316. Power node 310 can either relay the power in the same form as that which it received (e.g., via an RF antenna or induction coil) or be configured to change the wireless power and transmit it to the receiver (in window 304) in a form more suited to the (ultimate) requirements of window 304. Power node 316 relays the wireless power in a manner different than power node 310, which is to say that power node 316 is configured to change the wireless power and transmit it to the receiver in window 318 in a form more suited to the (ultimate) requirements of window 318. In this example, window 318 is configured to supply power to itself and to windows 320 through wiring. Window 318 receives wireless power transmissions from node 316 and the receiver of window 318 converts the wireless power transmission into sufficient power to operate window 318 and windows 320. Thus, in embodiments described herein, different power nodes can receive the same form of wireless energy, for example from a single transmitter, but relay the wireless energy in different formats for different EC devices (via associated receivers), in this example EC windows having different power requirements. In this example, transmitter 302 is outside of area 306. In a specific embodiment, a single wireless power transmitter transmits a wireless power and each of a plurality of EC windows includes a receiver specifically configured to convert the wireless power to an electrical energy suited for the particular needs of that window. In another embodiment, each window has an equivalent receiver that converts the wireless power into the same electrical energy, but the electrical energy is converted to the particular needs of the window by one or more electronic components, in communication with the receiver, for example a rectifier, voltage converter, frequency changer, transformer, or inverter.

FIG. 3F is a schematic representation of another wireless power transmission network, 322. The network 322 of FIG. 3F is similar to the network 314 of FIG. 3E, however, in this embodiment, each window 324 and 304 is equipped with both a wireless power receiver (not shown) as well as an on-board power node 326. Thus, each window both receives and transmits wireless power. In this way, the wireless power can be distributed over the network. The remaining elements of FIG. 3F are as described in relation to FIG. 3E. In some embodiments, only some of the windows on the network include a power node.

In some embodiments, the electrochromic window includes a mechanism for self-powering the window/window controller. In such embodiments, no external wiring is required to provide power to the window/controller. For example, the controller may be powered by batteries. As explained above, in certain embodiments the window is designed such that the controller is accessible. Such accessibility allows the batteries to be replaced or recharged as needed. Batteries (rechargeable or not) may be used in combination with any of the other power generation/distribution schemes described herein. Where a rechargeable battery is provided, the controller may include a circuit for recharging the battery via any available source. In some examples, batteries may be provided in combination with photovoltaics or the other power generation options, and these photovoltaics or other power generation options may be used to recharge the batteries. In a different example, power may come from both a wired power source (e.g., building power supply) and a rechargeable battery, and the wired power source may recharge the battery as desired. In another example, the controller may be powered by fuel cells.

Figure 7:
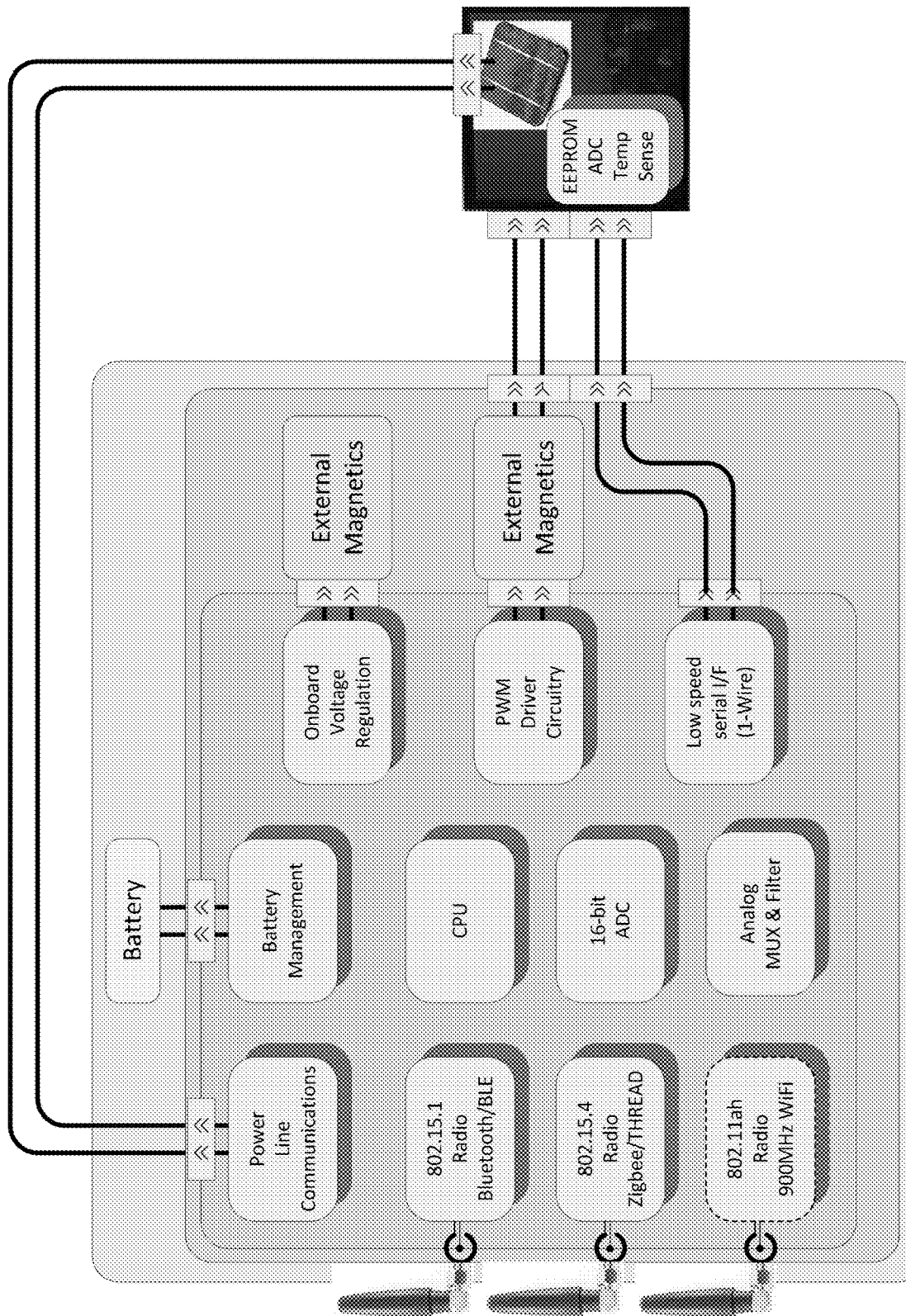
FIG. 7 depicts one embodiment of a self-powered wireless window configuration.

FIG. 7 provides one example of a self-powered wireless window implementation. A number of different features are shown.

In certain embodiments, the bus bars of an electrochromic window are equipped with wireless power receivers. Where this is the case, there is no need to provide wire leads directly to the bus bars. Instead, the bus bars can be powered directly through the wireless power receivers integral to the bus bars. A wireless power transmitter can be provided at any location as noted above. In some cases a wireless power transmitter is provided in a frame surrounding an IGU. In this case the wireless power transmitter may receive power from any available source (e.g., any of the power sources listed below including, for example, batteries, fuel cells, capacitors, photovoltaics, piezoelectric devices, thermoelectric devices, wired power from the electrical grid, and combinations thereof). In a similar embodiment, a wireless power transmitter may be provided in a controller and/or dock. In other cases the transmitter may be provided outside of the IGU, for example in a central power delivery location that may provide power to multiple windows. Wirelessly powered bus bars may be advantageous in that they reduce the risks associated with having wire leads directly on an electrochromic device.

The window may also generate power for powering the controller/window by taking advantage of solar, thermal, and/or mechanical energy available at the window. In one example, the window may include a photovoltaic (PV) cell/panel. The PV panel may be positioned anywhere on the window as long as it is able to absorb solar energy. For instance, the PV panel may be positioned wholly or partially in the viewable area of a window, and/or wholly or partially in/on the frame of a window. The PV panel may be part of the controller itself. Where the PV panel is not a part of the controller, wiring or another electrical connection may be provided between the PV panel and the controller.

In some embodiments, the PV cell is implemented as a thin film that coats one or more surfaces of the panes. In various embodiments, the window includes two individual panes (as in an IGU for example), each having two surfaces (not counting the edges). Counting from the outside of the building inwards, the first surface (i.e., the outside-facing surface of the outer pane) may be referred to as surface 1, the next surface (i.e., the inside-facing surface of the outer pane) may be referred to as surface 2, the next surface (i.e., the outside-facing surface of the inner pane) may be referred to as surface 3, and the remaining surface (i.e., the inside-facing surface of the inner pane) may be referred to as surface 4. The PV thin film (or other PV cell) may be implemented on any one or more of surfaces 1-4.

Conventionally, where a PV cell is contemplated for use in combination with an EC window, the EC stack is positioned toward the building interior relative to the PV film such that the EC stack does not reduce the energy gathered by the PV cell when the EC stack is in a tinted state. As such, the PV cell may be implemented on surface 1, the outside-facing surface of the outer pane. However, certain sensitive PV cells cannot be exposed to external environmental conditions and therefore cannot reliably be implemented on surface 1. For example, the PV cell may be sensitive to oxygen and humidity.

In certain embodiments, a PV film is applied to one of the window surfaces in an IGU or other multi-lite window assembly. In various cases the PV film may be transparent or substantially transparent. Examples of suitable PV films are available from Next Energy Technologies Inc. of Santa Barbara, Calif. The films may be organic semiconducting inks, and may be printed/coated onto a surface in some cases. Another example of suitable PV films are wavelength selective PV films made by Ubiquitous Energy, Inc. of Cambridge, Mass. and as described in US 2015/0255651.

To address air and water sensitivity of such PV films, a film may be positioned on surface 2 or 3, which helps protect the film from exposure to oxygen and humidity. In some cases, the stack of electrochromic materials is positioned on surface 3 and the PV thin film is positioned on surface 2. In another example, the stack of electrochromic materials is positioned on surface 2 and the PV film is positioned on surface 3. In yet another example, the PV film or other PV cell may be implemented on more than one surface, for example surfaces 1 and 2 (with the EC device on, for example, surfaces 2 and/or 3).

In these embodiments, solar energy may be harnessed to power the window. In some cases, PV cells are used in combination with one or more other energy storage devices such as batteries, fuel cells, capacitors (including supercapacitors), etc. These may be configured to store energy generated by the PV cell while the electrochromic device is in a clear, or relatively clear, state. A window controller may dictate this behavior. In certain embodiments, the controller also directs the energy storage cell to discharge, to drive a window transition, when the electrochromic device is tinted. This behavior is particularly appropriate when the PV cell resides at a location interior to the electrochromic device. Embodiments utilizing PV films, particularly wavelength selective PV films, are further discussed in Provisional Patent Application No. 62/247,719, filed Oct. 28, 2015, and titled "PHOTOVOLTAIC-ELECTROCHROMIC WINDOWS," which is herein incorporated by reference in its entirety.

Alternatively, or in addition to the PV cell, a window may include one or more other energy/power sources such as thermoelectric generators, pyroelectric generators, piezoelectric generators, acoustic generators, batteries, etc.

Thermoelectric power provides another alternative option for powering the controller/window. Thermoelectric generators may be used to convert heat (temperature differentials) directly into electrical energy. Where a thermal gradient is present within a conducting material, heat will flow from the hotter region to the cooler region within the material. This heat flow results in the diffusion of charge carriers, and the flow of charge carriers between the hotter and cooler region creates a voltage difference. Often, fairly substantial temperature differentials can develop between inside- and outside-facing portions of a window. For example, a sun-facing window in an air-conditioned building on a hot day in Arizona may have an outside-facing lite at, for example, about 40° C., and an inside-facing lite at about 20° C. A thermoelectric generator may be provided to harness this temperature difference to power the window/controller. In another example, a shaded window on a cold day in Maine may have an outside-facing lite at about −30° C., and an inside-facing lite at about 20° C. The thermoelectric generator may be positioned anywhere in the window, so long as it is able to utilize the relevant temperature differentials. In some cases, the thermoelectric generator is positioned partially or wholly within the viewable area of the IGU, and/or partially or wholly in/on a frame surrounding the IGU. The thermoelectric generator may include many thermo-elements, which may be connected in series and/or in parallel as appropriate.

In some cases, a thermoelectric generator includes a bimetallic junction. The thermoelectric generator may also by a solid-state device made from, for example, bismuth telluride ($Bi_2Te_3$), lead telluride (PbTe), calcium manganese oxide, and combinations thereof. Where a solid-state device is used, the thermoelectric generator may include no moving parts. The lack of moving parts reduces the need for maintenance and helps promote a long device life.

Thermoelectric generators may be used in combination with other power sources. For instance, thermoelectric generators may be provided in combination with batteries, PV panels, piezoelectric generators, fuel cells, etc. In a particular embodiment, a window includes both a PV panel and a thermoelectric generator (with or without other power options such as batteries, etc.). Because solar panels typically use only the high frequency part of the solar radiation, they are especially useful in combination with a thermoelectric generator. Low frequency heat energy, which would otherwise be lost where a PV panel is used in isolation, is instead captured by the thermoelectric generator and converted to electricity. Such a combined power scheme can help optimize energy efficiency.

Another type of energy generation that involves heat transfer involves a pyroelectric generator. Pyroelectricity relates to the ability of certain materials to generate a temporary voltage when heated or cooled. The temperature change modifies the positions of the atoms within the crystal structure to thereby change the polarization of the material and create a voltage across the crystal. Pyroelectricity differs from thermoelectricity in that the whole crystal is changed from one temperature to another to result in a temporary voltage across the crystal. In comparison, with thermoelectricity, one part of a device is kept at one temperature and another part of the device is at a different temperature, with the result being a permanent voltage across the device (so long as there is a temperature differential). A pyroelectric material can be repeatedly heated and cooled to generate electrical power. Example pyroelectric materials include gallium nitride, caesium nitrate, polyvinyl fluorides, derivatives of phenylpyridine, cobalt phthalocyanine, and lithium tantalate.

Another option for power generation is a piezoelectric generator. Piezoelectric materials can be used to transform ambient stress/vibrations into electrical energy. Buildings experience vibrations for a variety of reasons including internal factors (e.g., people and equipment moving within a building, etc.) and external factors (e.g., people, equipment, and vehicles moving outside a building, wind, ground tremors, etc.). The windows within the building also experience such vibrations. Without a piezoelectric generator, such vibrational energy is lost to the environment. However, where a window includes a piezoelectric generator, the vibrational energy can instead be harnessed to power the window/controller. Further, stress on a piezo film induced by absorption of solar energy may be harnessed to power the window. Similarly, an acoustic generator may be used to convert acoustic energy into electrical energy. One benefit of this design may be increased noise reduction in the window, i.e., the window absorbs more sound than it otherwise might without the acoustic generator.

Some piezoelectric generators are single-layer piezoelectric generators. Typically in such single-layer generators, pressing a button causes a spring-loaded hammer to apply a mechanical force to a rod-shaped single-layer piezoelectric ceramic material. In response, the ceramic element produces a voltage that passes across a small spark gap to cause a fuel source to ignite. Common examples are push button cigarette lighters and gas BBQ grills. In these applications, the electrical energy is released very quickly from the generator, and at a very high voltage and low current. In other cases, the generator is a multi-layer piezoelectric generator, which includes a stack of very thin (e.g., <1 mm thick) piezoelectric ceramic layers alternated with electrode layers. The electrical energy produced by such multi-layer piezoelectric generators is lower voltage and higher current than from the single layer generators. Such solid-state multi-layer piezoelectric generators are promising for use in electronic devices with low power requirements, such as electrochromic windows. Piezoelectric generators may be used in combination with any of the other power options described herein. In a particular embodiment, a window includes both a piezoelectric generator and a rechargeable battery. The piezoelectric generator converts vibrational energy to electrical energy, and uses the electrical energy to either power the controller/window directly, or to recharge the battery, which powers the controller/window. Rechargeable and non-rechargeable batteries can also be used as a backup power source, for example when a primary energy source fails (e.g., when power goes out, where the window is powered through wires, or when a primary self-power mechanism fails, where the window is self-powered).

One advantage of wirelessly powered and self-powered windows is that there is no need to connect the windows to a wired source of power, and therefore, there is no need to run wires throughout a building to deliver such power. However, in some cases a window that receives power via a wired power source may also be configured to include an additional power source (e.g., a battery, photovoltaic device/film, thermoelectric generator, piezoelectric generator, etc.). One of the primary advantages of such embodiments is that the peak power demanded from the wired power source by the network of windows can be minimized. Peak power consumption typically occurs when all the windows on the network are directed to simultaneously undergo an optical transition. Although this command may occur regularly infrequently, the network should be designed to accommodate such an occurrence. Therefore, networks of electrochromic windows are typically designed to deliver a much greater amount of power compared to the average amount of power that is demanded on the network. Networks that are configured to deliver greater amounts of power typically have more stringent requirements in terms of wiring and safety, which renders them more expensive to install.

In one example, each electrochromic IGU in a network receives power via wires provided in a power distribution network that run throughout a building. Further, each IGU includes a rechargeable battery (sometimes referred to as an energy well), which may be provided in an easily accessible location, in some cases as part of an accessible on-board controller. The power distribution network may be configured such that it delivers a peak power that is less than the power required to drive simultaneous optical transitions on all the IGUs in the network. Any deficit in power may instead be provided by the rechargeable batteries. Once there is excess power delivery capacity available on the power distribution network, the rechargeable batteries may be recharged via the power distribution network. In this way, the power distribution network can be designed to deliver a lower peak power load, potentially avoiding the need for more complex and costly network components. Such power distribution schemes are further discussed in U.S. Provisional Patent Application No. 62/191,975, filed Jul. 13, 2015, and titled "POWER MANAGEMENT FOR ELECTRO CHROMIC WINDOW NETWORKS," which is herein incorporate by reference in its entirety.

Although certain embodiments describe windows able to power themselves, there may still be advantage of running wires to them. For example, since many of the embodiments describe wireless communication to and from such windows, many end users want a redundant system, hard wires, running to the windows as a backup. And, since wireless communication and be more readily interrupted than hard wired systems, this is prudent. In one embodiment electrical wires are run to an EC window described herein, but only to carry low voltage power. By running power-only wires, the wiring system is greatly simplified. In another embodiment, wires are run to the window, where the wires carry both power and communication, redundant to an onboard wireless communication component in the window controller.

As mentioned, the power generation mechanism (e.g., PV panel, thermoelectric generator, piezoelectric generator, batteries, etc.) may be positioned in a variety of locations. In some embodiments, the power generation mechanism is provided as part of an IGU, controller and/or window assembly in an accessible manner, as described above with respect to the controller in FIGS. 2B-2D. Such accessibility may allow the power generation mechanism to be easily accessed and serviced as needed. In other embodiments, the power generation mechanism may be provided in a less accessible manner, for example within the frame and/or sealed into the panes of the IGU without any access ports. As mentioned with respect to the wireless power receiver, the frame may also include access ports for accessing components therein, including a power generation mechanism in some cases.

The window may be powered continuously or intermittently. Continuous power may be most appropriate where the window receives power through wires, e.g., 24V power lines. However, continuous powering may be used wherever the power source provides sufficient power/energy to continuously power the window/controller. Where the power source does not provide sufficient energy for continuous powering, or where a more energy-conscious approach is desired, the window/controller may be powered intermittently. In one example, a window controller is off/non-powered most of the time, and turns on/powers up intermittently. When on, the controller can take various actions (e.g., read sensor data, pulse voltage or current through the window to determine a tint level, determine whether or not the window should undergo an optical transition, initiate an optical transition, etc.) before it is switched back off. The window can remain powered if/when power is necessary to maintain the optical state of the window.

Networks of Electrochromic Windows

FIG. 4A depicts a distributed network, 400, of EC window controllers with conventional end or leaf controllers as compared to a distributed network, 420, with EC windows having onboard controllers. Such networks are typical in large commercial buildings that may include smart windows.

In network 400, a master controller controls a number of intermediate controllers, 405a and 405b. Each of the intermediate controllers in turn controls a number of end or leaf controllers, 410. Each of controllers 410 controls an EC window. Network 400 includes the long spans of lower DC voltage, for example a few volts, wiring and communication cables from each of leaf controllers 410 to each window 430. In comparison, by using onboard controllers as described herein, network 420 eliminates huge amounts of lower DC voltage wiring between each end controller and its respective window. Also this saves an enormous amount of space that would otherwise house leaf controllers 410. A single low voltage, e.g., from a 24v source, is provided to all windows in the building, and there is no need for additional lower voltage wiring or calibration of many windows with their respective controllers. Also, if the onboard controllers have wireless communication function or capability of using the power wires, for example as in ethernet technology, there is no need for extra communication lines between intermediate controllers 405a and 405b and the windows. Again, this greatly simplifies installation of the wiring.

In certain embodiments, the electrochromic window controllers are provided in a network such as a self-meshing, self-healing communications network, in which the electrochromic window controllers recognize one another based on sensed and/or programmed inputs when the windows are first installed and turned on. One or more of the controllers, for example a master controller, may develop a map of the windows based on the self-meshing network and the information provided by the sensed and programmed inputs. In other words, the system may "self-virtualize" by creating a model of where each window is in relation to the other windows, and optionally in relation to a global position (e.g., a GPS location). In this way, installation and control of the windows is simplified, because the windows themselves do much of the work in figuring out where they are positioned and how they are oriented. There is little or no need to individually program the location and orientation of each individual window.

A wireless mesh network may be used to connect each of the windows with one another. The wireless mesh network may include radio nodes or clients (e.g., the windows/local window controllers) organized in a mesh topology. In addition to mesh clients, the mesh network may include mesh routers and gateways, for example. The mesh routers forward traffic to and from the gateways. In some embodiments, the gateways are connected with the internet. The radio nodes work with one another to create a radio network, which covers a physical area that may be referred to as the mesh cloud. The mesh cloud is distinct from "the cloud" often referred to when discussing remote data storage and processing, though in some embodiments both may be used. For instance, data generated by devices in the mesh cloud may be stored and/or processed in the cloud (i.e., remotely over the internet). The cloud may be used for various goals including monitoring, analytics, and learning, as discussed further below.

Wireless mesh architecture is effective in providing dynamic networks over a specific coverage area (the mesh cloud). Such architectures are built of peer radio devices (nodes/clients) that do not have to be cabled to a wired port, in contrast with traditional WLAN access points, for example. Wireless mesh architectures are able to maintain signal strength by breaking long distances into a series of shorter distances. For instance, there may be a single network controller located in the basement of a building and ten local controllers located on floors 1-5 of the building. Conventional network architectures would require that the network controller be able to communicate directly to each of the ten local controllers. It may be difficult in some cases for the network controller to communicate with the local controllers, particularly the ones located farthest away on floor 5. Where a mesh network is used, each of the local controllers acts as an intermediate node. The intermediate nodes boost and route the signal as desired. In other words, the intermediate nodes cooperatively make signal forwarding decisions based on their knowledge of the network. Dynamic routing algorithms may be implemented in each device to allow such routing to happen. In this way, the signal only needs to be transmitted over much smaller distances (e.g., from the basement to floor 1, floor 1 to floor 2, etc.). This means that the signal transmitters can be less powerful and less costly. The mesh network may be centralized or decentralized (i.e., it may include a specific network controller that controls the local window controllers, or the network may simply be made of the local window controllers).

Where a network controller is used, it may be provided as a standalone device that interfaces with the other controllers/windows. The standalone network controller may take many forms, for example a remote, a wired or unwired input panel, a simple device that plugs into the wall, etc. The network controller may also be provided directly on a window in some cases, either combined with the local controller into a single controller unit, or provided separately in tandem with the local controller. It may be beneficial to provide a network controller directly on a window in some cases, particularly where sets of windows are sold together (e.g., a set of four electrochromic windows, three of which include local controllers, and one of which includes a network controller and a local controller), and/or where it is desired that no additional parts are required beyond the actual windows (and anything present on the windows themselves).

Where the separation between nearby windows is too large to allow communication between such windows, an intermediate signal booster may be used. The signal booster may be a standalone device designed specifically to pass along communication to/from electrochromic windows/controllers, or it may be a separate device used primarily for a completely different purpose. For instance, the signal booster may be provided with a mesh-network-capable light, computer, printer, phone, thermostat, etc. Other examples of devices that may be mesh-network-capable include, but are not limited to, televisions, game systems, projectors, pet monitors (e.g., collars), washing machines, dryers, dishwashers, kitchen gadgets, scales, medical devices, alarm systems, cameras, video cameras, pipes, etc. With the growth of the Internet of Things, more and more devices are expected to be able to engage with such networks. These devices may be used to pass along control information for the electrochromic windows. In some embodiments, the other devices on the mesh network pass information along to other devices, so that the information eventually reaches the electrochromic windows. In some cases, information may be exchanged with the other non-window devices, either through the non-window devices directly or through master controllers that control the non-window devices.

Further, when such additional (non-window) devices are part of the mesh network, these devices can benefit from information known by the network. For instance, where GPS coordinates of one or more windows are known, the other non-window devices can learn their exact locations based on the GPS data and the relative positions of all the other (window and non-window) devices. Because GPS typically does not work inside a building, direct GPS sensing of device positions inside of a building is difficult or impossible. As such, by using the absolute position information gleaned from the windows themselves, and the relative positions of the various devices on the network, even non-window devices that are inside of a building can learn of their exact locations. In some implementations, such network devices may be populated into the map that is auto-generated. For example, where an office building uses electrochromic windows and printers that are each capable of connecting to the mesh network, the map generated by the controller(s) may show the relative locations of all the windows and printers connected to the network. A building occupant can use this map (e.g., loaded into a smartphone application, computer, etc.) to help them find their nearest printer or other relevant device on the mesh network. Occupancy sensors and HVAC components may also be connected to the mesh network. In such cases, the map generated by the controller(s) may show whether particular rooms are occupied based on information from the occupancy sensors, and may show other conditions (e.g., actual temperature, thermostat setting, humidity, status of lights, etc.) based on information from other HVAC components. The accuracy and precision of the map are increased with an increased number of devices on the mesh network, since the additional devices provide further data for the system to piece together.

In some cases, one or more components on an electrochromic IGU may provide information that is useful to other (non-window) components on the network. For instance, an electrochromic IGU may include an interior and/or exterior photosensor, an interior and/or exterior temperature sensor, an occupancy sensor, etc. These sensors may provide useful information for a thermostat or HVAC system. Alternatively or in addition, the sensors may be provided separately from the IGUs, and may feed information to the IGUs. The IGUs may take this information into account when determining whether and when to initiate an optical transition. Where all the relevant components are accessible over the mesh network (or other network), it is very easy to share information among the components, as desired.

Windows on the mesh network may be configured to interact with other devices on the mesh network, for example with thermostats or other HVAC components. For instance, where a window or set of windows tint (thereby reducing the rate that heat enters the building through the window(s)), the window(s) may send a signal to a thermostat or other HVAC component to reduce the degree of cooling occurring through air conditioning. Similar signals may be sent to increase the degree of cooling through air conditioning, or to control a heating system. Additionally, information gleaned by the electrochromic window (e.g., through sensors, performance, etc.) may be shared with a thermostat or other HVAC component to help inform decisions made by the thermostat or HVAC.

Any appropriate routing protocol may be used. In some embodiments, the routing protocol utilizes Ad hoc On-Demand Distance Vector (AODV), Better Approach to Mobile Adhoc Networking (B.A.T.M.A.N.), Babel, Dynamic NIx-Vector Routing (DNVR), Destination-Sequenced Distance-Vector Routing (DSDV), Dynamic Source Routing (DSR), Hazy-Sighted Link State (HSLS), Hybrid Wireless Mesh Protocol (HWMP), Infrastructure Wireless Mesh Protocol (IWMP), Wireless Mesh Networks Routing Protocol (MRP), Optimized Link State Routing (OLSR), OrderOne Routing (OORP), Open Shortest Path First Routing (OSPF), Predictive Wireless Routing Protocol (PWRP), Temporally-Ordered Routing Algorithm (TORA), Zone Routing Protocol (ZRP), etc. These protocols are merely provided as examples and are not intended to be limiting. There are many competing schemes for routing packets across mesh networks.

An auto-configuration protocol may be used to automatically configure the windows/controllers without any manual intervention, and without the need for any software configuration programs or jumpers. Auto-configuring devices are also sometimes referred to as "plug-and-play" devices. These devices merely need to be powered up and they automatically configure themselves. Configurations may be stored in NVRAM, loaded by a host processor, or negotiated at the time of system initialization, for instance. Examples of auto-configuration protocols include, but are not limited to, Dynamic Host Configuration Protocol (DHCP), Internet Protocol version 6 (IPv6) stateless auto-configuration, Ad Hoc Configuration Protocol (AHCP), Proactive Autoconfiguration, Dynamic WMN Configuration Protocol (DWCP), etc.

The configuration process (automated or not, in a mesh network, linear bus network, or other network) for a particular IGU may involve reading and transmitting an ID for the IGU and/or its associated window controller. Further information related to commissioning/configuring a network of electrochromic windows is presented in U.S. patent application Ser. No. 14/391,122, filed Oct. 7, 2014, and titled "APPLICATIONS FOR CONTROLLING OPTICALLY SWITCHABLE DEVICES," which is herein incorporated by reference in its entirety.

In some cases, some type of feedback (e.g., from a manual input such as a button/switch/etc., or from a sensor such as a light sensor, motion sensor, occupancy sensor, etc.) may be used to identify particular IGUs. This information may be shared over the network, for example to a network controller and/or to other window controllers. This identification process may be one step in generating a map or other directory of all the electrochromic windows on the network, as discussed below. In various embodiments, the IGU identification/configuration process may involve individually triggering each IGU controller to cause the IGU's associated controller to send a signal to the network. The signal may include the IGU's identification number and/or the identification number of the controller associated with the IGU. For example, using the example of a dock/carrier controller form factor as described herein, an installer(s) will install IGUs in their physical location in a building. The IGUs will have the dock, but not the controller. The dock will have the chip or memory which contains the physical characteristics/parameters of the IGU etc. as described herein. Then a carrier (controller) is attached into/onto each dock. Once the carrier is mated with the dock, the controller can read the chip or memory associated with the IGU when triggered.

The triggering may occur through a variety of mechanisms. In one example, the IGUs include a light sensor that can be triggered via a laser pointer or other shining light. An installer can shine the laser pointer on the sensor of the IGU to cause the IGU to send a signal to the system with the IGU's/controller's identification. Because the installer knows where the laser pointer is being pointed, this allows for a relatively easy way to associate each IGU with its physical location. This laser pointer method is highly reliable, and can be used to identify large numbers of windows, even when provided in a curtain wall with many adjacent IGUs. In another example, the IGUs include a light sensor, motion sensor, occupancy sensor, etc. that can be triggered by blocking or disrupting the sensor (e.g., waving at the sensor, covering the sensor, etc.). In another example, the IGUs include a sensor that can be triggered by placing a magnet near the sensor. In yet another example, the IGUs include a button or switch that can be manually activated to cause the IGU to send a signal to the network. Regardless of the type of trigger used, this feature may enable an easy configuration process for commissioning several electrochromic windows on a network.

In one example, a network of electrochromic windows includes 10 windows, with two windows provided in each of five rooms. After the IGUs are physically installed, a user/installer may commission the windows to identify each IGU and associate it with its physical location in the network. The installer may use an electronic device such as a phone, tablet, computer, etc. to help commission the windows. A program on the electronic device may include a list, directory, and/or map of all the electrochromic windows on the network. When the installer enters the first room, she can trigger the first electrochromic window, thereby causing the controller to send a signal over the network with the window's (and/or controller's) identification. As a result of this signal, the identification for the triggered window may pop up on the electronic device. The user can then associate the identification with the physical location of the window they triggered. In one example where the program on the electronic device generates (or otherwise utilizes) a map of the windows, this association may be made in a graphical user interface (GUI), e.g., by dragging the triggered identification number onto the map at the appropriate location, or by clicking the map at the appropriate location in response to the triggered identification appearing. The map may be generated through the mesh network techniques described herein in some embodiments, or the map may be preloaded into the commissioning person's computing device using schematics of the installation that are drawn up as part of the building plans, for example. After the first window is associated with its physical location, the installer can trigger the second window in the first room and thereby associate the identification of the second IGU/controller with its physical location. This process can then be repeated for each of the other rooms in which electrochromic windows are installed.

In another example, each electrochromic IGU may include a beacon that transmits information related to the IGU, for example the identification of the IGU and/or the associated controller. Bluetooth Low Energy (BLE) beacons may be used in some cases. An installer may have a receiver to allow them to read the beacon. Phones and other electronic devices commonly have Bluetooth receivers that could be used for this purpose. Any appropriate receiver may be used. An installer may read the information on the beacons during commissioning to associate the identification for each IGU/controller with the physical location of the IGU. A map or directory may be used to accomplish this association.

In a similar embodiment, each IGU may be triggered over the network, which may cause a component on the IGU to notify an installer/user that it has been triggered. In one example, each IGU may include a light that can be activated. A signal can be sent over the network to trigger a relevant IGU or window controller, which then causes the light on the relevant IGU to be turned on (or off, or blink, etc.). An installer/user can then identify the relevant IGU by seeing which IGU has the triggered light. Based on this process and information, the installer/user can associate each IGU/controller with its physical location and identification.

Figure 14A:
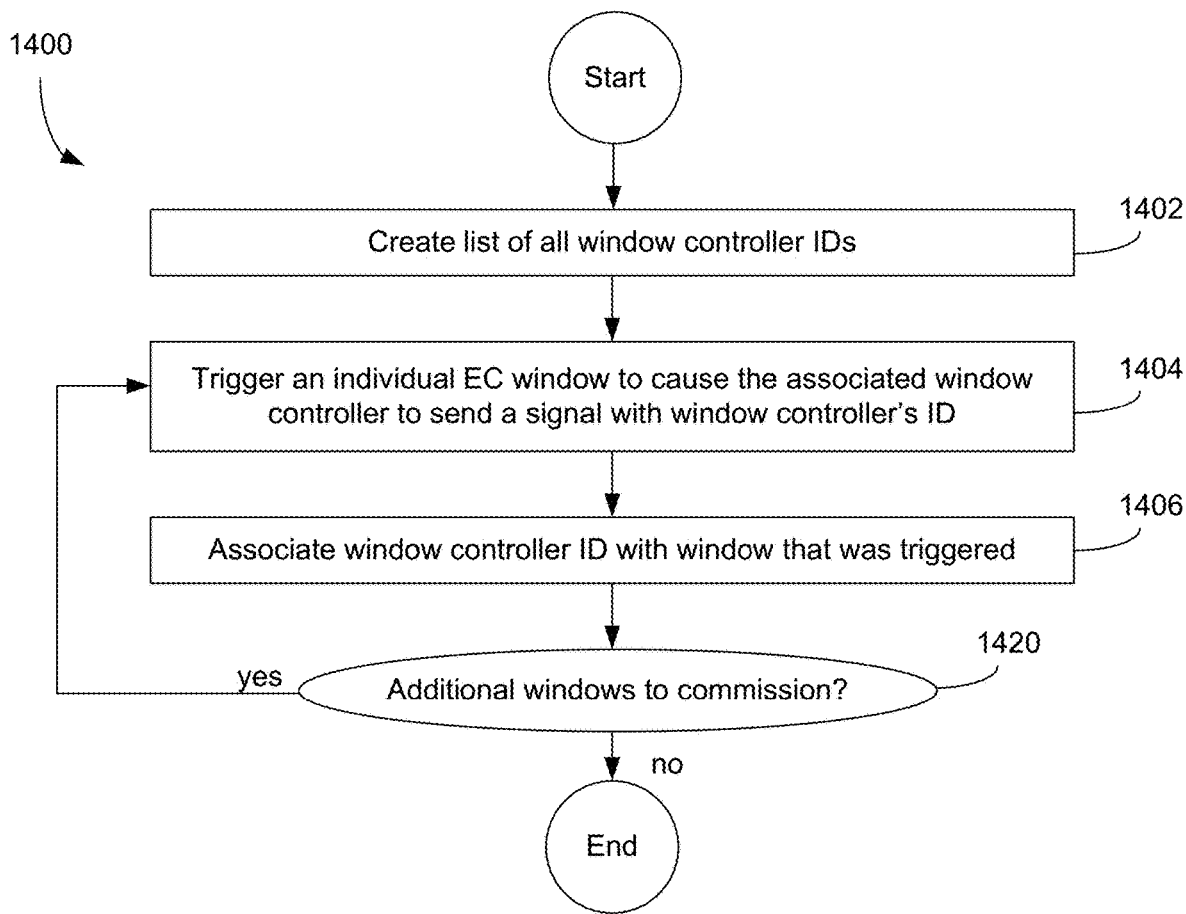
FIG. 14A is a flowchart describing a method of commissioning electrochromic windows.

FIG. 14A is a flowchart depicting a method 1400 of commissioning a network of electrochromic windows according to certain embodiments. For example, after all the IGUs have an associated controller, at operation 1402, a list of all the window controller IDs is created. This step is explained further below with reference to FIGS. 14C-14E. The window controller IDs may include a number of individual identifying factors about each window. This information is stored, e.g., in a chip in each window assembly, e.g., in a dock (or wiring harness). In one example, the window ID includes a CAN ID and a LITE ID. The CAN ID may relate to a unique address of the window/window controller on the CAN bus system, while the LITE ID may relate to a unique serial number of the electrochromic IGU and/or its associated window controller. The LITE ID (or other ID used) may also include information about the window such as its size, properties of the electrochromic device, parameters to be used when transitioning the electrochromic device, etc. After the list of window controllers is generated, an individual window controller is triggered in operation 1404. The triggering may occur through any of the methods described herein. This trigger causes the relevant window controller to send a signal with the window controller's ID. In response, a user can associate the triggered window controller's ID with the window's physical location in operation 1406. Operations 1404 and 1406 are further explained in the context of FIGS. 14F and 14G. At operation 1420, it is determined whether there are additional windows to commission. If there are additional windows to commission, the method repeats from operation 1404. The method is complete when all of the windows are commissioned.

Figure 14B:
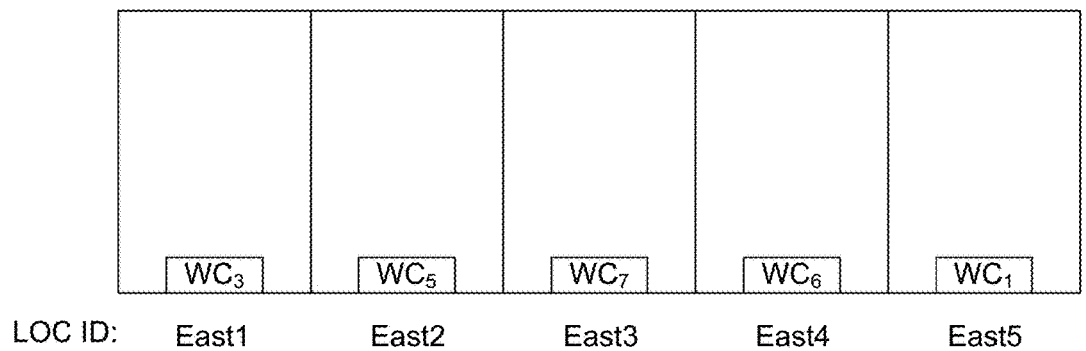
FIG. 14B is a representation of the physical location of a plurality of electrochromic windows that is commissioned in the context of FIGS. 14A-14G.

FIG. 14B presents a representation of the physical location of five electrochromic windows installed on an East wall of a building. The "LOC ID" refers to the location of the relevant window, in this case labeled, arbitrarily, East1-East5. Additional electrochromic windows may be provided elsewhere in the building. The method of FIG. 14A, for example as explained in relation to FIGS. 14C-14G, may be performed on the set of windows shown in FIG. 14B.

Figure 14C:
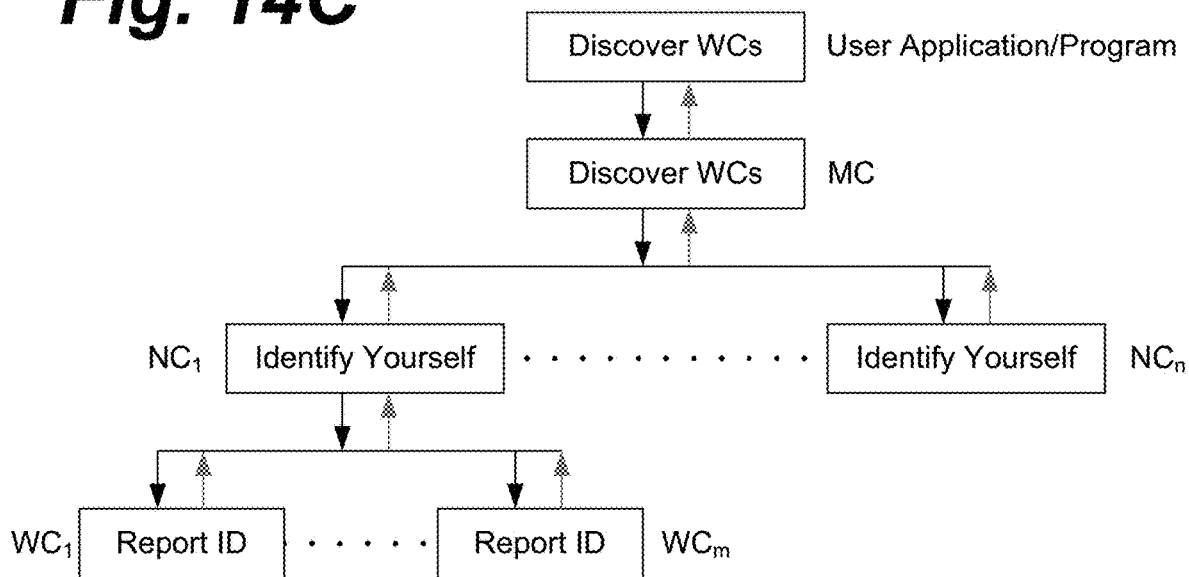
FIG. 14C illustrates in closer detail certain steps that may be taken during the method of FIG. 14A.
Figure 14D:
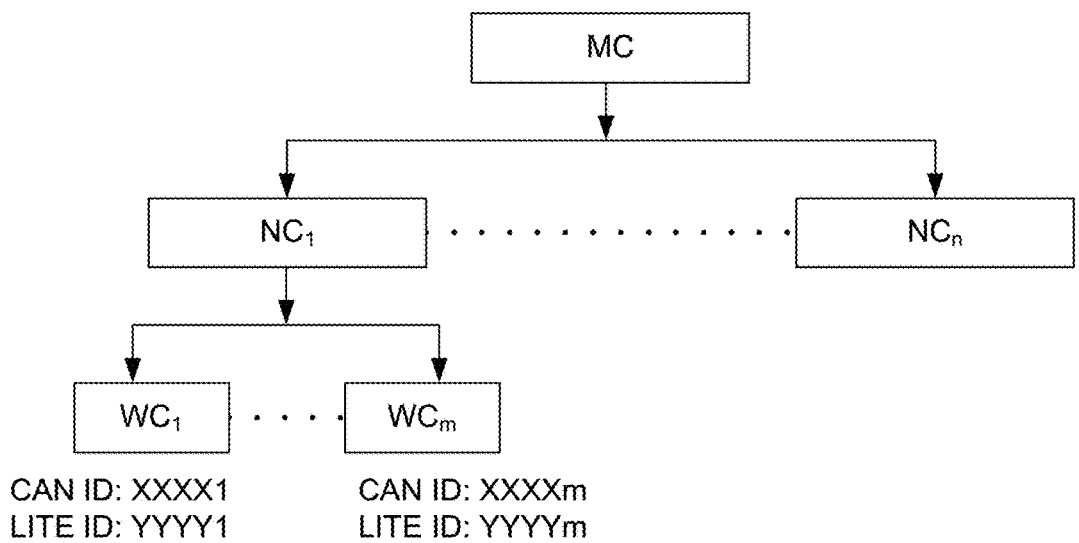
FIG. 14D is a representation of a network of electrochromic windows that may be used in the context of FIGS. 14A-14G.

FIG. 14C illustrates several steps that may be taken during operation 1404 of FIG. 14A. In this example, the network of electrochromic windows includes a master controller (MC), two or more network controllers (NC$_1$-NC$_n$), and several window controllers (WC$_1$-WC$_m$). For the sake of clarity, only information relevant to window controllers that operate under the first network controller (NC$_1$) are shown. The dotted lines indicate that many other network controllers and window controllers may be present. First, a user may initiate a command, via a user application/program/etc., to cause the window controllers to be discovered. The user application/program forwards this command to the master controller. The master controller directs the network controllers to discover the window controllers, and the network controllers direct the window controllers to identify themselves. In response, the window controllers report their IDs to the network controllers, which then report the window controller IDs to the master controller, which reports the window controller IDs to the user application/program. The master controller and/or the user application/program may aggregate this information to create the list of all window controllers. This list may include information detailing which window controllers are controlled by each network controller. The list may also be provided as a chart that shows the configuration of all the relevant controllers on the network, as shown in FIG. 14D. The network representation shown in FIG. 14D may appear on the graphical user interface in some cases.

FIG. 14E depicts an example of user interface features that may be presented to a user after operation 1404 is complete and the list of window controller IDs is created. On the upper portion of FIG. 14E, a map of the relevant windows is shown. This map may be created by any means available, and in some cases may be specifically programmed for each installation. After operation 1404, it is still not known where each window is positioned. Thus, the map does not yet show the CAN ID or LITE ID for any of the windows, but rather has empty fields that will be populated with this information during the commissioning process. On the bottom portion of FIG. 14E, a list of the window controller IDs is provided. After operation 1404, all of the window IDs (the CAN IDs and LITE IDs) are generally known, but they have not yet been associated with their physical positions (the LOC IDs). For this reason, the bottom portion of FIG. 14E shows the CAN IDs and LITE IDs as populated, while the LOC IDs are still blank. A similar list may be provided for each of the different network controllers.

Figure 14F:
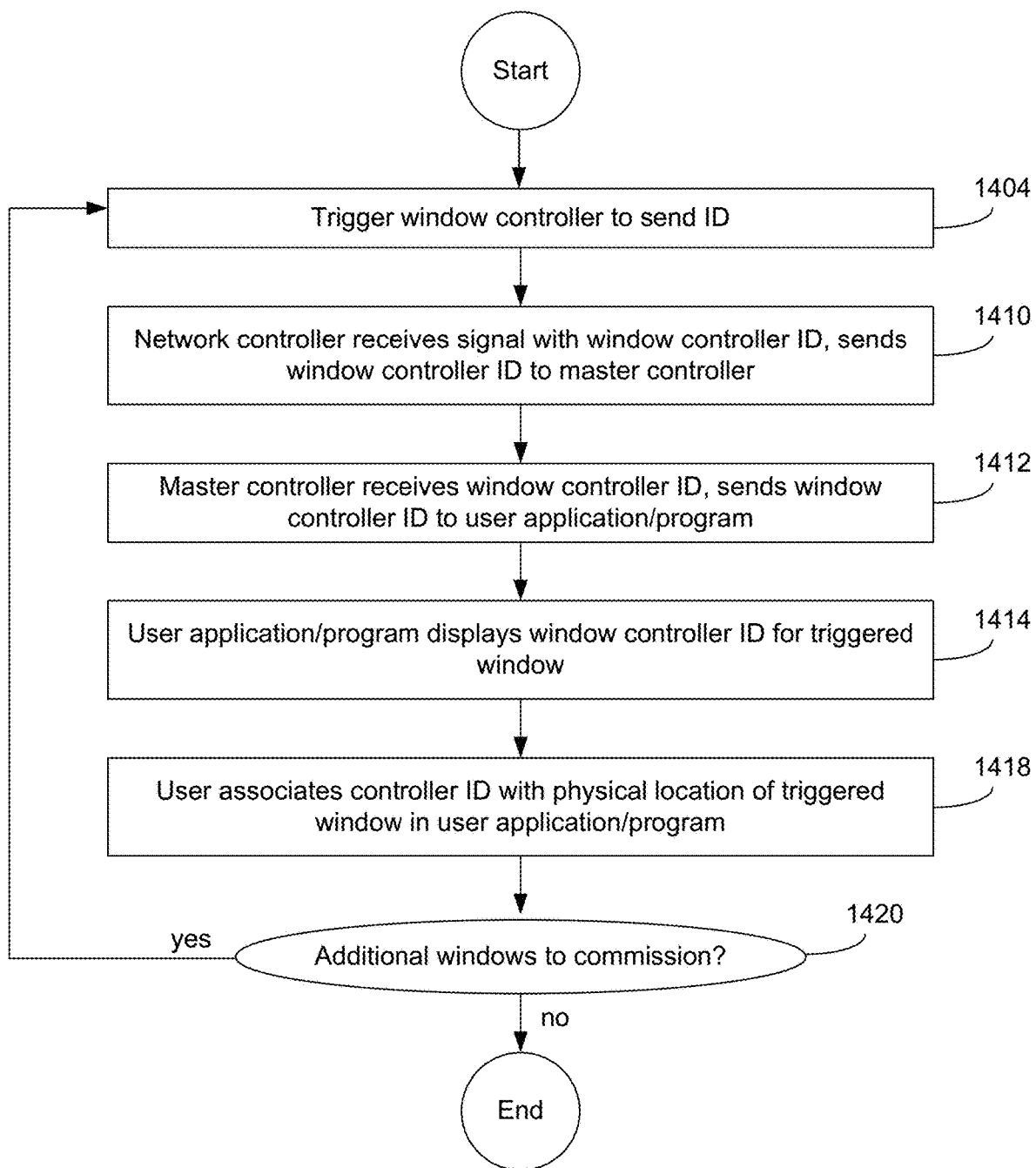
FIG. 14F is a flowchart further explaining certain steps that may occur in the method of FIG. 14A.

FIG. 14F is a flowchart that presents a method for performing operations 1404 and 1406 from FIG. 14A in more detail, according to one embodiment. In FIG. 14F, the method begins at operation 1404, where a user triggers a window controller, thereby causing it to send the window controller ID to its associated network controller. The network controller receives the signal with the window controller ID, and sends the window controller ID to the master controller at operation 1410. Next, at operation 1412, the master controller receives the signal with the window controller ID, and sends the window controller ID to a user application/program/etc. At operation 1414, the user application/program displays the window controller ID for the triggered window. Next, at operation 1418, the user may associate the window ID of the triggered window with the physical location of the window that was triggered. In one example, the user drags the window ID displayed in operation 1414 onto the physical location of the triggered window as represented on the map of windows. With reference to FIG. 14E, for instance, a particular window ID (e.g., CAN ID and LITE ID) may become bold or otherwise noticeable in the user application/program in response to the window controller being triggered. The user can see the bolded window ID, then drag it onto the map at an appropriate location. Conversely, the user may drag the relevant window from the map onto the triggered window ID. Similarly, a user may click on the triggered window ID and click on the relevant window from the map to associate the two. Various methods may be used.

FIG. 14G depicts an example graphical user interface similar to the one shown in FIG. 14E, after the window positioned at East5 has been identified and associated with its relevant window ID/location. As shown in FIG. 14B, the window at East5 has $WC_1$ installed thereon. Therefore, the CAN ID for $WC_1$ (XXXX1) and the LITE ID for $WC_1$ (YYYY1) are displayed below the window at the East5 location. Similarly, as shown in the bottom portion of FIG. 14G, the list of window controller IDs now includes a LOC ID for $WC_1$. The triggering and location/ID association steps can be repeated until all of the windows are identified and associated with their positions within the building. The fact that $WC_1$ was triggered first was chosen merely for the sake of clarity in the figures. The window controllers can be triggered in any order.

Returning to FIG. 14F, at operation 1420 it is determined whether there are any additional windows to commission. If not, the method is complete. If there are additional windows to commission, the method repeats on a different window starting at operation 1404.

Mesh networks are reliable and redundant. If one node within the network is no longer operational, the remaining nodes can still communicate with one another, either directly or through one or more intermediate nodes. As such, the networks are self-healing. In the event a network of windows is also hard wired to power and communications, and for some reason a hard wired communication line fails, the wireless communication can take over for that failed wire communication without interruption of the system.

Figure 4C:
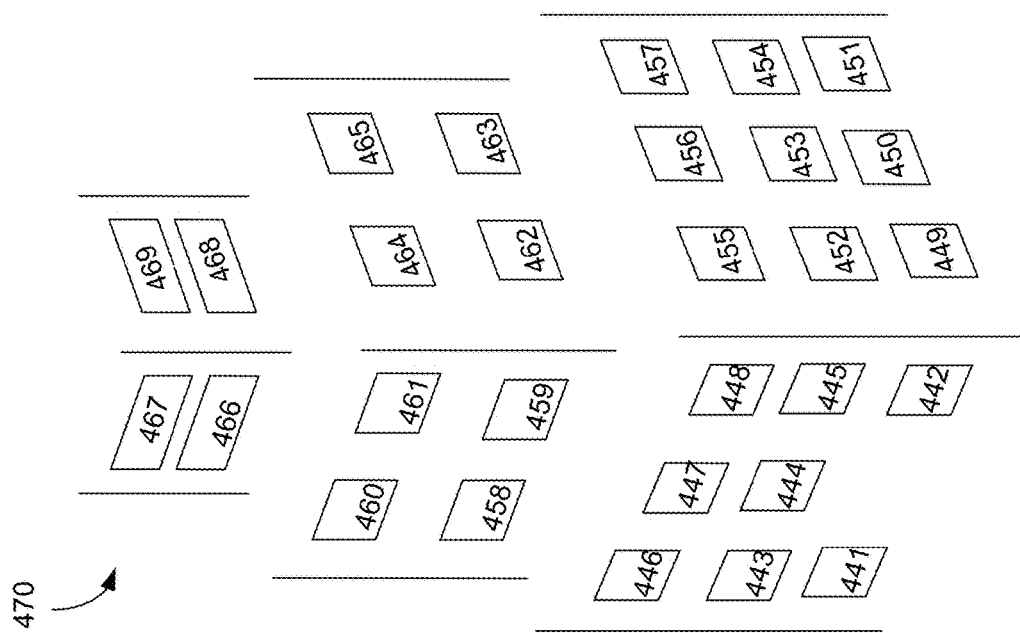
FIG. 4C depicts a map of the electrochromic windows of the building shown in FIG. 4B as generated by one or more controllers on the mesh network.
Figure 4B:
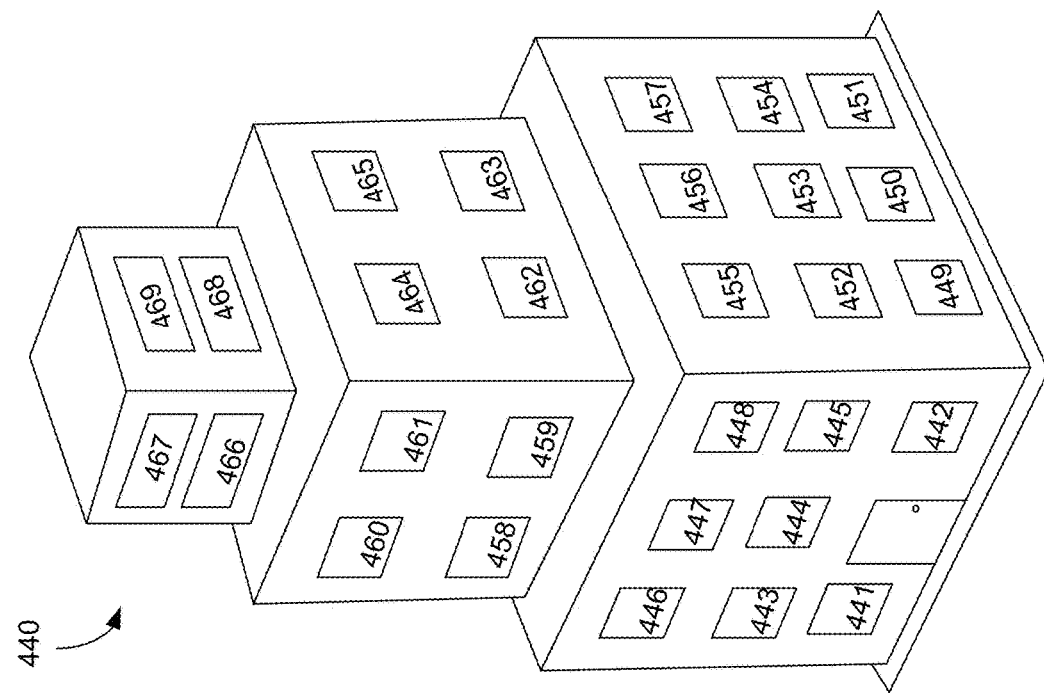
FIG. 4B illustrates a building with a number of electrochromic windows connected in a mesh network.

Additionally, mesh networks may be used to auto-generate a map of the mesh cloud showing where each individual device is located. Based on sensed and/or programmed information, the window controllers recognize one another and their relative positions within the network. Each local controller "sees" the other local controllers that are nearby. This proximity data (and other data described below) may be used to create a picture of where each window is located. This allows a user to very easily control the windows as desired, especially where it is desired to control multiple windows at once. In some embodiments, the mesh network may self-identify groups of windows that should be controlled together. Such groups may consist of windows on the same side of a building, same portion of a building, same room, same floor, same sun exposure, etc. A user may then have the option to select the self-identified group to control them together. In another embodiment, the network creates a map of the electrochromic devices and their positions around a building, and a user can select a particular window or group of windows to control at once based on the map. Such auto-generated visualizations greatly simplify the control of the window network. FIG. 4B illustrates a building 440 having many windows 441-469. Each of the windows 441-469 may be an electrochromic window as disclosed herein. In particular, each of the windows 441-469 may have a local on-board controller (not shown) in communication with other the other local controllers (and an optional network controller) on an auto-configuring, self-meshing network. After the windows are initially installed and powered on, the controllers are able to "see" any other windows that are sufficiently nearby. For example, window 453 may pick up signals from neighboring windows 449-452 and from neighboring windows 454-457. Window 453 may also pick up signals from, for example, window 462, or window 445. Because windows 462 and 445 are farther away from window 453 than the previously mentioned neighboring windows 449-452 and 454-457, the signal at window 453 from these more distant windows 462 and 445 will be weaker. Thus, the local controller at window 453 knows which windows are close by, and which are farther away.

Like window 453, each of the individual local window controllers are able to sense their nearby neighbors and know the relative distances between each relevant set of windows. By combining the information gleaned by each local window controller, a map of the building can be generated. FIG. 4C illustrates a map 470 of the building 440 shown in FIG. 4B. Map 470 may be generated automatically as the windows sense one another and their relative positions. The map 470 may include certain building features (e.g., where certain outer walls are placed, and where the windows are located), and exclude others (e.g., doors, any architectural features besides the windows/walls, etc.). While only two sides of the building are shown for the sake of clarity, it is understood that the map 470 is three dimensional and further includes information related to windows located on the back sides of the building. In the example of FIG. 4C, the map 470 shows the location of each window 441-469 relative to the other windows. In some embodiments, the map simply includes the relative positions of the windows.

In other embodiments, the map may be more detailed and easy to use. For example, one or more controllers (e.g., local window controllers or network controllers) may be programmed with instructions to fill in relevant architectural details based on the sensed relative window locations. Such architectural details may relate to the position/orientation of exterior walls, for example. As long as there is an electrochromic window on an exterior wall, the controller is able to easily know where the exterior wall is. Further, the relative locations and orientations sensed by the controllers also give information about the location of corners/edges of the building. The controller can therefore form an accurate picture of the "skin" (exterior walls/windows) of the building, which can be presented to a user in the form of a drawing/map. The map may be able to be manipulated in some cases, for example as a three dimensional model, thereby allowing a user to view the building from any desired angle. The map may also allow the user to select any window or group of windows to control at a given time.

As mentioned above, in some cases a controller is programmed to generate such a map as soon as the electrochromic windows are installed and powered on. If certain windows are powered on before others, an incomplete map may be generated based on the first windows to receive power. As more windows are turned on and sense one another, the map may become more detailed and accurate. In some embodiments, a controller is programmed to identify groups of windows that are likely to be controlled together. These groups may be presented to a user as one option for controlling the windows. For example, in the context of FIGS. 4B and 4C, a controller may identify any of the following groups for simultaneous control: windows 441-448/458-461/466/467 (windows that are on the same side of the building), windows 458-461 (windows that are on the same side of the building in the same portion of the building), windows 441/442/449-451 (windows that are on the same floor), windows 449-451 (windows that are on the same floor and same side of the building), and windows 442/449 (windows that are in the same room). Other groups may be identified as appropriate. Further, in some embodiments a user can select any two or more windows to be controlled together as a group, regardless of whether such windows are identified as a group by the controller. For instance, the controller may generate the map 470 shown in FIG. 4C, and a user may decide to select windows 451 and 463 (or any other two or more windows) to be controlled together. The self-meshing network allows for easy identification and control of any set of windows that are desired to be controlled together. Little or no labor- and knowledge-intensive commissioning process is required to set up the windows after they are initially installed. Instead, the windows can be easily and intuitively controlled based on the map generated by the controller and self-meshing network. While the phrase "the controller" is used frequently herein, it is understood that many local controllers are used, often but not necessarily with a network controller, and that the information sensed or learned by one controller is shared/routed to the other controllers through the network.

In various embodiments, the windows on a mesh network can be controlled together. In certain cases, groups of windows can be controlled together such that they achieve the same optical state. Further, groups of windows can be controlled together such that they achieve the same tint rate and/or clear rate. In certain implementations, groups of windows are controlled together using electrical feedback. Such feedback may be generated by pulsing current and/or voltage through EC devices on IGUs and measuring the electrical response. Based on the electrical response from each individual window, it is possible to drive an optical transition in each window as needed to achieve matching tint levels and/or rates. Methods of controlling groups of windows together are further discussed in the following patent applications, each of which is herein incorporated by reference in its entirety: PCT Application No. PCT/US14/43514, filed Jun. 20, 2014, and titled "CONTROLLING TRANSITIONS IN OPTICALLY SWITCHABLE DEVICES," and U.S. application Ser. No. 14/489,414, filed Sep. 17, 2014, and titled "CONTROLLING TRANSITIONS IN OPTICALLY SWITCHABLE DEVICES." The mesh network facilitates controlling the windows together, as data related to each window can be shared with other window controllers (or a network controller, if present) directly over the mesh network. In certain embodiments, each window can be controlled not just based on its own feedback, but based on the feedback from other windows, as well.

One feature that may facilitate control of multiple windows is a controller architecture that uses both DC and AC signals, optionally supplied over a single line (e.g., a powerline). A DC bias signal can be used to control the optical state of an EC device on a window, and an AC communication signal can be used to communicate between relevant controllers (e.g., between window controllers and/or between a window controller and a network controller). The electrochromic stack on the IGU acts as a large area capacitor, and together with the TCO resistance forms a large distributed RC network. The AC communication signal can be overlapped on top of the DC bias signal. Where the AC signal has a sufficiently high frequency, the AC signal is transparent to the electrochromic stack. As such, the AC communication signal can be used to communicate with local window controllers or other components without undesirably causing transitions to occur in the EC device. This architecture permits a (window and/or network) controller to communicate with many other controllers.

In one example, a number of electrochromic windows are controlled at the same time. Each window includes an IGU that includes a window controller having a memory component. The memory component stores a unique identifier (e.g., channel number) for each IGU. Each window controller receives a DC input (e.g., 2.4V) and an AC input. The AC input provides control signals for communicating with each individual IGU as needed based on the IGUs' unique identifiers. The AC signal can include a binary word or words for each IGU. A digital to analog converter (e.g., an 8 bit digital to analog converter) in each window controller can be used to convert the binary word or words to control signals for each individual IGU. For example, different binary words may be used to communicate drive voltages, hold voltages, etc. for each individual IGU. The window controllers can then output an EC control signal for a relevant IGU based on the DC input modified by the instructions in the AC signal. The EC control signal is applied to an electrochromic device on the individual IGU. Simultaneous control of multiple windows using different transition parameters for each window is greatly simplified over prior methods because (1) each IGU has a unique identifier, (2) the AC signal can direct each individual window to change based on parameters unique to each window, and (3) the AC signal does not interfere with the EC device. This architecture is especially beneficial where the EC windows that are controlled together as a group are of differing sizes, or otherwise have different switching characteristics. This architecture is also beneficial in any application where it is desirable to control individual windows in a group of windows using different transition parameters.

Sensors, Tracking and Learning

In some cases, sensor data from the windows is used to help create the virtual map of the windows. Sensor data may improve the accuracy and/or precision of the map. Examples of sensors that may be used to provide data for creating the map include external light sensors, GPS sensors, and magnetometers. Such sensors may be part of an on-board local window controller, or may be separate from the controller. In some embodiments, one or more sensors are affixed to the mapped building. In some embodiments, one or more sensors are located at positions remote from the mapped building. In some embodiments, one or more sensors are portable sensors that may be employed temporarily during mapping. Generally, the sensors may be positioned or directed to capture information in any place that the controller may be positioned (i.e., descriptions regarding the position of the window controller also apply to the sensors). In one example, a GPS sensor is provided in an external electronic device controlled by a user or installer. For instance, a user or installer may use their mobile phone, camera, or other electronic device to take a picture of a particular window, with GPS data embedded in the picture. The GPS data (e.g., pure GPS data or GPS data embedded in a picture or other medium) for each window may be input to each local window controller (or to any controller on the network). In this way, a highly accurate map of the building's exterior can be created. As mentioned, compass data may also be input to the controllers in order to get the exact orientation of the each window with respect to the earth's geography. In certain embodiments, one or more windows include an on-board compass. In other embodiments, compass data is provided by a user or installer as described above with respect to the GPS data.

Another type of data that may be utilized to form a map of the building's exterior is data from a light sensor, which provides the amount of sunlight on a given window at any given time. By combining the results from multiple exterior light sensors on different windows over a period of about 1 day (from sunrise to sunset), the controllers are able to determine the relative orientations of the exterior walls (e.g., the controllers are able to know which windows face east, west, etc.). The controllers may also be able to identify the location of shade-causing objects (e.g., nearby trees or buildings) based on the data from the sensors and other data related to the relative positions of the windows. The use of a few light sensors (e.g., 3 or 4 light sensors) facing different directions on a building may have their results combined to provide detailed information about light exposure on all portions of a building. See U.S. Provisional Patent Application 62/057,104, filed Sep. 29, 2014, and incorporated herein by reference in its entirety.

In one example, using a mesh network and the relative signal strengths from neighboring windows, the controllers is used to sense that a building has four sides with windows on each side. Data from exterior light sensors may show that a first side of the building receives more sun early in the morning and that the second, opposite side of the building receives more sun in the afternoon/evening. The controller therefore knows that the first side of the building likely faces east and the second side of the building likely faces west. Additionally, a sensor present on a window on the first floor of the east-facing side may indicate that the window in question receives less morning sun than expected based on the sunlight received by its neighbors. The controller and network therefore know that this particular window is likely shaded by a tree or other object. These shade-causing objects may be included in the map generated by the controllers in some embodiments. In certain embodiments, information provided from exterior light sensors and/or from the proximity knowledge in a mesh network is provided to a solar calculator or other tool used to predict or determine when to tint and clear optically switchable windows. Such tools are described in U.S. patent application Ser. No. 13/772,969, filed Feb. 21, 2013, which is incorporated herein by reference in its entirety.

Similarly, light and other sensor information can be shared between windows to detect anomalous conditions such as an object temporarily blocking light to a particular window, or an object temporarily reflecting or otherwise directing light onto a particular window. Such anomalous conditions, if picked up by a sensor on a window, may be used to transition an affected window. However, because the condition is anomalous/temporary, the transition may be undesirable and it may be preferable for the window to ignore the anomalous inputs. In one example, light from a car parked in front of a building reflects light such that it shines on a light sensor of a middle window flanked by two outer windows. If the windows were controlled independently, the middle window may tint while the outer windows stay clear. However, if the windows are controlled together such that sensor data from all the windows is considered, the various sensor data can be used to determine the best tinting/transition strategy for the windows. For instance, data from the outer windows (e.g., data from light sensors on the outer windows) may indicate that, despite the anomalous bright-light-condition picked up by the middle window, the general ambient conditions are not sufficiently bright to trigger an optical transition. Anomalous conditions may be identified based on a contrast of sensor signals between adjacent or nearby windows. In effect, where anomalous conditions are identified, the window receiving the anomalous condition may be controlled based on data from sensors in other windows, rather than on the anomalous signals received at the affected window.

In some embodiments, the IGUs themselves have an integrated occupancy sensor, or another integrated sensor or receiver that allows a controller to know when people are present in a particular room. In one example, an IGU has an integrated sensor that detects the presence of cell phones or other electronic devices that are often carried by occupants. In similar embodiments, the IGU may communicate with such sensors without having the sensors integral to the IGU. For instance, the sensors may be provided on another device on the mesh network. In various embodiments, the control of an electrochromic window or set of electrochromic windows is affected by the occupancy status of a room containing the windows. See U.S. Pat. No. 8,705,162 and U.S. Provisional Patent Application No. 62/991,375, incorporated herein by reference in their entireties.

As noted above, an IGU may include a photosensor/light detector, which may be integral with the IGU (i.e., the IGU may come with a photosensor pre-installed and pre-wired). For example, the photosensor may be provided directly on a lite of the IGU. Various types of photosensors may be used. In certain embodiments, the photosensor is small and flat/thin, and in many cases requires little or no activation power to operate. In some cases, the photosensor is an LED light sensor, a photoresistor sensor, a photodiode, etc. In one embodiment a PV cell which is used to power the window may also be used as a photosensor. The sensor may be a button style sensor, a bulb style sensor, a patch/sticker style sensor, or another form of sensor. The sensor may measure directly measure light intensity, or it may measure another parameter that can serve as a proxy for light intensity. Depending on the sensor used, the sensor may output a variable resistance (in the case of a photoresistor, for instance), or it may output current/voltage. The output may be fed into a logic circuit, which may be part of a window controller, for example. Photoresistor sensors function by changing the resistance across the resistor leads depending on the light exposed to the photoresistor sensor. This change in resistance can be sensed by a controller or related circuitry to determine the degree of light incident on the window/photoresistor sensor.

The photosensor may be positioned anywhere on the window, so long as it is exposed to detect light as desired. In some cases the photosensor is positioned near a perimeter of the IGU such that the sensor is relatively unobtrusive and the length of wiring to the sensor is minimized. Any number of photosensors may be provided. Where multiple photosensors are provided on a single IGU, the signals can be used to determine an average light exposure on the IGU. Further, multiple photosensors may be used on a single IGU to account for possible shadowing or reflections.

Figure 9D:
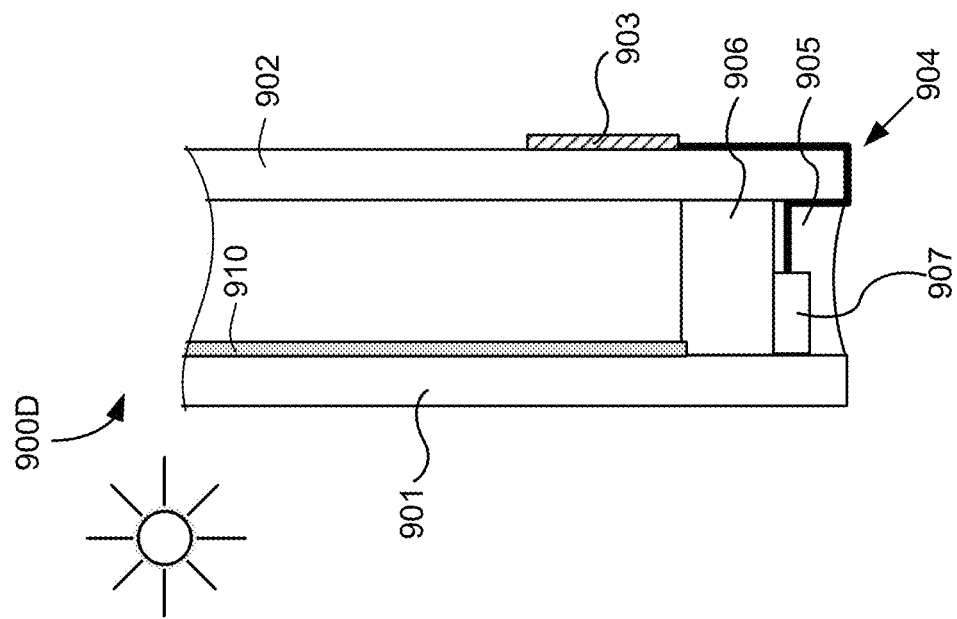

FIGS. 9A-9D present alternative embodiments of an IGU having an integrated photosensor. FIGS. 9A-9D show IGUs 900A-D, respectively. Each IGU 900A-D includes an electrochromic lite 901 having an electrochromic device 910 thereon, and a glass or plastic lite 902. The panes 901 and 902 are separated by a spacer 906, which is surrounded by a secondary seal 905. A primary seal (not shown) may be provided between the sides of the spacer 906 and each individual lite 901 and 902. Spacer 906, primary seals, and secondary seal 905 together form a sealing separator. In each figure, the sun is positioned on the left-hand side, such that the electrochromic lite 901 is nearer the outside, and the glass or plastic lite 902 is nearer the inside of the building. In FIG. 9A, the IGU 900A includes a photosensor 903, which is mounted on the outdoor-facing surface of the electrochromic lite (in this case the outer pane) 901. In other words, the photosensor 903 is mounted on the surface often referred to herein as surface 1. Photosensor 903 is electrically connected to an EC window controller, 907, in this example by wiring, 904, running around the edge of pane 901. In an alternative embodiment, wiring 904 could run through pane 901. Electrical connection between controller 907 and EC coating 910 is not depicted, but it may run between spacer 906 and pane 901, e.g., through the primary seal, or through spacer 906, e.g., using a through-wired spacer as described in U.S. patent application Ser. No.

14/196,895, filed Mar. 4, 2014, and titled "SPACERS AND CONNECTORS FOR INSULATED GLASS UNITS," which is herein incorporated by reference in its entirety.

Figure 9C:
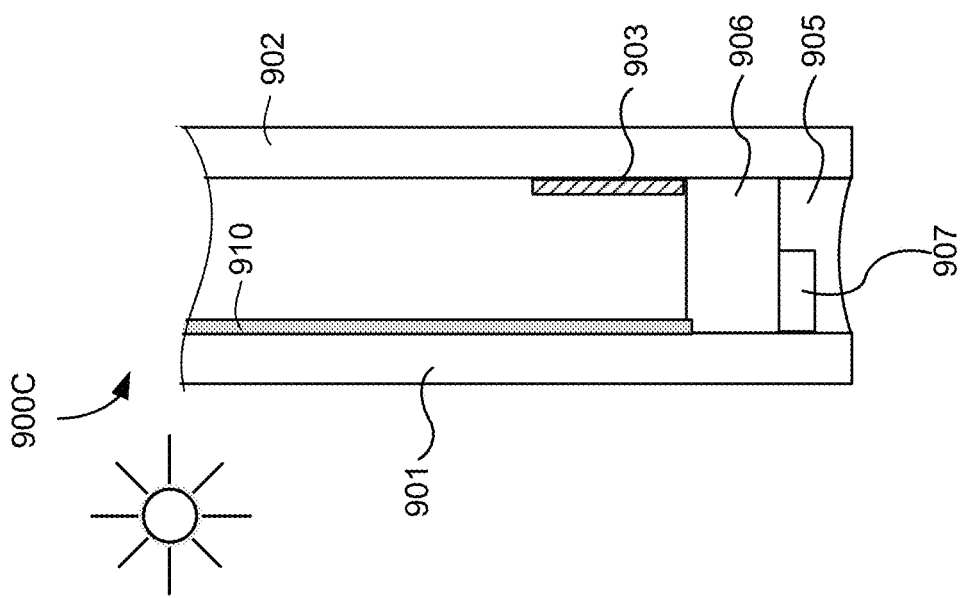

By contrast, in FIG. 9B, the IGU 900B includes a photosensor 903 mounted on the indoor-facing surface of the electrochromic lite (in this case this is the outer pane) 901. In other words, the photosensor 903 is mounted on the surface often referred to herein as surface 2. Where a photosensor is mounted on a surface including an EC device as shown in FIG. 9B, the EC device structure may optionally be deleted/removed in the area where the photosensor is to be located. In a similar embodiment shown in FIG. 9C, an IGU 900C includes a photosensor 903 on the outdoor-facing surface of the inner pane, often referred to as surface 3. In FIGS. 9B and 9C, electrical connection from photosensor 903 to controller 907 is not depicted, but again is either between the spacer and the lite/pane or through the spacer. In the embodiment of FIG. 9D, an IGU 900D includes a photosensor 903 on the indoor-facing surface of the inner pane, often referred to as surface 4; here wiring 904 is depicted as configured around pane 902, but could be through it in a similar embodiment. As described herein, around the glass wiring should have a good seal with the secondary sealant and provide a good (hermetic) seal with the pane if adjacent thereto.

Sensors that are integrated into/onto an IGU during fabrication (rather than during installation of the IGU) may simplify various installation procedures. For example, the sensors can be placed in/on an IGU in a pre-designated location. The sensors can be pre-calibrated, for example at the factory, so that they function as desired when the window is installed. This promotes quick installation and reduces the risk that the sensors are mis-calibrated during installation.

Figure 9E:
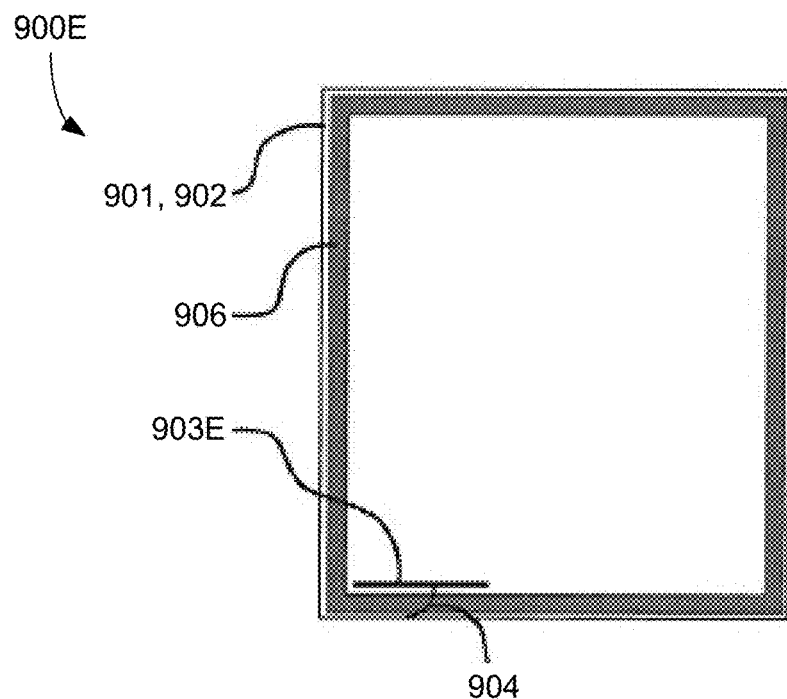
Figure 9F:
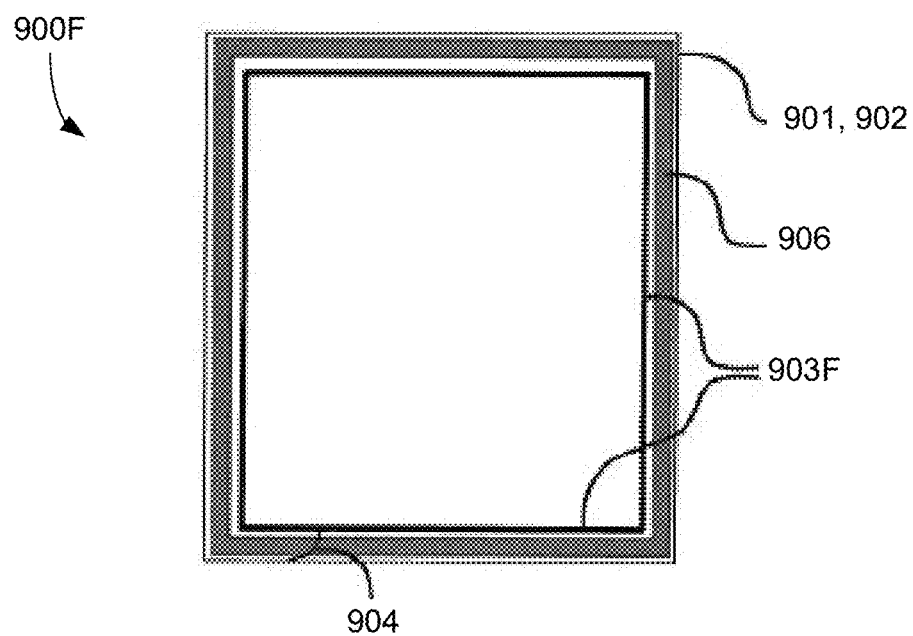

FIGS. 9E and 9F present additional examples of IGUs having integrated photosensors. In each embodiment, the IGU includes an electrochromic lite 901 and a second lite 902, which may be glass or plastic for example, separated by a spacer 906. In the case of FIG. 9E, the IGU 900E includes an integrated photosensor 903E. The photosensor 903E is in a linear format in this example. The photosensor 903E is placed near the edge of the IGU 900E such that when the IGU 900E is installed, the photosensor 903E is at or near the edge of the viewable area of the IGU 900E. In a similar embodiment, the photosensor may be extended along an entire side of the IGU. In a further embodiment, two or more photosensors may be used, each extending along a different side (or portion of a side) of the IGU. In the case of FIG. 9F, the IGU 900F includes an extended integrated photosensor 903F. Here, the photosensor extends around all edges of the IGU 900F. The photosensor 903F is positioned such that it will be proximate an edge of the viewable area of the IGU 900F when installed. In a similar embodiment, the photosensor 903F is a collection of four independent photosensors. The photosensors shown in FIGS. 9E and 9F may be positioned on any of the substrate surfaces, as shown in FIGS. 9A-9D.

Linear format photosensors such as those shown in FIGS. 9E and 9F may be more aesthetically pleasing than other types of photosensors. In some embodiments, the linear format is achieved by extending the sensor conductors to have a desired shape. By extending the sensor conductors in this way, the sensor/sensor conductors can have a very narrow width. In some cases a linear format photosensor is sufficiently thin that it is virtually invisible when installed into a window frame. Another advantage related to these embodiments is that the sensor or sensors can be used to effectively average the incident light over the entire IGU (FIG. 9F) or over a portion of the IGU (FIG. 9E). Further, these types of integrated photosensors may be more cost effective than other types of photosensors commonly used in the industry. Many conventional photosensors require a power source (e.g., an independent power source), and typically require holes to be drilled in an IGU for wiring and mounting purposes, which can significantly complicate the IGU installation process. By contrast, integrated photosensors can be passive (unpowered) and do not require any additional holes to be drilled in an IGU, thus saving labor cost during manufacturing. Further, integrated photosensors may be more aesthetically pleasing than conventional photosensors, since conventional photosensors are often installed such that they protrude from or are adjacent to a window frame. Integrated photosensors can be smaller and sleeker, and can be installed such that they do not protrude from the frame.

Various additional sensors may be used as part of the window assembly/IGU. Certain sensors that may be incorporated into the disclosed embodiments are further discussed and described in U.S. Pat. No. 8,705,162, titled "Controlling Transitions in Optically Switchable Devices," which is herein incorporated by reference in its entirety. Examples of such sensors include occupancy sensors, temperatures sensors, interior light sensors, exterior light sensors, and transmissivity sensors that detect light passing through a window from the exterior. Light sensors may also be referred to as photosensors. In certain embodiments, sensors are provided to detect cloud and other weather conditions as described in, for example, U.S. Provisional Patent Application No. 62/057,121, filed Sep. 29, 2014, which is incorporated herein by reference.

The GPS data, compass data, solar calculator data, photosensor data, temperature data, and other on-board sensor data may also be used to help control the electrochromic windows in some embodiments. For example, the controller can look up the sunrise and sunset times at a particular building based on the GPS coordinates. The sunrise and sunset times may be used as part of a control scheme by the controller. Further, the orientation of the windows, and their relative orientations with respect to the sun, which may be provided by compass data, or by a solar calculator or other mechanism, may factor into the control scheme. Also, controllers configured with GPS capability can aid in commissioning the windows, e.g., not only creating a map of where each window is relative to others via a mesh network, but also identifying absolute coordinates for each window or zone of windows.

In some embodiments, the controllers may have instructions to control the windows based on the sensed relative and exact positions/orientations of the various windows. For example, the controllers may have instructions to color east-facing windows early in the morning to prevent the sun from heating up the east-facing rooms, and to bleach the east-facing windows later in the afternoon when the sun is not shining directly into the east-facing rooms. Any control scheme may be used, and may be programmed into a controller by a user or installer, or may be pre-programmed by a manufacturer, vendor, etc. In some embodiments the window controllers are programmable in a similar manner as a thermostat (with the option of controlling a single window or multiple windows together).

Packaging and Installation

In certain embodiments, IGUs are provided having on-board controllers that are capable of forming a self-meshing network. The on-board controllers may be accessible, as shown in FIGS. 2B-2D, so that they can easily be serviced or replaced as needed. The on-board controllers may be provided in a carrier that interfaces with a dock in some cases. The IGUs may be provided with or without a subframe and/or frame. The IGUs may have no external wiring for power, communication or other purposes. In other words, the IGUs may have a shape (e.g., peripheral shape) that matches conventional non-electrochromic IGUs, with no dangling wires or controllers to be physically hooked up. Such IGUs can be installed in virtually the same manner as non-electrochromic windows. In some other embodiments, one or more cables/wires may be provided for delivering power and/or communication to the IGU.

Because the window controllers may form a self-meshing network in a number of embodiments, no substantial commissioning is necessary to configure the windows for use after they are installed. Instead, the controllers auto-configure themselves, figure out where they are in relation to one another, and may form a virtual map of the windows/building. The map may be used to control the windows as desired over the network. This installation/setup allows the electrochromic IGUs/windows to be installed by any glass installer, regardless of their familiarity with electrochromic windows. Such a design simplifies deployment of electrochromic windows, especially in the residential area where people usually hire local contractors (who are likely to be unfamiliar with electrochromic windows and the unique requirements for wiring/commissioning various conventionally designed EC windows) to install their windows.

In certain embodiments, an electrochromic IGU may be provided with a dock, as described above. The use of docks enables the use of custom carriers/controllers, which may be provided for different purposes. In one example, an installation carrier may be provided. This installation carrier may include a custom controller having controller components that are useful for installing/testing an electrochromic IGU. The installation carrier may be used by an installer (e.g., by placing the installation carrier in the dock) when positioning and/or hooking up an IGU. In many cases where electrochromic windows are powered through wiring that runs throughout a building, installation of the windows involves two phases with different professionals leading each phase. In the first phase of installation, a glass installer will position the IGUs in their associated frames in the building. In the second phase of installation, an electrician will electrically connect the IGUs to the cables carrying power. One problem associated with this installation technique is that the electrochromic aspect of the windows cannot be tested until after the second phase of installation is complete. If an IGU shows problems after it has been electrically connected, the glass installer must return and un-install the IGU. Examples of problems that can arise during installation include pinched wires, damaged cables or connectors, etc. This divided labor process is cumbersome and results in delays during installation when the glass installer has to return to un-install non-working (or less-than-optimally working) IGUs.

However, the use of a specialized installation carrier (also referred to as an installation controller in some cases) avoids this problem. The installation carrier may snap into/onto the dock for easy use. The installation carrier may include hardware/circuitry/programming to allow for testing a variety of IGUs of various shapes/sizes. The installation controller carrier also be provided with a power supply (e.g., battery or other power supply) that has sufficient capacity to drive optical transitions on a number of different windows over time. In this way, a glass installer can carry a single installation carrier that can be hooked up to each window during installation to ensure that each window properly undergoes the desired optical transitions. This process allows the glass installer to immediately identify any IGUs that should be un-installed/replaced, and avoids the need for the glass installer to return after the IGUs have been electrically connected to the building's power supply by the electrician. The use of an installation controller may therefore significantly decrease installation delays.

Similarly, other custom carriers/controllers may also be provided. Examples include carriers that include controller components for specifically diagnosing problems with an electrochromic device, evaluating the quality of an electrochromic device, reading information about the electrochromic device, etc. In some cases, a fabrication carrier may be used for testing the electrochromic device during one or more stages of manufacturing. Any such custom carriers may be shaped to interface with a dock provided on the IGU. The custom carriers may be the same shape as the carrier normally used to drive optical transitions on an IGU. In some other cases, the custom carrier may be a different shape, so long as it is able to connect with the dock.

The use of lite-mounted on-board controllers presents an opportunity to market and spread awareness about electrochromic windows and electrochromic window brands. Conventionally, many electrochromic windows are fabricated to be minimally distracting, with maximum viewable area through the window. One consequence is that it is difficult or impossible to know, simply by looking, where most installed electrochromic windows come from (i.e., which company manufactured them). While this approach is desirable in certain implementations, in other cases it would be beneficial for the products to be identifiable with a particular company/brand. Such identifiability can promote increased awareness and demand for the company's products. As such, in certain implementations, an on-board controller/carrier may be provided with a logo (e.g., trademark, other mark, company name, etc.) thereon. Such a feature may be particularly useful when the controller/carrier is mounted on a lite of the IGU, for example as described in relation to FIGS. 10A-10C. The logo may be provided in a relatively subtle manner to minimize any distraction associated with having the logo visible. For example, the logo may be provided in relief, and may be the same color as the background. Of course, the logo may instead be made intentionally easily visible, as well. In embodiments where the front of a carrier or other controller is or includes a replaceable or rechargeable battery that snaps on, the logo may be provided on the battery. As mentioned above, the carrier/controller may be formed by a molding process in some cases. The logo could be formed in this same process (or afterward).

Cellular Blockers, Antennae, and Repeaters

In various embodiments, one or more of the lites in an electrochromic IGU may be configured to function as an antenna, for example for receiving cellular signals, Wi-Fi signals, and/or television signals. Details related to such embodiments are further described in U.S. Provisional Patent Application No. 62/084,502, which is herein incorporated by reference in its entirety.

Controller and Interface Configurations

Figure 5A:
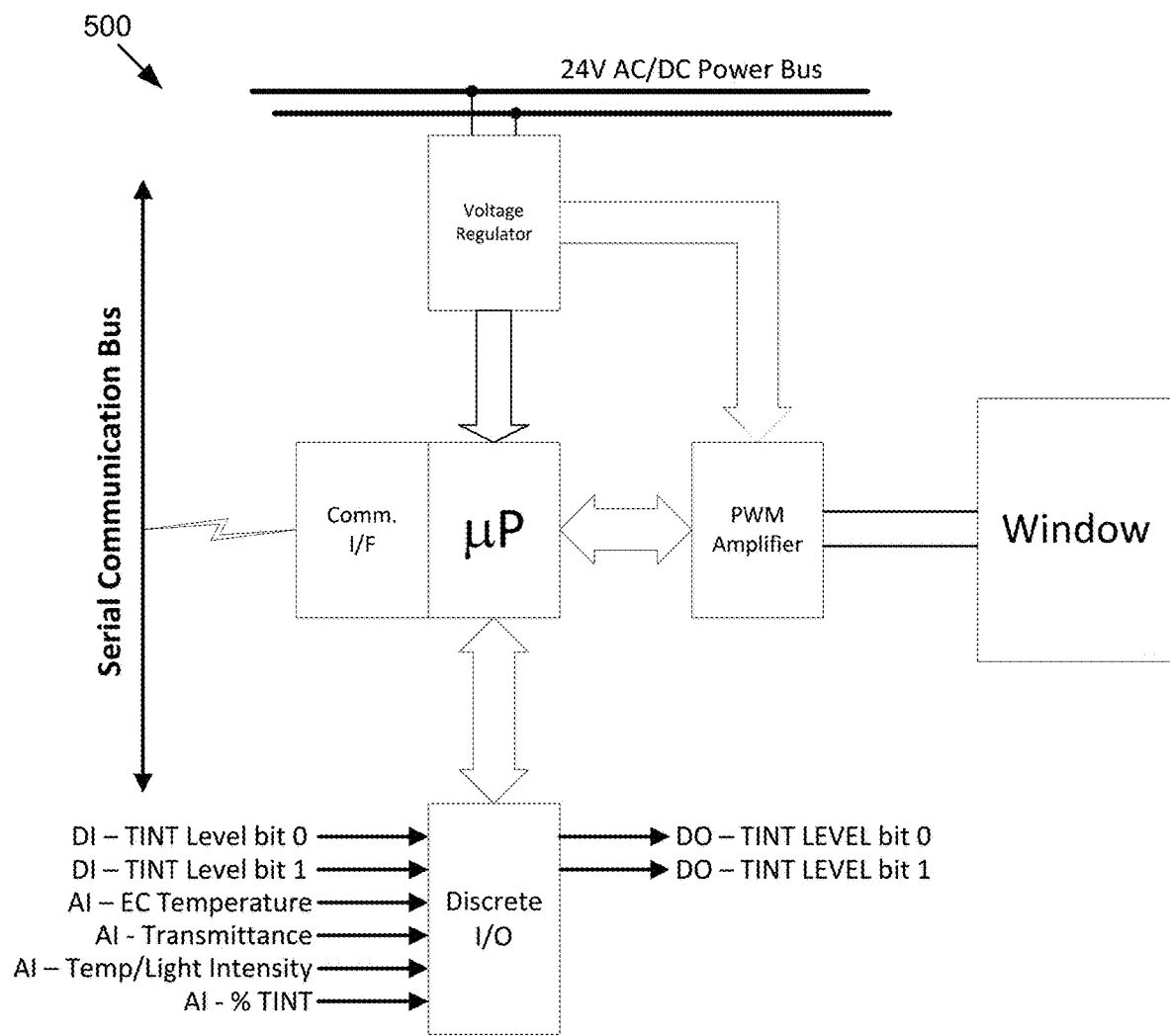
FIG. 5A is a schematic of an onboard window controller.
Figure 5B:
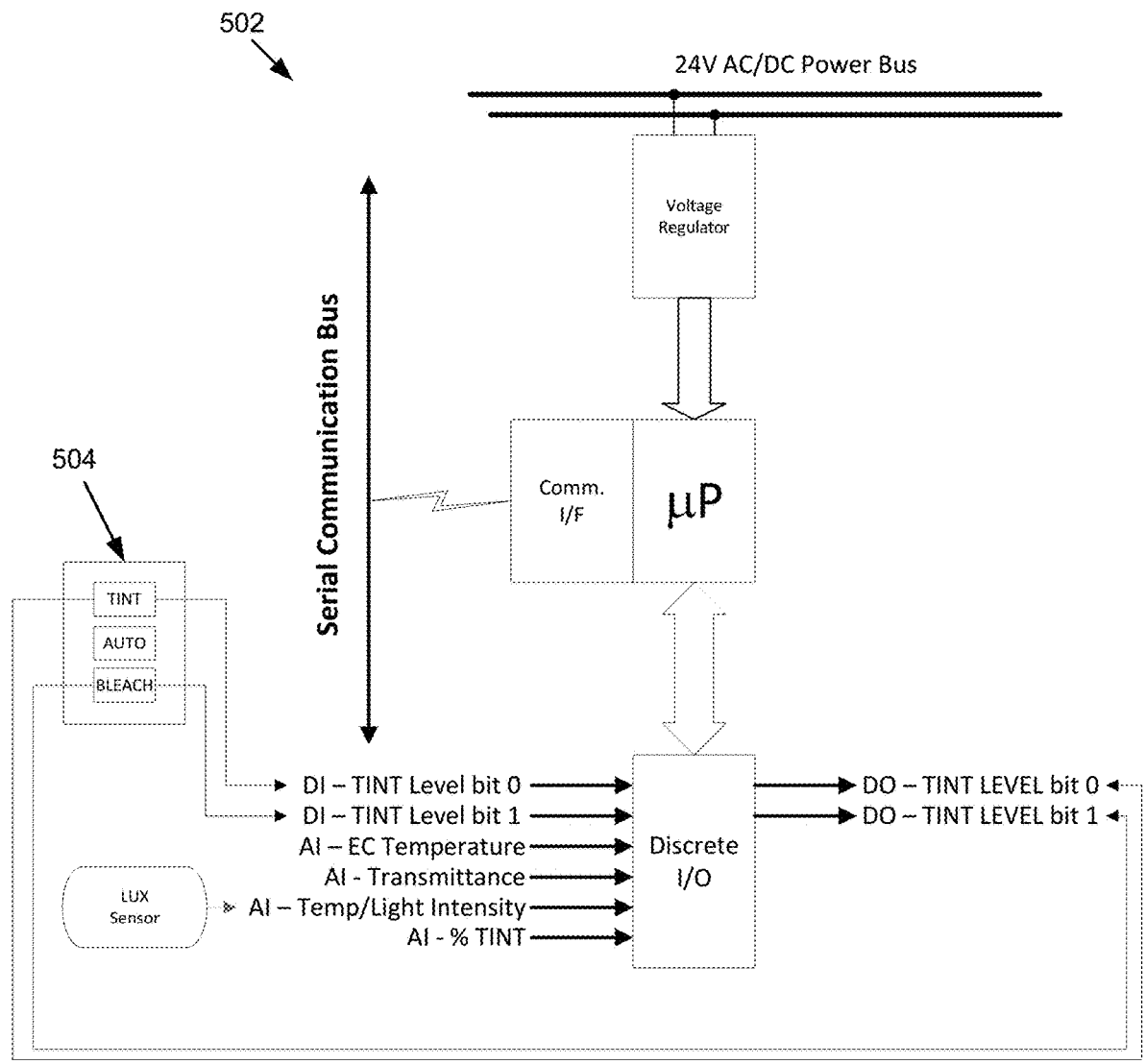
FIG. 5B depicts an onboard controller configuration having a user interface according to certain embodiments.

FIG. 5A is a schematic depiction of an onboard window controller configuration, 500, including interface for integration of EC windows into, for example, a residential system or a building management system. A voltage regulator accepts power from a standard 24v AC/DC source. The voltage regulator is used to power a microprocessor (□P) as well as a pulse width modulated (PWM) amplifier which can generate current at high and low output levels, for example, to power an associated smart window. A communications interface allows, for example, wireless communication with the controller's microprocessor. In one embodiment, the communication interface is based on established interface standards, for example, in one embodiment the controller's communication interface uses a serial communication bus which may be the CAN 2.0 physical layer standard introduced by Bosch widely used today for automotive and industrial applications. "CAN" is a linear bus topology allowing for 64 nodes (window controllers) per network, with data rates of 10 kbps to 1 Mbps, and distances of up to 2500 m. Other hard wired embodiments include MODBUS, LonWorks™, power over Ethernet, BACnet MS/TP, etc. The bus could also employ wireless technology (e.g., Zigbee, Bluetooth, Bluetooth low-energy (BLE), etc.). In embodiments that utilize wireless communication to a controller that is within an IGU (e.g., between panes of an IGU), the wireless signals may have properties (e.g., power and frequency) designed to penetrate the glass or other IGU components so the communication can be received by the controller.

In the depicted embodiment, the controller includes a discrete input/output (DIO) function, where a number of inputs, digital and/or analog, are received, for example, tint levels, temperature of EC device(s), % transmittance, device temperature (for example from a thermistor), light intensity (for example from a LUX sensor) and the like. Output includes tint levels for the EC device(s). The configuration depicted in FIG. 5A is particularly useful for automated systems, for example, where an advanced BMS is used in conjunction with EC windows having EC controllers as described herein. For example, the bus can be used for communication between a BMS gateway and the EC window controller communication interface. The BMS gateway also communicates with a BMS server.

Some of the functions of the discrete I/O will now be described.

DI-TINT Level bit 0 and DI-TINT Level bit 1: These two inputs together make a binary input (2 bits or $2^2=4$ combinations; 00, 01, 10 and 11) to allow an external device (switch or relay contacts) to select one of the four discrete tint states for each EC window pane of an IGU. In other words, this embodiment assumes that the EC device on a window pane has four separate tint states that can be set. For IGUs containing two window panes, each with its own four-state TINT Level, there may be as many as eight combinations of binary input. See U.S. patent application Ser. No. 12/851,514, filed on Aug. 5, 2010 and previously incorporated by reference. In some embodiments, these inputs allow users to override the BMS controls (e.g., untint a window for more light even though the BMS wants it tinted to reduce heat gain).

AI-EC Temperature: This analog input allows a sensor (thermocouple, thermister, RTD) to be connected directly to the controller for the purpose of determining the temperature of the EC coating. Thus temperature can be determined directly without measuring current and/or voltage at the window. This allows the controller to set the voltage and current parameters of the controller output, as appropriate for the temperature.

AI-Transmittance: This analog input allows the controller to measure percent transmittance of the EC coating directly. This is useful for the purpose of matching multiple windows that might be adjacent to each other to ensure consistent visual appearance, or it can be used to determine the actual state of the window when the control algorithm needs to make a correction or state change. Using this analog input, the transmittance can be measured directly without inferring transmittance using voltage and current feedback.

AI-Temp/Light Intensity: This analog input is connected to an interior room or exterior (to the building) light level or temperature sensor. This input may be used to control the desired state of the EC coating several ways including the following: using exterior light levels, tint the window (e.g., bright outside, tint the window or vice versa); using and exterior temperature sensor, tint the window (e.g., cold outside day in Minneapolis, untint the window to induce heat gain into the room or vice versa, warm day in Phoenix, tint the widow to lower heat gain and reduce air conditioning load).

AI-% Tint: This analog input may be used to interface to legacy BMS or other devices using 0-10 volt signaling to tell the window controller what tint level it should take. The controller may choose to attempt to continuously tint the window (shades of tint proportionate to the 0-10 volt signal, zero volts being fully untinted, 10 volts being fully tinted) or to quantize the signal (0-0.99 volt means untint the window, 1-2.99 volts means tint the window 5%, 3-4.99 volts equals 40% tint, and above 5 volts is fully tinted). When a signal is present on this interface it can still be overridden by a command on the serial communication bus instructing a different value.

DO-TINT LEVEL bit 0 and bit 1: This digital input is similar to DI-TINT Level bit 0 and DI-TINT Level bit 1. Above, these are digital outputs indicating which of the four states of tint a window is in, or being commanded to. For example if a window were fully tinted and a user walks into a room and wants them clear, the user could depress one of the switches mentioned and cause the controller to begin untinting the window. Since this transition is not instantaneous, these digital outputs will be alternately turned on and off signaling a change in process and then held at a fixed state when the window reaches its commanded value.

FIG. 5B depicts an onboard controller configuration 502 having a user interface. For example where automation is not required, the EC window controller, for example as depicted in FIG. 5A, can be populated without the PWM components and function as I/O controller for an end user where, for example, a keypad, 504, or other user controlled interface is available to the end user to control the EC window functions. The EC window controller and optionally I/O controllers can be daisy chained together to create networks of EC windows, for automated and non-automated EC window applications.

Figure 6A:
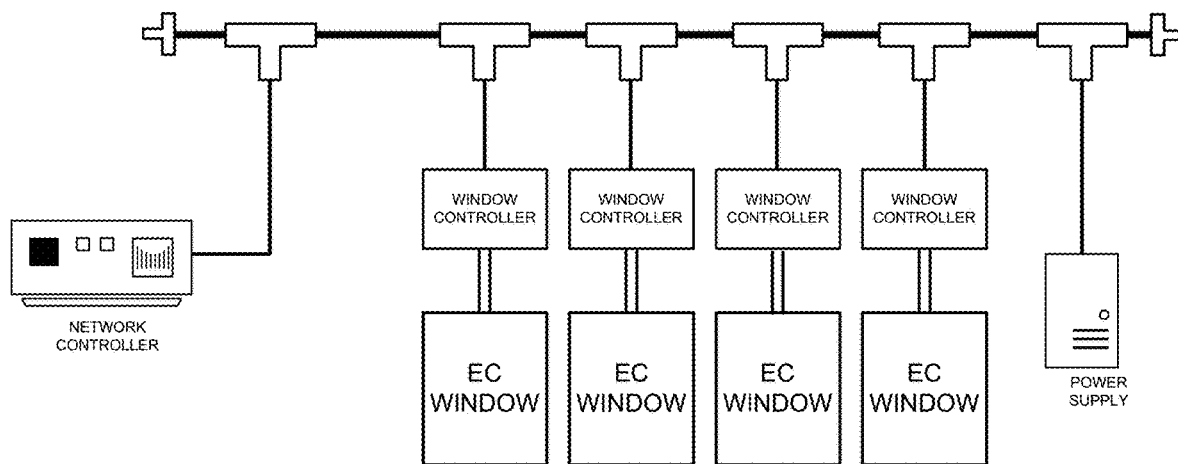
FIGS. 6A and 6B depict automated and non-automated daisy chain configurations for EC windows and controllers, respectively.
Figure 6B:
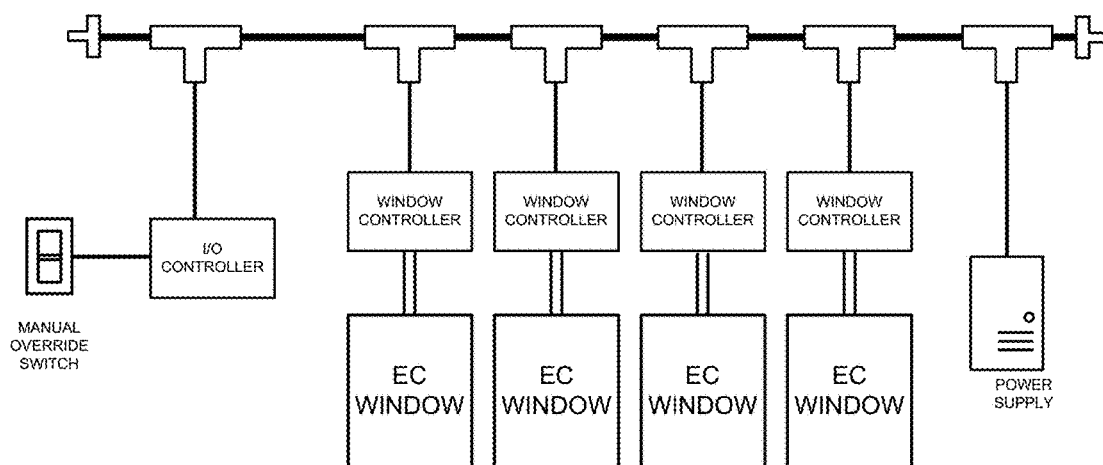

FIGS. 6A and 6B depict automated and non-automated daisy chain configurations for EC windows and EC window controllers described herein. Where automation is desired (see FIG. 6A), for example, a bus allows setting and monitoring individual window parameters and relaying that information though the network controller directly to a BMS via, for example, an Ethernet gateway. In one embodiment, a network controller contains an embedded web server for local control via Ethernet from, for example, a PC or smart phone. In one embodiment, network commissioning is done via a controller's web server and a window scheduler, for example, where HVAC and lighting programs execute locally on the controller. In one embodiment, network controllers can wirelessly connect to each other via, for example, a Zigbee mesh network, allowing for expansion for large numbers of windows or to create control zones within a building using sets of windows. As depicted in FIG. 6B, when no automation is required, window control is accomplished through an I/O controller as described above. In one embodiment, there is also a master override included. In one embodiment, a network, for example a daisy chain network as depicted in FIG. 6A or 6B, is constructed onsite (field wired). In another embodiment, commercially available cabling products (no tooling required) are used to construct a network of window controllers, for example, interconnects, cable assemblies, tees, hubs and the like are widely available from commercial suppliers.

One or more user interfaces may be provided to allow a user to control the optical state of one or more electrochromic windows. In certain cases, a user interface is provided as a physical component of an IGU. In other cases, a user interface is provided on an electronic device that communicates with a network controller and/or window controller. Example electronic devices include smartphones, computers, tablet computers, appliances, appliance controllers such as thermostats, and the like.

In certain embodiments, the user interface includes a touch-sensitive panel that may be mounted on or near an IGU or window frame. The touch panel may be provided on an applique (i.e., sticker) that may be attached wherever a user would like the panel to be mounted. In some cases, such an applique or other touch-sensitive panel may be provided on the front face of a carrier or other on-board controller that is mounted on a lite of an IGU. The applique may itself be a laminated touch panel. The touch panel and applique may be substantially transparent. The touch panel may include certain markings highlighting where to touch to cause the window to become more clear or tinted. In a simple embodiment, the touch panel includes two buttons: clear and tint. The clear button can be pressed to cause the window to switch to a clear state, and the tint button can be pressed to cause the window to switch to a tinted state. In another embodiment, the touch panel may include a sliding scale that a user can use to select a desired tint level. The scale may be continuous or discrete. In yet another embodiment, the touch panel may include other buttons, mechanisms, or functionality that allow a user to program in certain scheduling options or tinting rules, in a manner like a thermostat.

The touch panel or other user interface may communicate with a window controller through various means. In certain implementations, a ribbon cable is used to connect an on-board controller to a touch panel user interface. Ribbon cables can wrap around the edge of a lite of glass without damage. When installed, the window frame may clamp over the ribbon cable, which may stick out from an edge of a frame where it can be connected to the touch panel or other user interface. With a ribbon cable, there is no need to drill a hole in the glass to connect the user interface to the window controller. In certain other embodiments, the touch panel or other user interface is connected to the window controller through a connection that traverses a hole drilled in one of the panes of the IGU. The hole for this connection may be pre-drilled proximate a location where an on-board controller will be located. The hole may also be pre-drilled proximate any location where the touch panel is desired (with wiring to the controller going through other elements such as the hollow interior of a sealing separator, or embedded within a seal of the sealing separator, etc.).

Regardless of how the touch panel or other user interface is connected to the window controller, the placement of the user interface may be customizable/adjustable. For instance, an IGU may be provided with an on-board controller that is connected or connectable to a touch panel or other user interface through a flexible connection (e.g., wires, ribbon cable, etc.). The flexible connection may wrap around the edge of the IGU, or it may pass through a lite of the IGU. The length of the flexible connection may be variable in some cases. In some cases the flexible connection is trimmed to a desired length during installation. In a particular application, a touch panel applique includes electrical leads (e.g., printed circuit type leads, which may or may not be transparent) that may be trimmed to a desired length based on a desired placement of the touch panel.

As noted, in some cases a user interface is a touch panel provided on a transparent applique. The transparent applique may be placed anywhere a user desires, so long as the flexible connection is sufficiently long. In many cases a user will mount the touch panel on an indoor-facing surface of an inner lite of an IGU (i.e., surface 4). Oftentimes the touch panel is positioned proximate a corner or edge of the visible area of the IGU. In other cases a user may choose to mount the touch panel on a frame of the window, or on a wall next to a window.

Additional details related to a controller, various components therein, and particular control methods are further described in P.C.T. Patent Application No. PCT/US14/43514

Although the foregoing invention has been described in some detail to facilitate understanding, the described embodiments are to be considered illustrative and not limiting. It will be apparent to one of ordinary skill in the art that certain changes and modifications can be practiced within the scope of the appended claims.

What is claimed is:

1. An insulated glass unit (IGU), comprising:
a first lite;
a second lite positioned opposite to the first lite, wherein the first lite and/or the second lite comprises an electrochromic device disposed thereon;
a spacer positioned between the first lite and the second lite, wherein the first lite, second lite, and spacer together form the IGU;
a sealed interior region of the IGU defined between the first lite and the second lite, which sealed interior region of the IGU (i) is bounded at its periphery by the spacer, and (ii) comprises therein at least a portion of the electrochromic device;
a first component positioned in the sealed interior region of the IGU, wherein the first component is (i) an antenna, (ii) a ground plane, (iii) a connection point comprising a plurality of electrical traces, or (iv) a pad comprising a plurality of electrical contacts;
a second component positioned out of the sealed interior region of the IGU; and
a flexible conductor that traverses from an interior of the sealed interior region of the IGU to an exterior to the sealed interior region of the IGU, wherein the flexible conductor passes between the spacer and the first lite, wherein the flexible conductor electrically connects the first component to the second component, wherein the flexible conductor electrically connects to the first component at a location in the interior of the sealed interior region of the IGU, and wherein the flexible conductor electrically connects to the second component at a location exterior to the sealed interior region of the IGU.

2. The IGU of claim 1, wherein the first component comprises the antenna.

3. The IGU of claim 1, wherein the first component comprises the ground plane.

4. The IGU of claim 1, wherein the first component comprises the connection point comprising the plurality of electrical traces.

5. The IGU of claim 1, wherein the first component comprises the pad comprising the plurality of electrical contacts.

6. The IGU of claim 1, wherein the second component comprises a controller.

7. The IGU of claim 1, wherein the second component comprises a carrier configured to engage with a controller.

8. The IGU of claim 1, wherein the second component comprises a user interface.

9. The IGU of claim 8, wherein the second component comprises a touch screen.

10. The IGU of claim 1, wherein the first lite comprises the electrochromic device.

11. The IGU of claim 1, wherein the flexible conductor comprises flexible conductor tape.

12. The IGU of claim 1, wherein the flexible conductor comprises a ribbon cable.

13. The IGU of claim 1, further comprising a primary seal positioned between the spacer and the first lite.

14. The IGU of claim 13, wherein the flexible conductor additionally passes through the primary seal.

15. The IGU of claim 13, further comprising a secondary seal disposed peripherally outside of the spacer.

16. The IGU of claim 15, wherein the flexible conductor passes through the secondary seal.

17. The IGU of claim 1, further comprising:
- a secondary seal zone positioned between the first lite and the second lite and peripherally outside of the spacer; and
- a controller configured to control optical transitions on the electrochromic device, wherein the controller is positioned within the secondary seal zone.

* * * * *